United States Patent [19]

Ishikawa et al.

[11] 4,367,932
[45] Jan. 11, 1983

[54] EXPOSURE CONTROL SYSTEM

[75] Inventors: Norio Ishikawa, Osaka; Nobuyuki Taniguchi, Sakai; Yoshio Yuasa, Kawachinagano, all of Japan

[73] Assignee: Minolta Camera Kabushiki Kaisha, Osaka, Japan

[21] Appl. No.: 199,211

[22] Filed: Oct. 21, 1980

[30] Foreign Application Priority Data

Oct. 23, 1979 [JP] Japan .................. 54-137210
Jan. 8, 1980 [JP] Japan .................. 55-1203
Jan. 9, 1980 [JP] Japan .................. 55-1548

[51] Int. Cl.³ .................. G03B 7/097; G03B 7/16
[52] U.S. Cl. .................. 354/23 D; 354/27; 354/33; 354/139; 354/149
[58] Field of Search .................. 354/23 D, 27, 30, 33, 354/60 F, 139, 145, 149; 250/214 P; 356/221

[56] References Cited

U.S. PATENT DOCUMENTS

| 3,836,920 | 9/1974 | Uchiyama et al. | 354/27 |
| 3,868,701 | 2/1975 | Kawasaki | 354/60 F X |
| 4,005,444 | 1/1977 | Uchiyama et al. | 354/33 X |
| 4,065,776 | 12/1977 | Iwata et al. | 354/23 D |
| 4,079,389 | 3/1978 | Hashimoto et al. | 354/33 |
| 4,188,104 | 2/1980 | Uchiyama et al. | 354/31 |

FOREIGN PATENT DOCUMENTS 54-158923 12/1979 Japan.

*Primary Examiner*—Stafford D. Schreyer
*Attorney, Agent, or Firm*—Wenderoth, Lind & Ponack

[57] ABSTRACT

An exposure control system includes a device for measuring an intensity of the ambient light, three controllers for controlling three factors of exposure time, aperture size and amount of flash light to be emitted, and a device for setting three pieces of information of film sensitivity and any two of the above mentioned three factors to govern the corresponding two of the three controllers. A calculator is provided for calculating the remaining factor. The calculated value is used for governing the remaining controller. Of the three pieces of information set in the setting device, two pieces can be introduced in a form of a ratio.

37 Claims, 56 Drawing Figures

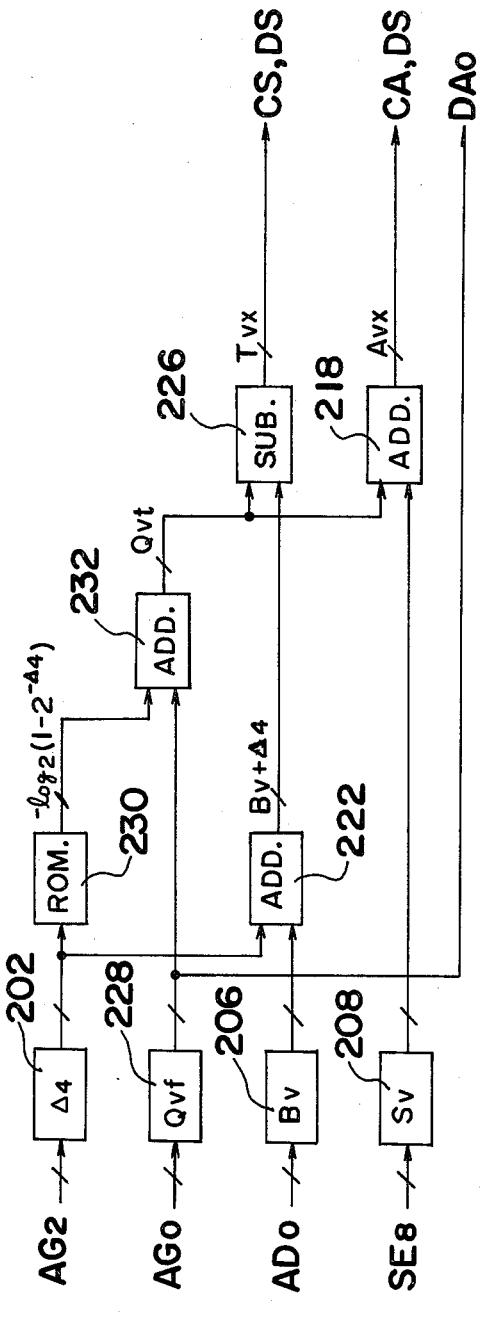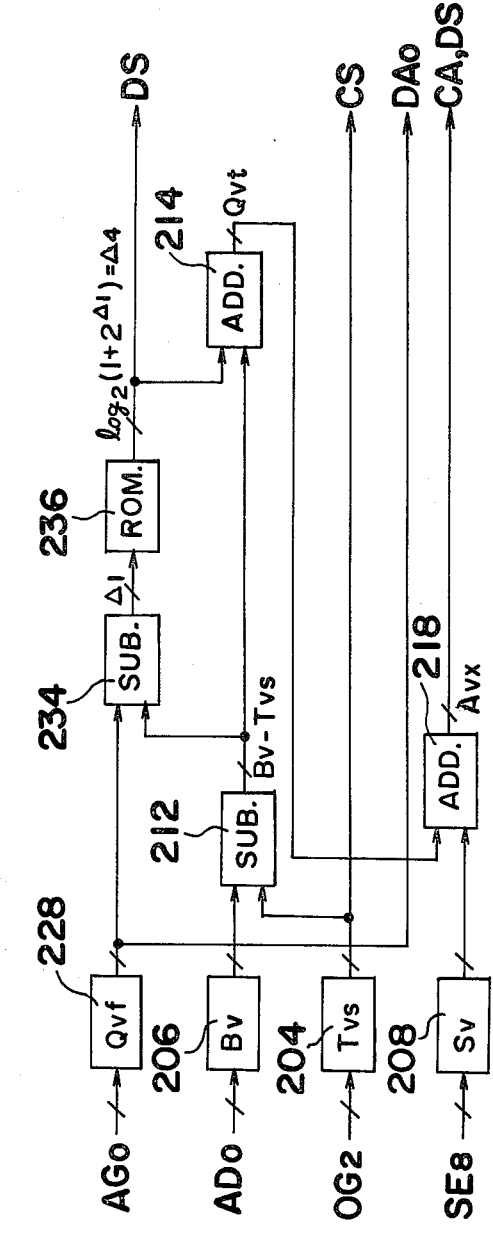
Fig. 23
Fig. 24

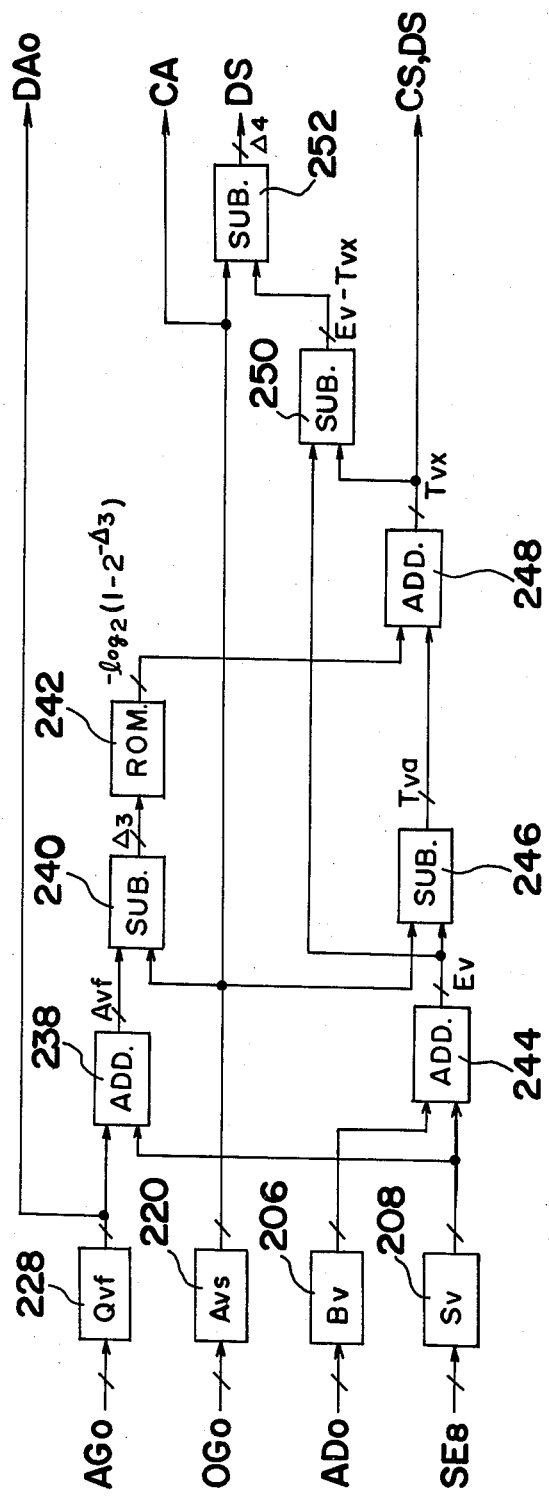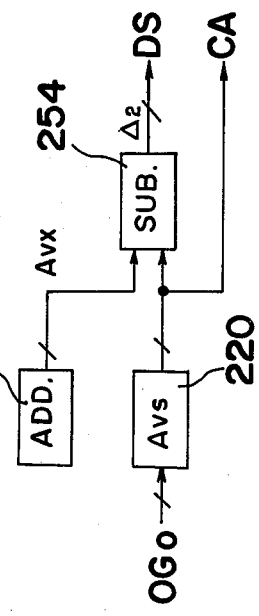
Fig. 25
Fig. 26

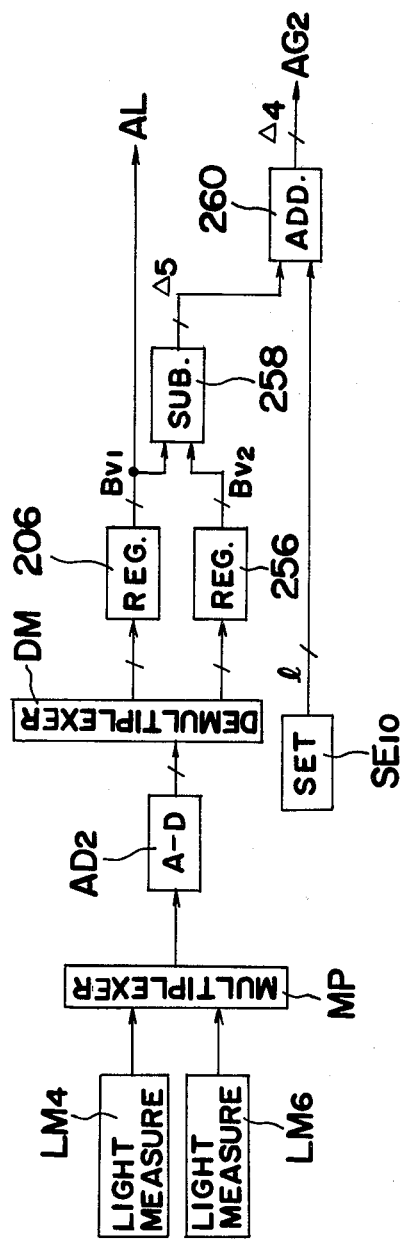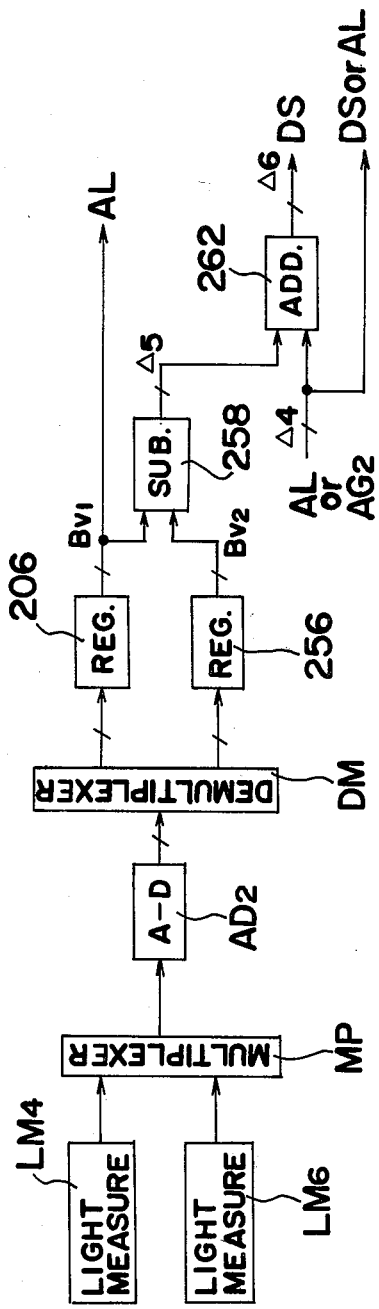

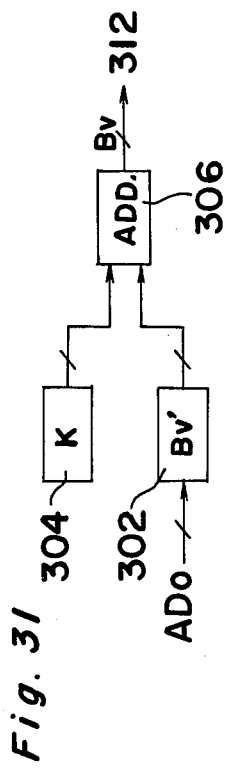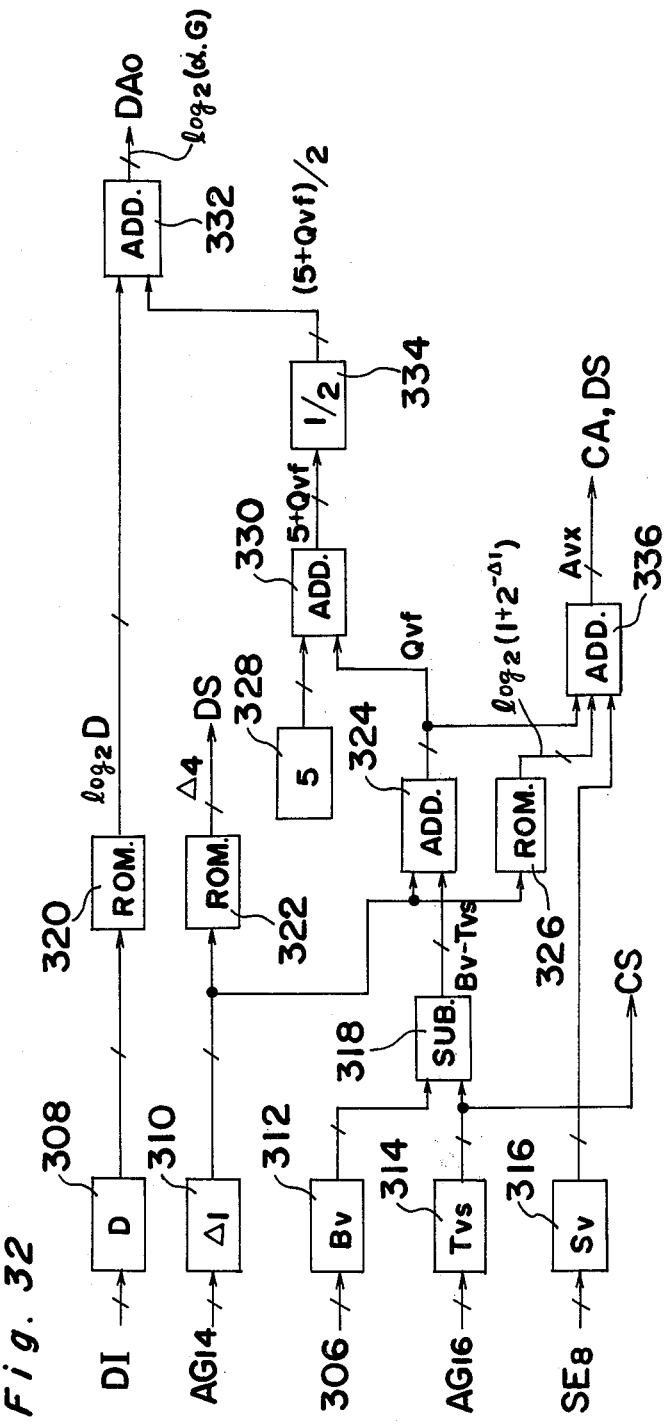
Fig. 31
Fig. 32

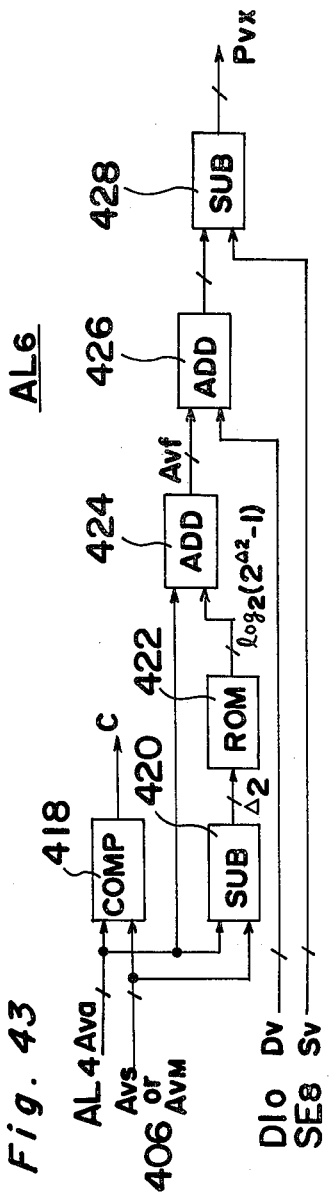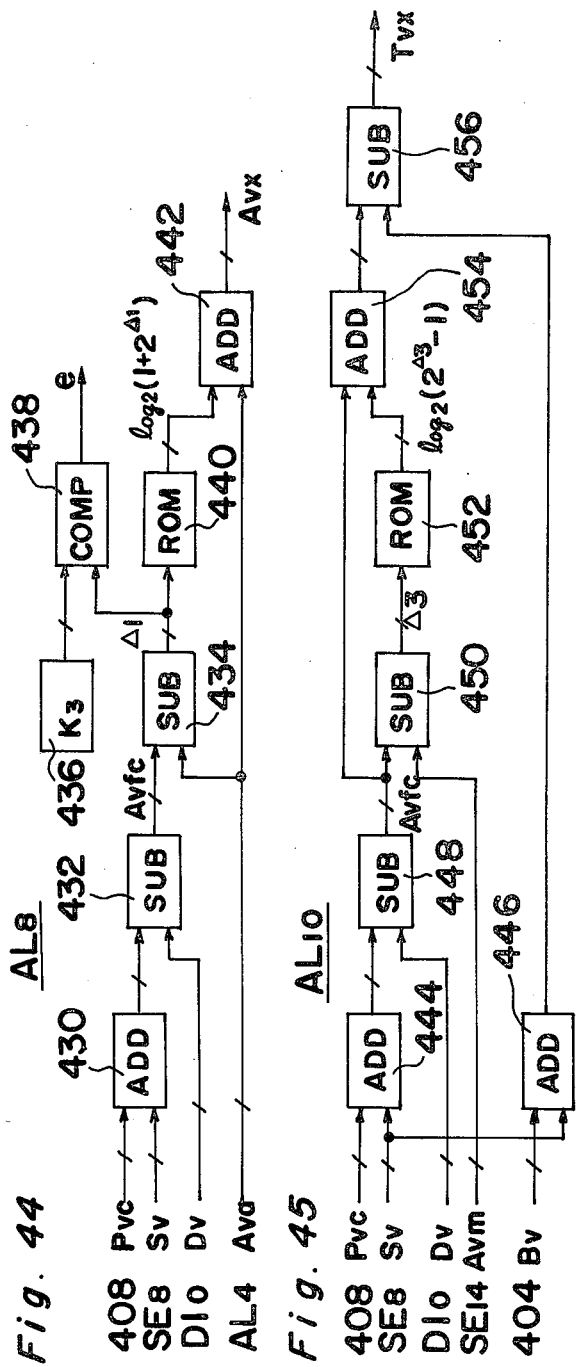
Fig. 43, Fig. 44, Fig. 45

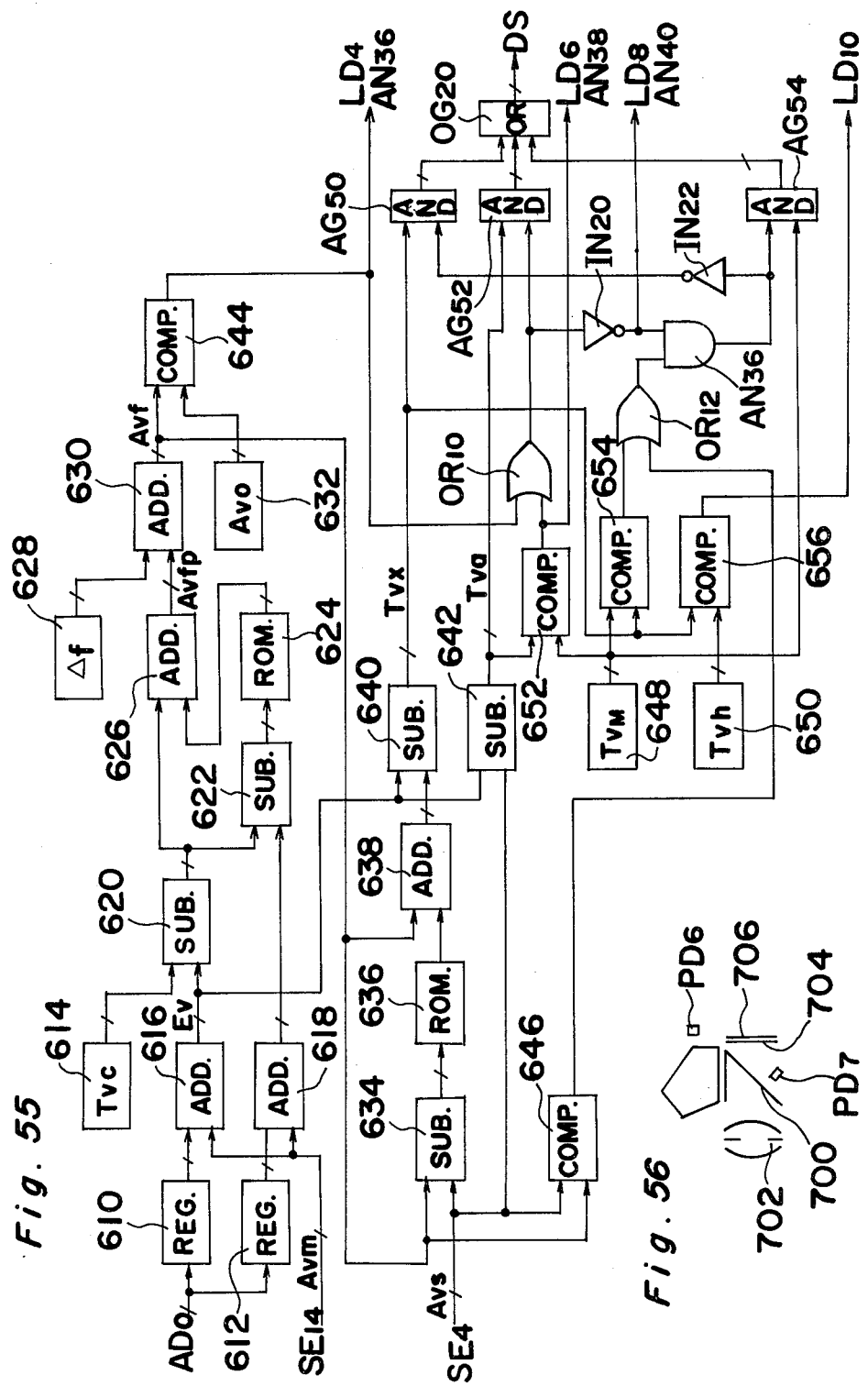

EXPOSURE CONTROL SYSTEM

BACKGROUND OF THE INVENTION

The present invention relates to an exposure control system for use in photography, and more particularly, to a system which provides exposure information for a photography operation under ambient light and flash light.

When a flash light is used for taking a photograph, it is necessary in an ordinary prior art arrangement to adjust a diaphragm aperture of the camera lens by using the information of the distance to the object and the amount of light to be emitted from the flash light. Recently, there has been proposed a flash light that can be adjusted to change its light amount by the use of information of distance to the object and aperture value of the camera.

In either one of the above systems, it is so designed that when the photograph is taken with the flash light, the ambient light is not taken into consideration, on the assumption that the ambient light, when compared with flash light, has little effect on the exposure to the film surface.

However, this is not true in all the circumstances. Sometimes, the ambient light has an effect so strong that if it is disregarded, the film may be over exposed.

To solve the above problem, there have been proposed devices which, when a photograph is taken with flash light, take the light intensity of ambient light and the flash light into consideration. One such device is disclosed in U.S. Pat. Re. No. 28,025 to Tomoji MURATA et al. entitled "Automatic Control Device For Electronic Flash" and reissued May 28, 1974. According to this patent, ambient light intensity is previously measured. When the flash light is emitted, the reflected light from the object is incessantly measured and integrated. When the integrated level comes into a predetermined relation with the information of previously measured ambient light intensity, shutter speed, aperture value, and film sensitivity capable of providing a proper exposure on the film surface, the flash light is cut off. The device of MURATA et al., however, can not previously set or predict the flash light amount. The flash light amount can not be determined and known till the completion of the flashing operation.

Another device is disclosed in U.S. Pat. No. 3,836,920 to Takashi UCHIYAMA et al. entitled "Exposure Control System For Flash Photography" and issued Sept. 17, 1974. According to this patent, a ratio of contrast under the ambient light between the primary photographic object and secondary photographic object (background) is measured, before taking a photograph, and a ratio of distance to the object between the primary and secondary is set. When either one of shutter speed or flash light amount is set, the other will be automatically controlled in such a manner as to set the contrast ratio equal to 1. The diaphragm value is also controlled to expose the film with a proper light intensity. A similar device is disclosed in U.S. Pat. No. 4,188,104 to Takashi UCHIYAMA et al. entitled "Automatic Control Device For Electronic Flash" issued Feb. 12, 1980. In this patent, a procedure similar to that disclosed in U.S. Pat. No. 3,836,920 is carried out except for one difference. The difference is that the distance to the secondary object is presumed to be infinite. The above two patents measure the contrast between the primary and secondary objects, the ratio therebetween is designed to be always set to 1, though such a ratio "1" is not believed to be always good. Further, inputs and arithmetic procedures would be complex.

A further device is disclosed in U.S. Pat. No. 4,079,389 to Akihiko HASHIMOTO et al., entitled "Daytime Strobo Apparatus For Cameras With Electric Shutters" and issued Mar. 14, 1978. According to this patent, an integrator is employed which starts to integrate light intensity of the object by means of a TTL system when the shutter is opened. When the integrated value reaches the first predetermined value which is determined in accordance with a set lighting contrast, flash light is emitted. Thereafter, when the integrated value reaches the second predetermined value, the flash light is cut off and the shutter is closed. Since the light intensity is measured by means of the TTL system with the diaphragm being stopped down, the information of the diaphragm value is included in the information obtained by the light measuring operation. This device also fails to foresee information of the flash light amount prior to the taking of the photograph.

In case of the above mentioned prior art, all the devices do not process the logarithmically converted value of the signals, but process linear values of the signals. Therefore, a wide dynamic range cannot be possible unless there is an undesirable increase of the source voltage.

SUMMARY OF THE INVENTION

Accordingly, an important object of the present invention is to provide an exposure control system for a photography operation under flash and ambient light which takes into account the ratio of participation of flash and ambient lights in the exposure.

Another important object of the present invention is to provide an exposure control system which can foresee the information of flash light amount.

A further important object of the present invention is to provide an exposure control system in which the inputs and arithmetic procedures are simplified.

Yet another important object of the present invention is to provide an exposure control system in which the signals are processed in logarithmic forms.

In accordance with a feature of the present invention, an exposure control system for a photography operation under an ambient light and a flash light comprises first means for controlling an exposure time, second means for controlling an aperture size, and third means for controlling an amount of flash light to be emitted. The system further comprises means for measuring an intensity of the ambient light, and means for setting a film sensitivity and two of the exposure time, the aperture size and the flash light amount to govern the corresponding two of the three control means. A calculating means is provided for calculating the other of the exposure time, aperture size and the flash light amount in response to the measuring means and the setting means. Furthermore, a governing means is provided for governing the other of the controlling means in response to the calculating means.

According to another feature of the present invention, an exposure control system for a photography operation under an ambient light and a flash light comprises first means for controlling an exposure time, second means for controlling an aperture size, and third means for controlling an amount of flash light to be emitted. The system further comprises means for measuring an intensity of the ambient light, first means for setting a film sensitivity and one of the exposure time, the aperture size and the flash light amount to govern the corresponding one of the three control means, and second means for setting a ratio of the flash light amount to the amount of the ambient light integrated during the exposure time. A calculating means is provided for calculating the others of the exposure time, the aperture size and the flash light amount in response to the measuring means, the first setting means and the second setting means. Furthermore, a governing means is provided for governing the others of the controlling means in response to the calculating means.

According to a further feature of the present invention, an exposure control system for a photography operation under an ambient light and a flash light comprises first means for controlling an exposure time, second means for controlling an aperture size, and third means for controlling an amount of flash light to be emitted. The system further comprises means for measuring an intensity of the ambient light, first means for setting a film sensitivity and one of the exposure time, the aperture size and the flash light amount to govern the corresponding one of the three control means, and second means for setting a ratio of the amount of the ambient light integrated during the exposure time to the sum of the ambient light amount and the flash light amount integrated during the exposure time. A calculating means is provided for calculating the others of the exposure time, the diaphragm size and the flash light amount in response to the measuring means, the first setting means and the second setting means. Furthermore, a governing means is provided for governing the others of the controlling means in response to the calculating means.

In the above features, the flash light amount is determined by the distance to the object or by the measurement of flash light reflected back from the object according to the present invention.

BRIEF DESCRIPTION OF THE DRAWINGS

The foregoing and other objects, features and advantages of the invention will be apparent from the following description of the invention with reference to the accompanying drawings in which:

FIGS. 21 to 26 are block diagrams each showing the calculation carried out in a calculator employed in the exposure control system of FIG. 20 under different conditions;

FIG. 28 is a block diagram for calculating a ratio of brightness between two different locations;

FIG. 29 is a diagram similar to FIG. 28, but showing a modification thereof;

FIG. 31 is a block diagram for converting the light measuring signal obtained in the reflected light measurement system into a signal in the incident light measurement system;

FIGS. 32 to 35 are block diagrams each showing the calculation carried out in a calculator employed in the exposure control system of FIG. 30 under different conditions;

FIGS. 43 to 45 are block diagrams showing details of various calculators employed in the input unit of FIG. 42;

FIG. 55 is a block diagram showing details of processor employed in the exposure control system of FIG. 54; and FIG. 56 is a schematic view showing the arrangement of light receiving elements employed in a camera.

DETAILED DESCRIPTION OF THE INVENTION

First Embodiment

Figure 1:
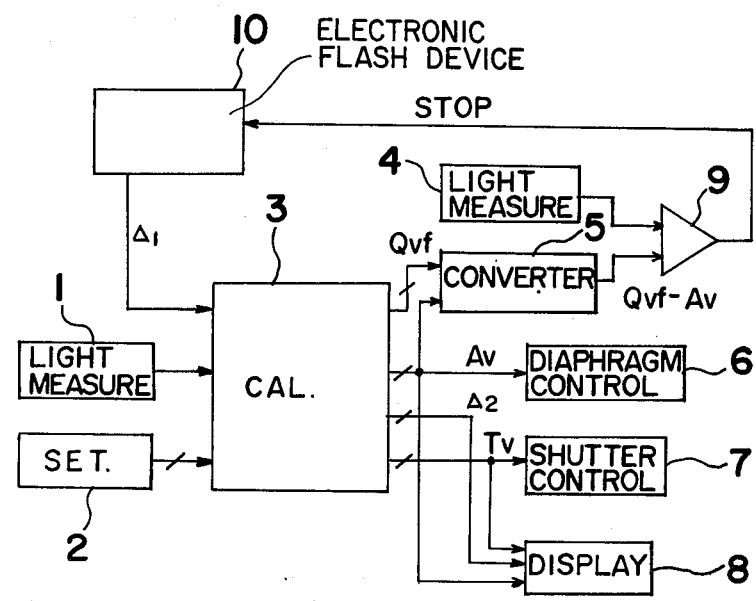
FIG. 1 is a block diagram of an exposure control system of the present invention according to the first basic structure of the first embodiment.

Before the description of the first embodiment of the present invention proceeds, the principle of the first embodiment will be described. A ratio of effects on a photographic object, between flash light and ambient light, or a ratio of light quantity represented in an apex system, between the flash and the ambient light during the exposure time is referred to as a lighting contrast. Namely, the lighting contrast is equivalent to the difference between the light quantity of the flash light represented in an apex system and the light quantity of the ambient light represented in an apex system. Thus, the lighting contrast $\Delta 1$ can be given by $$\Delta 1 = Qvf - (Bv - Tv) \tag{1}$$

wherein Qvf is a quantity of light emitted from electronic flash device and represented in an apex system, Bv is brightness of the photographic object represented in the apex system, and Tv is exposure time represented in apex system.

If the lighting contrast $\Delta 1$ and the exposure time Tvs are set and the brightness Bv of the object is given, the following equation can be given:

$$Qvf = \Delta 1 + (Bv - Tvs) \tag{1-1}$$

Also, a proper diaphragm value Avx for the above described situation can be given as follows.

$$2^{Sv} \cdot (2^{Qvf} + 2^{Bv-Tvs}) = 2^{Avx} \tag{2}$$

wherein Sv is film sensitivity. The equation (2) can be varied, using the (1-1) equation, as follows.

$$2^{Sv} \cdot (2^{Qvf} + 2^{Qvf - \Delta 1}) = 2^{Avx} \tag{2-1}$$

The logarithms of both sides of the above equation (2-1) provide the following equation.

$$Avx = Qvf + Sv + \log_2(1 + 2^{-\Delta 1}) \tag{3}$$

Accordingly, when the exposure time Tvs and the lighting contrast $\Delta 1$ are set, the quantity Qvf of the light can be obtained from the above equation (1-1). Then, since $\log_2(1 + 2^{-\Delta 1})$ can be obtained if the lighting contrast $\Delta 1$ is given, the proper diaphragm value Avx is obtained when $\log_2(1 + 2^{-66\ 1})$, flash light quantity Qvf and film sensitivity Sv are added together.

Also, by using the set exposure time Tvs and set diaphragm value Avs, it is preferable to display the difference between the proper diaphragm value Aux obtained from the above equation (3) and the set diaphragm value Avs.

Next, when the diaphragm value Avs is set, a relation $$2^{Sv} \cdot (2^{Qvf} + 2^{Bv-Tvx}) = 2^{Avs} \tag{2-2}$$

is obtained, in which Tvx represents a proper exposure time for this situation. Furthermore, since $$\Delta 1 = Qvf - (Bv - Tvx), \tag{1-2}$$

the equation (2-2) can be expressed as follows;

$$2^{Sv} \cdot (2^{Qvf} + 2^{Qvf - \Delta 1}) = 2^{Avs} \tag{2-3}$$

The logarithms of the both sides of the equation (2-3) are $$Qvf = Avs - Sv - \log_2(1 + 2^{-\Delta 1}) \tag{4}$$

Also, the proper exposure time Tvx can be obtained from the following equation.

$$Tvx = \Delta 1 + Bv - Qvf \tag{1-3}$$

Next is the situation when the quantity of light Qvf emitted by the electronic flash is set. In this situation, if the exposure time Tvs is set the lighting contrast can be given by $$\Delta 1 = Qvf - (Bv - Tvs) \tag{1-4}$$

and by using the obtained $\Delta 1$, the above equation (3) is obtained. Also, when the exposure time Tvs and the diaphragm value Avs are both set, the proper diaphragm value Avx can be obtained from the above equation (3) to display the difference between the proper diaphragm value Avx and the set diaphragm value Avs. When the diaphragm value Avs is set, an equation (2) is expressed as, $$2^{Sv} \cdot (2^{Qvf} + 2^{Bv - Tvs}) = 2^{Avs} \tag{2-2}$$

The proper diaphragm value Avf for the photograph under the flash light only (no ambient light) can be obtained from the equation as follows;

$$Avf = Qvf + Sv \tag{5}$$

Then, $$\Delta 3 = Avs - Avf \tag{6}$$

can be obtained. By using this value $\Delta 3$, the equation (2-2) can be rearranged as follows, $$2^{Bv + Sv - Tvx} = 2^{Avs} \cdot (1 - 2^{-\Delta 3}) \tag{2-4}$$

The logarithms of the equation (2-4) are as follows.

$$Tvx = Bv + Sv - Avs - \log_2(1 - 2^{-\Delta 3}) \tag{7}$$

Thus, the equation $$\Delta 1 = Qvf - (Bv - Tvx) \tag{1-2}$$

provides the lighting contrast $\Delta 1$.

In the case of the so-called program shutter camera of a type where the combination of the exposure time Tv and the diaphragm Av is automatically determined on the base of the brightness Bv of the photographic object, the same calculation procedure as that in a case where the Tvs is set will be performed on the assumption that only the exposure time Tvs is set.

Now, the first embodiment of the invention is described with reference to FIGS. 1 to 19. In the drawings, a line with a crossing virgule should be interpreted as a symbol of a plurality of lines carrying a plurality of bits of digital data.

FIG. 1 is a block diagram of an electric circuit and showing the basic construction. A reference numeral 1 designates a light measuring circuit for measuring the ambient light. A numeral 2 designates a setting apparatus for setting an exposure controlling value, and a numeral 3 a calculation circuit. A numeral 4 is an integration type light measuring circuit for measuring only the quantity of light emitted from the electronic flash device. A numeral 5 is a signal converting circuit, and a numeral 6 is a diaphragm controlling apparatus. A numeral 7 is a shutter controlling apparatus. A numeral 8 is a display apparatus, a numeral 9 is a comparator, and a numeral 10 is an electronic flash device.

When a signal corresponding to the lighting contrast Δ1 being set by the lighting contrast setting apparatus (not shown) is transferred from the electronic flash device 10 to the calculation circuit 3, this signal is calculated, in accordance with the above equations, together with signals from the light measuring circuit 1 and the apparatus for setting the exposure controlling device 2 to provide the values of quantity of light Qvf emitted from the electronic flash device, the exposure time Tv and Δ2 from the calculation circuit 3. Here, the value Δ2 indicates the difference between the set diaphragm value Avs and a proper diaphragm value Avx which is obtained from the calculation using the set exposure time Tvs. It is to be noted that the exposure time Tvs, as well as the diaphragm value Avs, is inputted to the device through manual setting. The output signals from the calculation circuit 3 are displayed by the display apparatus 8, and are applied to the diaphragm controlling apparatus 6 and the shutter controlling apparatus 7 to control the diaphragm and the shutter speed.

Now, the control of the quantity of light emitted from the electronic flash device 10 will be described. A light receiving element (not shown) provided in association with the light measuring circuit 4 is so disposed as to receive light reflected from the film face (not shown). When the light quantity of the electronic flash device 10 is Qvf and when the diaphragm is Av, the quantity of light that reaches the light receiving element can be expressed as Qvf−Av.

Then, analog signals corresponding to the Qvf−Av are produced, from the signal converting circuit 5 for the comparison with the output signals from the light measuring circuit 4, in the comparator 9. When both signals satisfy a predetermined relationship between them, the output from the comparator 9 is converted from negative to positive or vice versa. Then, emitted light from the electronic flash device 10 stops.

Figure 2:
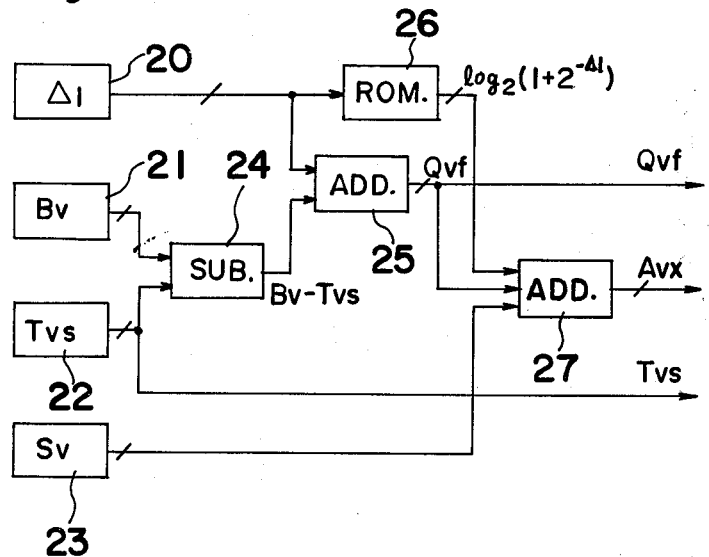
FIGS. 2 to 4 are block diagrams each showing the calculation carried out in a calculator employed in the exposure control system of FIG. 1 under different conditions.

FIG. 2 is a block diagram of the calculation circuit 3 of FIG. 1. The calculation circuit 3 may be employed in a camera of a type where the exposure time Tv is manually set. In FIG. 2, reference numeral 20 designates a register in which lighting contrast Δ1 is set, a reference number 21 designates a register in which the brightness Bv of the ambient light can be set, and a numeral 22 designates a register in which the exposure time Tvs can be set. A numeral 23 is a register in which the film sensitivity Sv can be set.

A subtraction circuit 24 is provide for carrying out a calculation Bv−Tvs, using signals from the registers 21 and 22. The calculation of $$Qvf = \Delta 1 + (Bv - Tvs) \tag{1-1}$$

is performed, in an adding circuit 25, using the signal from the subtraction circuit 24 and the signal from the register 20. The sum obtained from the adding circuit 25 is identical to the quantity of the emitted light from the electronic flash device.

When an address of an ROM 26 is designated in accordance with the signal from the register 20, data stored in the designated address of the ROM 26, which corresponds to $\log_2(1+2^{-\Delta 1})$, is read out. Then, in an adding circuit 27, $$Avx = Qvf + Sv + \log_2(1+2^{-\Delta 1}) \tag{3}$$

is performed, using the signal from the adding circuit 25 and the signal from the register 23 to calculate the proper diaphragm value Avx.

Figure 3:
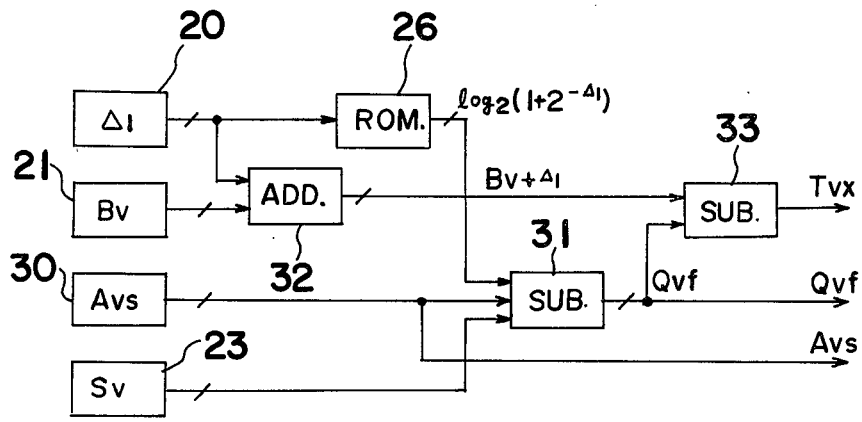

FIG. 3 is a block diagram of another calculation circuit 3 which may be employed in a camera of a type where the diaphragm value Avs is manually set. In FIG. 3, a reference numeral 30 designates a register for setting the diaphragm value Avs.

According to the arrangement of FIG. 3, the data corresponding to the $\log_2(1+2^{-\Delta 1})$ is read out from the ROM 26 in a manner similar to that described above in connection with FIG. 2. The calculation of $$Qvf = Avs - Sv - \log_2(1+2^{-\Delta 1}) \tag{4}$$

is carried out in the subtraction circuit 31, using the data read out from the ROM 26, the signal from the register 30 and the signal from the register 23 to obtain the emitted light quantity Qvf from the electronic flash device 10. The calculation of Bv+Δ1 is performed, in an adding circuit 32, using the signal from the registers 20 and 21. Similarly, the calculation of $$Tvx = Bv + \Delta 1 - Qvf \tag{1-3}$$

is performed in a subtraction circuit 33, using the output signal from the adding circuit 32 and the signal from the subtraction circuit 31 to obtain the proper exposure time Tvx.

Figure 4:
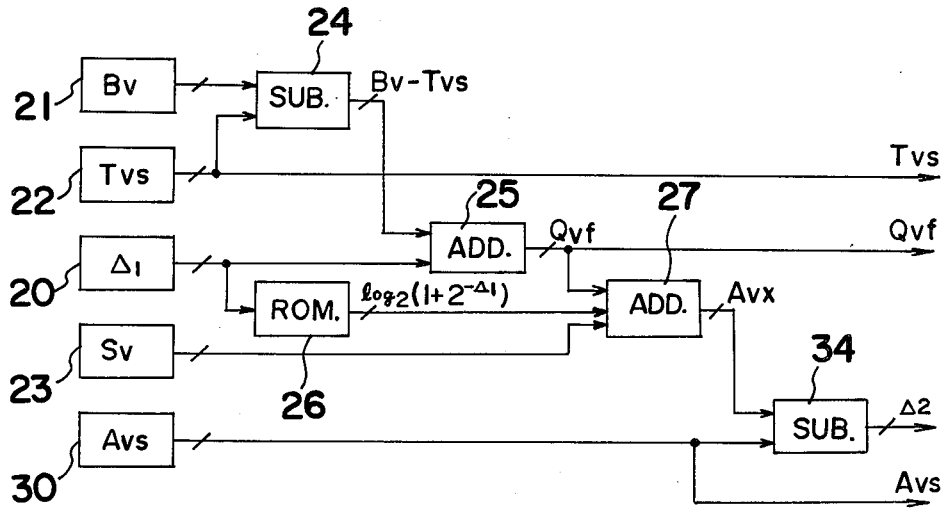

FIG. 4 is a block diagram of a further calculation circuit 3 which may be employed in a camera of a type where the diaphragm value Avs and the exposure time Tvs are manually set. According to the calculation circuit 3 of FIG. 4, the emitted light quantity Qvf of the electronic flash device 10 and the proper diaphragm value Avx are calculated, respectively, in the addition circuit 25 and the addition circuit 27, in a manner similar to that carried out in FIG. 2.

The above described Δ2=Avs−Avx is calculated in a subtraction circuit 34, using data corresponding to the calculated diaphragm value Avx and the set diaphragm value Avs.

It is to be noted that in the arrangement of FIGS. 2 to 4, the same parts are designated by the same reference numerals.

Figure 5:
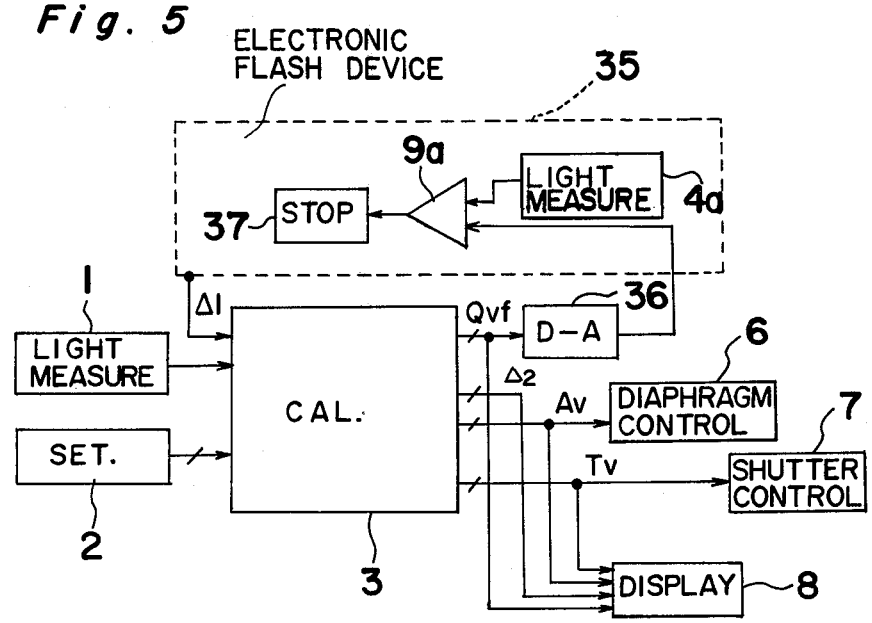
FIG. 5 is a block diagram of an exposure control system of the present invention according to the second basic structure of the first embodiment.

FIG. 5 is a block diagram showing a second basic structure of the first embodiment. The data corresponding to the emitted light quantity Qvf of an electronic flash device 35 produced from the calculation circuit 3 is converted into analog signals by a D-A converter 36. The analog signals obtained from the converter 36 are applied to the electronic flash device 35 and are transmitted together with the signals obtained from a light measuring circuit 4a to a comparator 9a and a light emission stop circuit 37, for controlling the light quantity emitted from the electronic flash device.

In the case where the light receiving element provided in the light measuring circuit 4 of FIG. 1 is disposed at a position capable of receiving the photographic object light which does not pass through the photographing diaphragm, the data corresponding to the emitted light quantity Qvf of the electronic flash device 35 should preferably be applied to one of the input terminals of the comparator 9, in a manner similar to that of the arrangement of FIG. 5.

Figure 6:
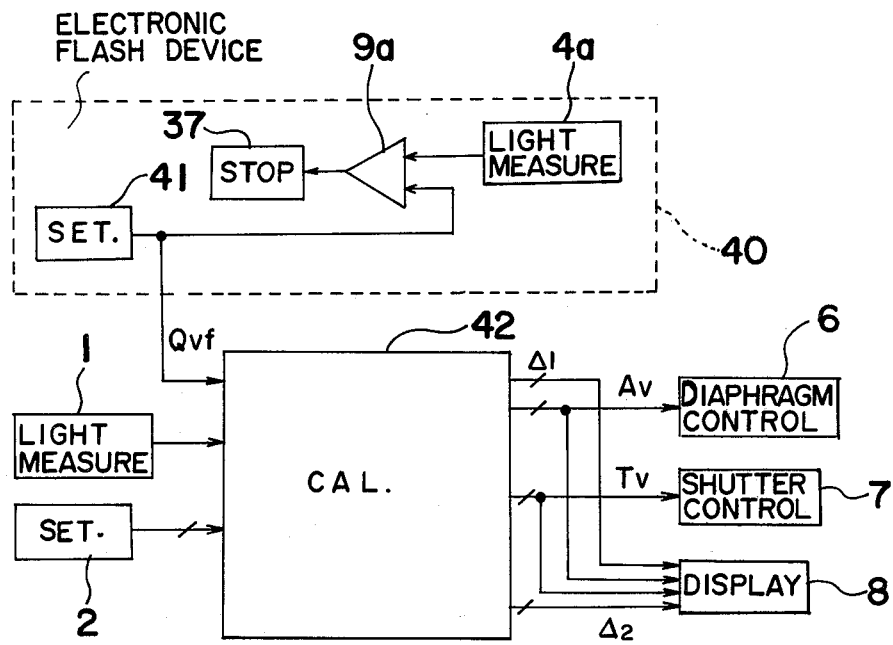
FIG. 6 is a block diagram of an exposure control system of the present invention according to the third basic structure of the first embodiment.

FIG. 6 is a block diagram showing a third basic structure of the first embodiment. An electronic flash device 40 is provided with a setting circuit 41 for outputting a signal corresponding to the emitted light quantity Qvf. And the lighting contrast $\Delta 1$ is adapted to be calculated, by a calculation circuit 42, using the data corresponding to the emitted light quantity Qvf from the emitted-light-quantity setting circuit 41, the measured value of ambient light from the light measuring circuit 1 and the exposure controlling value from the exposure control value setting apparatus 2. Furthermore, the signal from the emitted-light-quantity setting circuit 41 is applied to one of the input terminals of the comparator 9a and the signal from a light measuring circuit 4a is applied to the other input terminal, to control the light quantity Qvf to the set value.

Figure 7:
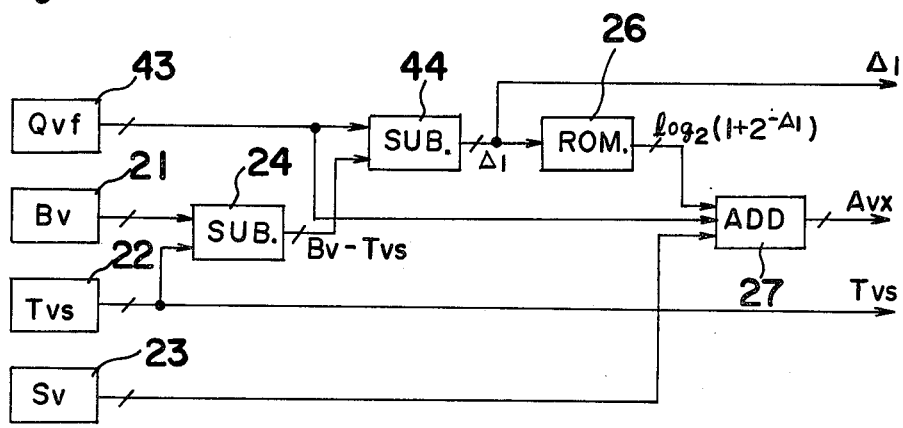
FIGS. 7 to 9 are block diagrams each showing the calculation carried out in a calculator employed in the exposure control system of FIG. 6 under different conditions.

FIG. 7 is a block diagram of a calculation circuit 42 of FIG. 6. The calculation circuit 42 may be employed in a camera of a type where the exposure time Tvs can be set. In FIG. 7, the same reference characters are given to the same components as in FIG. 2, FIG. 3 and FIG. 4. A numeral 43 designates a register for setting a signal corresponding to the emitted light quantity Qvf from an electronic flash device 40.

The calculation of Bv−Tvs is performed in the subtraction circuit 24 using the signals from registers 21 and 22. The result of this calculation is applied to a subtraction circuit 44, in which $$\Delta 1 = Qvf - (Bv - Tvs) \tag{1-4}$$

is performed using the signal from a register 43. Thus, the lighting constrast $\Delta 1$ is obtained.

When the data corresponding to the lighting contract $\Delta 1$ designates an address of ROM 26, a data corresponding to the $\log_2(1+2^{-\Delta 1})$ stored in the designated address of the ROM 26 is read out. The read out information is applied to the adding circuit 27, in which $$Avx = Qvf + Sv + \log_2(1 + 2^{-\Delta 1}) \tag{3}$$

is performed using signals from registers 23 and 43. Thus, a proper diaphragm value Avx is obtained.

Figure 8:
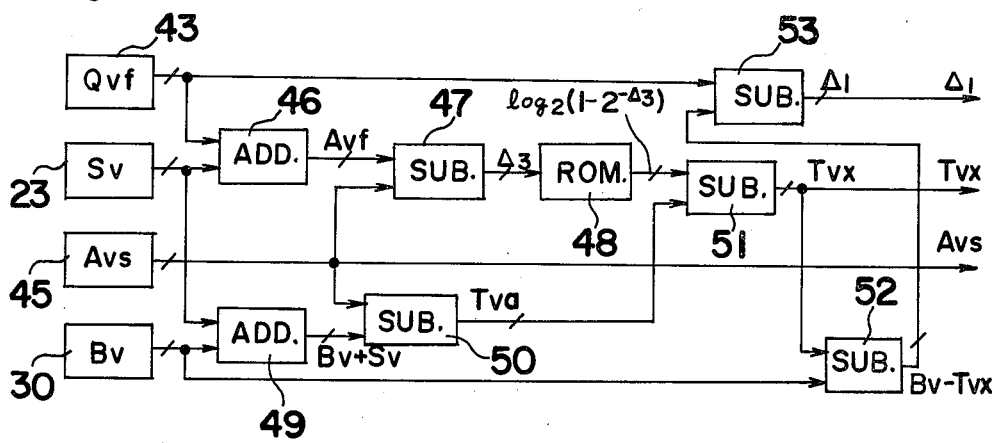

FIG. 8 is a block diagram of another calculation circuit 42 shown in FIG. 6. The circuit 42 may be employed in a camera of a type where the diaphragm value Avs can be set. In an adding circuit 46, $$Avf = Qvf + Sv \tag{5}$$

is calculated using the signals from registers 23 and 43. Then, in a subtraction circuit 47, $$\Delta 3 = Avs - Avf \tag{6}$$

is calculated using the data produced from the adding circuit 46 and signal from a register 45. In accordance with the output obtained from the subtraction circuit 47, i.e., the data corresponding to the calculated result $\Delta 3$, an address of ROM 48 is designated to read the data corresponding to $\log_2(1-2^{-\Delta 3})$ stored in the designated address of ROM 48. In the meantime, the calculation $$Tva = Bv + Sv - Avs \tag{8}$$

is performed in an adding circuit 49 and a subtraction circuit 50, using the signals from registers 23, 45 and 30. Then, the calculation of $$Tvx = Tva - \log_2(1 - 2^{-\Delta 3}) \tag{7-1}$$

is performed in a subtraction circuit 51 using the data obtained from the subtraction circuit 50 and the data read out from the ROM 48 to calculate proper exposure time Tvx. Also, the calculation of $$\Delta 1 = Qvf - (Bva - Tvx) \tag{1-2}$$

is carried out in a subtraction circuit 52 and a subtraction circuit 53 to obtain the lighting constrast $\Delta 1$.

Figure 9:
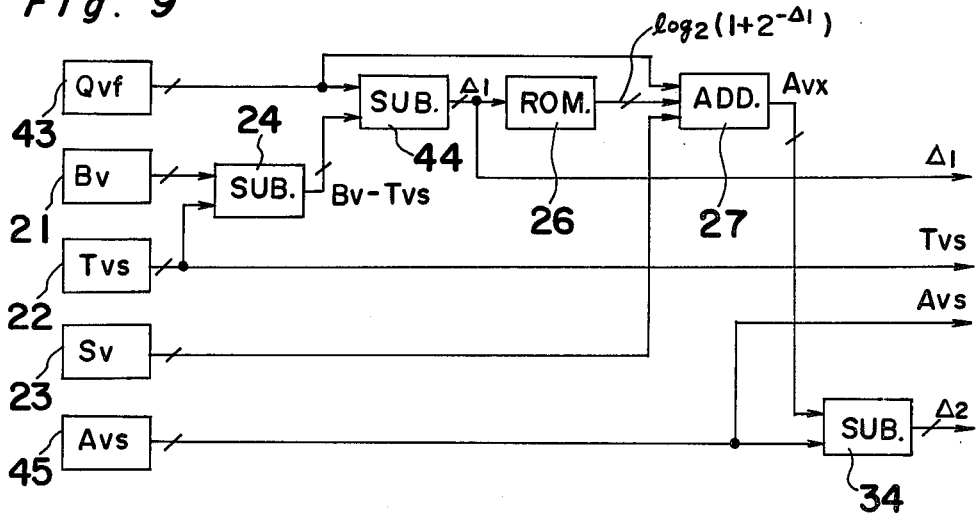

FIG. 9 is a block diagram of another calculation circuit 42 of FIG. 6. The calculation circuit 42 may be employed in a camera of a type where the diaphragm value Avs and the exposure time Tvs can be set. In the circuit of FIG. 9, the proper aperture value Avx and the lighting constrast $\Delta 1$ are calculated in the adding circuit 27 and subtraction circuit 44, in a manner similar to that described above in connection with FIG. 7. According to the arrangement of FIG. 9, $$\Delta 2 = Avs - Avx$$

is calculated in the subtraction circuit 34 using the signal from the register 45 and the data from the adding circuit 27.

As described above, since the lighting contrast $\Delta 1$ is automatically calculated using the set light quantity Qvf for the electronic flash device 40 in the calculation circuit 42 of in FIG. 6, and is displayed in the display apparatus 8, the photographer can easily recognize the lighting contrast $\Delta 1$ before taking a photograph.

When the arrangement of FIG. 1 and FIG. 5 is applied to the above-described program shutter camera, the calculation circuit 3 takes the circuit structure of FIG. 2, and when the arrangement of FIG. 6 is applied to the same, the calculation circuit 42 takes the circuit structure of FIG. 7.

Figure 10:
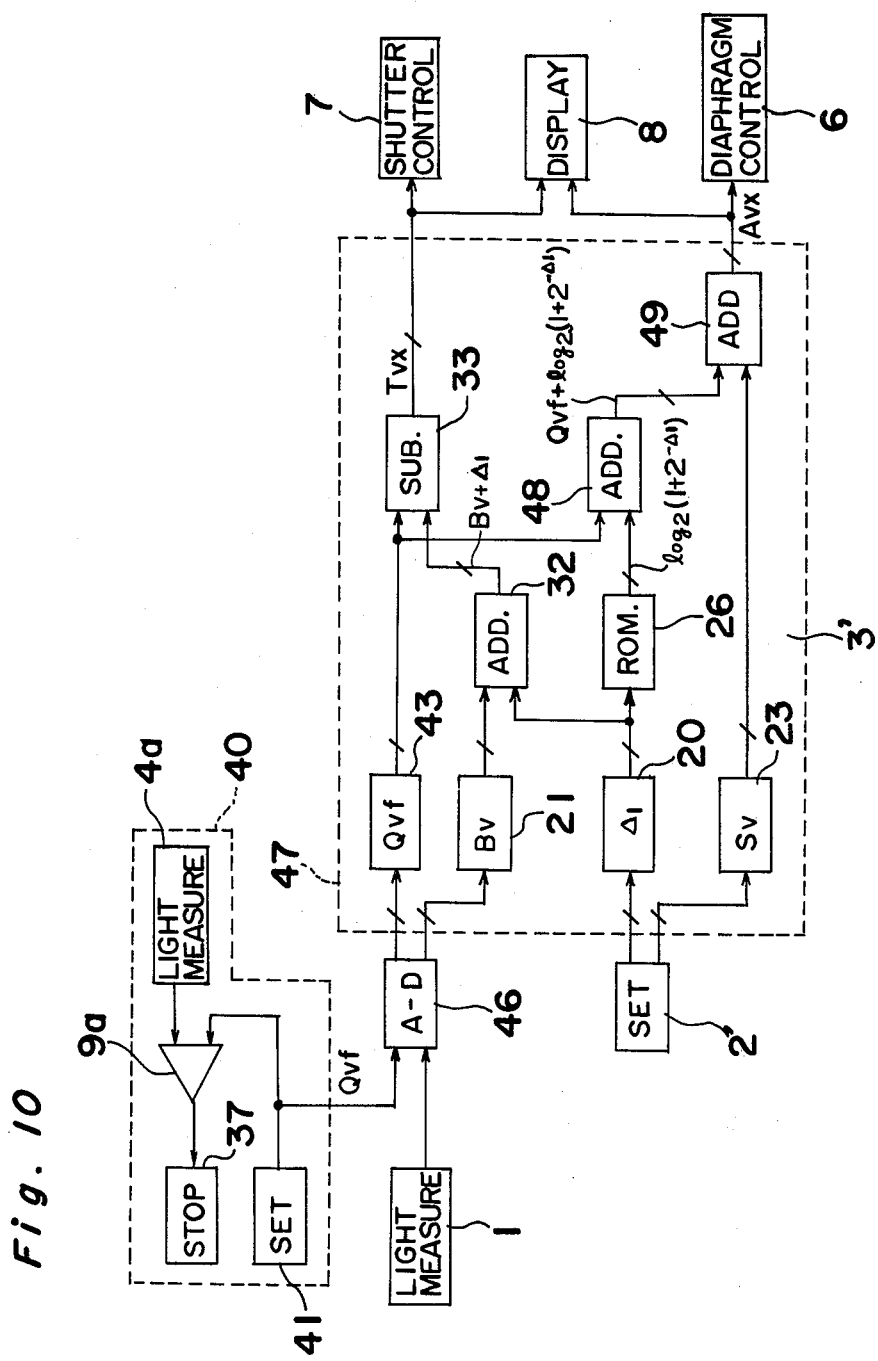
FIG. 10 is a block diagram of an exposure control system of the present invention according to the fourth basic structure of the first embodiment.

FIG. 10 is a block diagram showing a fourth basic structure of this embodiment. This structure provides information of proper exposure time Tvx and proper diaphragm value Avx using the brightness Bv of the ambient light and the film sensitivity Sv together with set light quantity Qvf for the electronic flash device 40 and set lighting constrast $\Delta 1$.

First, an analog signal corresponding to set light quantity Qvf obtained from the emitted light quantity setting circuit 41 for the electronic flash device 40 and an analog signal corresponding to the brightness Bv of the ambient light from the light measuring circuit 1 are converted into digital signals in the A-D converter 46 and in turn, are taken into the registers 43 and 21 of the calculation circuit 47. Also, the data of set lighting contrast Δ1 from the setting apparatus 2' and the data of the film sensitivity Sv are respectively taken in into the registers 20 and 23.

Then, the calculation of $$Tvx = \Delta 1 + Bv - Qvf \quad (1\text{-}3)$$

is performed in the adding circuit 32 and the subtraction 33 to obtain proper exposure time Tvx. The data Tvx thus obtained is inputted to the shutter control apparatus 7 and the display apparatus 8 to control and display the shutter speed.

TABLE 1

| Hexa-Decimal | Brightness Bv | Film Sensitivity ASA | Sv | Diaphragm value FNO | Av | Exposure Time Second | TV | Emitted Light Degree QV | Lighting Contrast Δ1 |
|---|---|---|---|---|---|---|---|---|---|
| F8H | | | | | | | | 9 | 5 |
| F0H | | | | | | | | 8 | 4 |
| E8H | | | | | | | | 7 | 3 |
| E0H | | | | | | | | 6 | 2 |
| D8H | | | | | | | | 5 | 1 |
| D0H | | | | | | | | 4 | 0 |
| C8H | | | | | | | | 3 | −1 |
| C0H | | | | | | | | 2 | −2 |
| B8H | | | | | | | | 1 | −3 |
| B0H | | | | | | | | 0 | −4 |
| A8H | 13 | | | | | | | −1 | −5 |
| A0H | 12 | | | | | | | −2 | |
| 98H | 11 | | | | | | | −3 | |
| 90H | 10 | | | | | | | −4 | |
| 88H | 9 | | | | | | | −5 | |
| 80H | 8 | | | | | | 1/1000 | 10 | −6 |
| 78H | 7 | | | | | | 1/500 | 9 | |
| 70H | 6 | | | | | | 1/250 | 8 | |
| 68H | 5 | | | | 32 | 10 | 1/125 | 7 | |
| 60H | 4 | 6400 | 11 | 22 | 9 | 1/60 | 6 | | |
| 58H | 3 | 3200 | 10 | 16 | 8 | 1/30 | 5 | | |
| 50H | 2 | 1600 | 9 | 11 | 7 | 1/15 | 4 | | |
| 48H | 1 | 800 | 8 | 8 | 6 | ⅛ | 3 | | |
| 40H | 0 | 400 | 7 | 56 | 5 | ¼ | 2 | | |
| 38H | −1 | 200 | 6 | 4 | 4 | ½ | 1 | | |
| 30H | −2 | 100 | 5 | 28 | 3 | 1 | 0 | | |
| 28H | −3 | 50 | | 2 | 2 | 2 | −1 | | |
| 20H | −4 | 25 | | 14 | 1 | 4 | −2 | | |
| 18H | −5 | 12 | | | | 8 | −3 | | |
| 10H | −6 | | | | | 16 | −4 | | |
| 08H | | | | | | 32 | −5 | | |

TABLE 2

| Fraction Part | Lower 3 Bits | Fraction Part | Lower 3 Bits |
|---|---|---|---|
| 0/6 | 000 | 3/6 | 011 |
| 1/6 | 001 | 4/6 | 100 |
| 2/6 | 010 | 5/6 | 101 |

TABLE 3

| Δ1 | $1 + 2^{-\Delta 1}$ | $\log_2(1 + 2^{-\Delta 1})$ | Binary Digit numbering | Hexa-Decimal numbering |
|---|---|---|---|---|
| 5 | 1.03 | 0.04 | 0000 0000 | 00H |
| 4⅔ | 1.04 | 0.06 | 0000 0000 | 00H |
| 4⅓ | 1.05 | 0.07 | 0000 0000 | 00H |
| 4 | 1.06 | 0.09 | 0000 0000 | 00H |
| 3⅔ | 1.08 | 0.11 | 0000 0000 | 00H |
| 3⅓ | 1.10 | 0.14 | 0000 0001 | 01H |
| 3 | 1.13 | 0.17 | 0000 0001 | 01H |
| 2⅔ | 1.16 | 0.21 | 0000 0001 | 01H |
| 2⅓ | 1.20 | 0.26 | 0000 0010 | 02H |
| 2 | 1.25 | 0.32 | 0000 0010 | 02H |
| 1⅔ | 1.32 | 0.40 | 0000 0010 | 02H |
| 1⅓ | 1.40 | 0.48 | 0000 0011 | 03H |

TABLE 3-continued

| Δ1 | $1 + 2^{-\Delta 1}$ | $\log_2(1 + 2^{-\Delta 1})$ | Binary Digit numbering | Hexa-Decimal numbering |
|---|---|---|---|---|
| 1 | 1.50 | 0.58 | 0000 0011 | 03H |
| ⅔ | 1.63 | 0.70 | 0000 0100 | 04H |
| ⅓ | 1.79 | 0.84 | 0000 0101 | 05H |
| 0 | 2.00 | 1.00 | 0000 1000 | 08H |
| −⅓ | 2.26 | 1.18 | 0000 1001 | 09H |
| −⅔ | 2.59 | 1.37 | 0000 1010 | 0AH |
| −1 | 3.00 | 1.58 | 0000 1011 | 0BH |
| −1⅓ | 3.52 | 1.82 | 0000 1101 | 0DH |
| −1⅔ | 4.17 | 2.06 | 0000 0000 | 10H |
| −2 | 5.00 | 2.32 | 0000 0010 | 12H |
| −2⅓ | 6.04 | 2.59 | 0001 0100 | 14H |
| −2⅔ | 7.35 | 2.88 | 0001 0101 | 15H |
| 3 | 9.00 | 3.17 | 0001 1001 | 19H |
| −3⅓ | 11.1 | 3.47 | 0001 1010 | 1AH |
| −3⅔ | 13.7 | 3.78 | 0001 1101 | 1DH |
| 4 | 17.0 | 4.09 | 0010 0000 | 20H |
| −4⅓ | 21.2 | 4.40 | 0010 0010 | 22H |
| −4⅔ | 26.4 | 4.72 | 0010 0101 | 25H |
| −5 | 33.0 | 5.04 | 0010 1000 | 28H |

In the meantime, the data $\log_2(1 + 2^{-\Delta 1})$ corresponding to the lighting contrast Δ1 from the register 20 is read out from the ROM 26 for the calculation of $$Avx = Qvf + Sv + \log_2(1 + 2^{-1}) \quad (3)$$

in the adding circuits 48 and 49, to calculate the proper diaphragm value Avx. The data corresponding to the diaphragm value Avx is sent to the diaphragm controlling apparatus 6 and the display apparatus 8 to control the diaphragm and to display the proper diaphragm value. Also, in the electronic flash device 40, the signal corresponding to the light quantity Qvf from the setting apparatus 41 and the output of the light measuring circuit 4a are discriminated whether or not they coincide with each other in the comparator 9a. When they coincide with each other, the stop circuit 37 stops the light emission of electronic flash device 40 to control the emitted light quantity Qvf.

Figure 11:
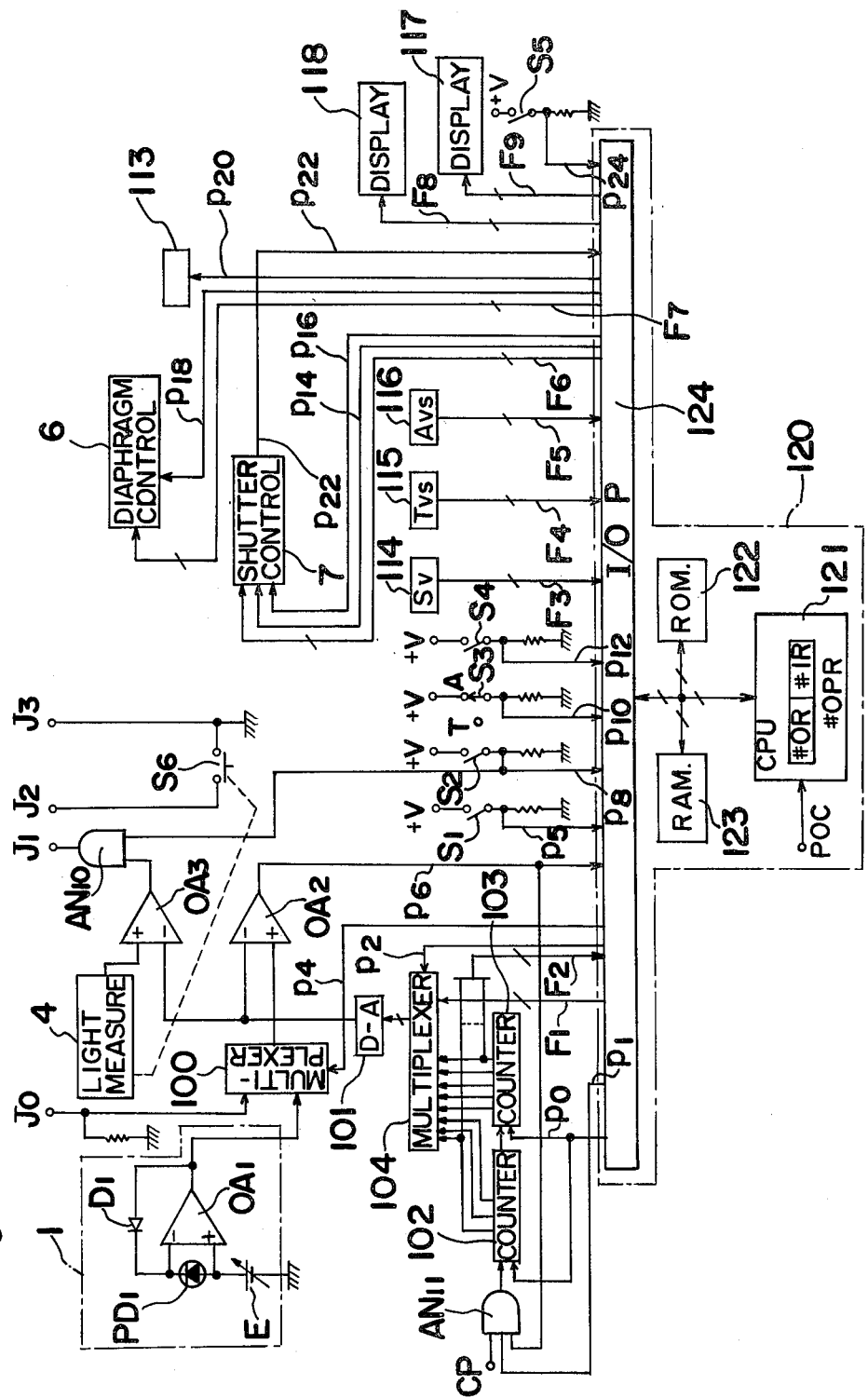
FIG. 11 is a circuit diagram of an exposure control system of the present invention according to the first embodiment.

FIG. 11 is a circuit diagram showing the parts to be employed in the camera side to accomplish the first embodiment. A camera (not shown) used here is a single lens reflex camera of the lens shutter type where the light emission of the electronic flash device 10 is synchronized to any exposure time.

The calculation carried out in the arrangement of FIG. 11 is carried out in an apex system. Each of the apex value is defined in Table 1. The lower three bits are processed by a numbering system with base 6, i.e., hexal numbering system, as shown in Table 2. Therefore the smallest unit of the apex value is 1/6 EV. The upper five bits are used for indicating integer part of the apex value, and the lower three bits are used for indicating the fraction part of the apex value with 1/6 EV being the smallest unit.

The lighting contrast $\Delta 1$ is set with the preciseness of $\frac{1}{8}$ EV. The values of the $\log_2(1+2^{-\Delta 1})$ with respect to various $\Delta 1$ are shown in Table 3. The digital data "00H" through "28H" corresponding to various values of the $\log_2(1+2^{-\Delta 1})$ are stored in the ROM at the addresses, one of which is designated in accordance with the value of $\Delta 1$.

Referring to FIG. 11, PD1 is a light receiving element, E is a variable voltage source for adjustment, OA1 is an operational amplifier, and D1 is a diode for logarithmic compression. They constitute a light measuring circuit 1 for the ambient light shown in FIG. 1. Jo is a terminal for receiving an analog signal corresponding to the lighting contrast $\Delta 1$, which is previously set in a circuit provided in the electronic flash device 10.

A reference numeral 100 is a multiplexer which selectively transmits the signal from either the operational amplifier OA1 or the terminal Jo in accordance with the signal from the terminal P4. OA2 is a comparator for converting analog to digital. A numeral 101 is a digital-analog converter. A numeral 102 is a hexal counter, and a numeral 103 is a thirty-second counter. A numeral 104 is a digital multiplexer which selectively transmits the signals from either the counters 102 and 103 or an output port F1 in accordance with the signal from the terminal P2. OA3 is a comparator which functions as comparator 9 shown in FIG. 1. J1 is a terminal connected to the output of AND circuit AN10 and produces a stop signal to the electronic flash device 10 (shown in FIG. 1) for stopping the light emission. J2 is a terminal for producing a start signal for starting the emission of flash light from the electronic flash device 10 upon turning on of a switch S6 effected when the shutter is fully open J3 is an earth terminal for connecting the earth of the electronic flash device 10.

A numeral 4 is a light measuring circuit for measuring the quantity of light only from the electronic flash device 10 (shown in FIG. 1). The light measuring circuit is described in detail below in connection with to FIG. 12.

Figure 12:
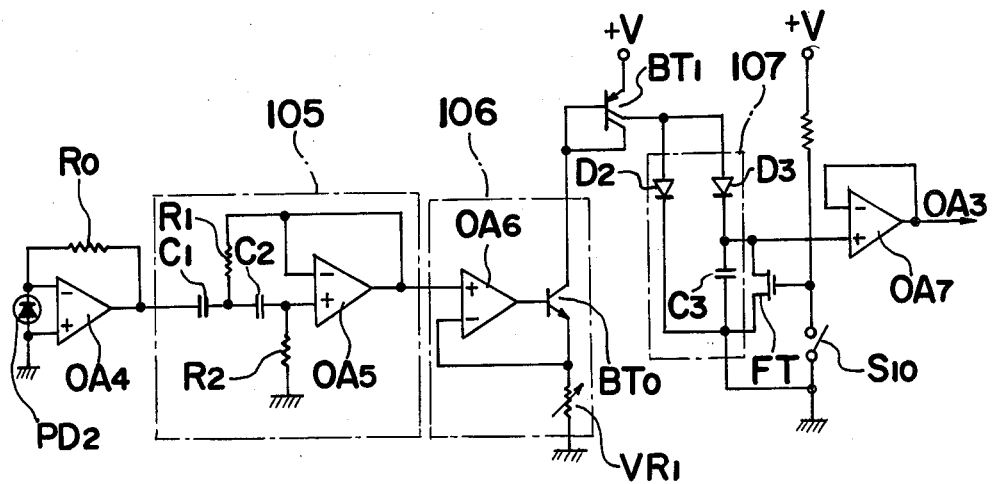
FIG. 12 is a circuit diagram of a light measuring circuit employed in the circuit of FIG. 11.

Referring to FIG. 12, PD2 is a light receiving element which is provided at a position capable of receiving light reflected from the film surface during the film being exposed. The circuit constituted of the light receiving element PD2, an operational amplifier OA4 and a feed-back resistor Ro produces voltage proportional to the output current of the light receiving element PD2.

A numeral 105 is a high-pass filter constituted of capacitors C1, C2, resistors R1, R2 and an operational amplifier OA5. The high-pass filter 105 passes ony the flash light emission component from the output voltage of the operational amplifier OA4. A numeral 106 is a voltage-current converting circuit constituted of an operational amplifier OA6, a variable resistor VR1 and a transistor BTo. The output current is adjusted by variable resistor VR1. A numeral 107 is a logarithmic compression integrating circuit constituted of diodes D2 and D3 connected to the collector of a current-mirror transistor BT1, and a capacitor C3. As disclosed in U.S. Pat. No. 3,574,443 to Yasuhiro Nanba, the voltage appearing across the capacitor C3 is identical to the logarithmically compressed value of the integer of the inflow current to the circuit 107.

FT is an N channel FET for discharging the capacitor C3. S10 is a switch that operates in association with the switch S6. OA7 is a buffer constituted of an operational amplifier, and its output is applied to the comparator OA3.

When switch S10 is closed at the moment when the electronic flash device 10 starts to light, the N channel FET(FT) is turned non-conductive to start charging the capacitor C3. Then, a voltage signal corresponding to ony the flash light emission component of the electronic flash device 10 produced from the high-pass filter 105 is converted into a current signal by the voltage-current converting circuit 106, and the converted current signal is applied through the current-mirror transistor BT1 to the logarithmically integrating circuit 107 for charging the capacitor C3. The charged voltage across the capacitor C3 in circuit 107 is applied to the positive terminal of the comparator OA3 through the buffer OA7 for comparison with the voltage at the negative terminal of the comparator OA3. When the voltages at the negative and positive terminals become the same, the output from the comparator OA3 is reversed from "Low" to "High". It is to be noted that the terms "Low" and "High" used herein indicates low level signal and high level signal, respectively. Thereupon, the electronic flash device 10 stops the emission of light.

Figure 13:
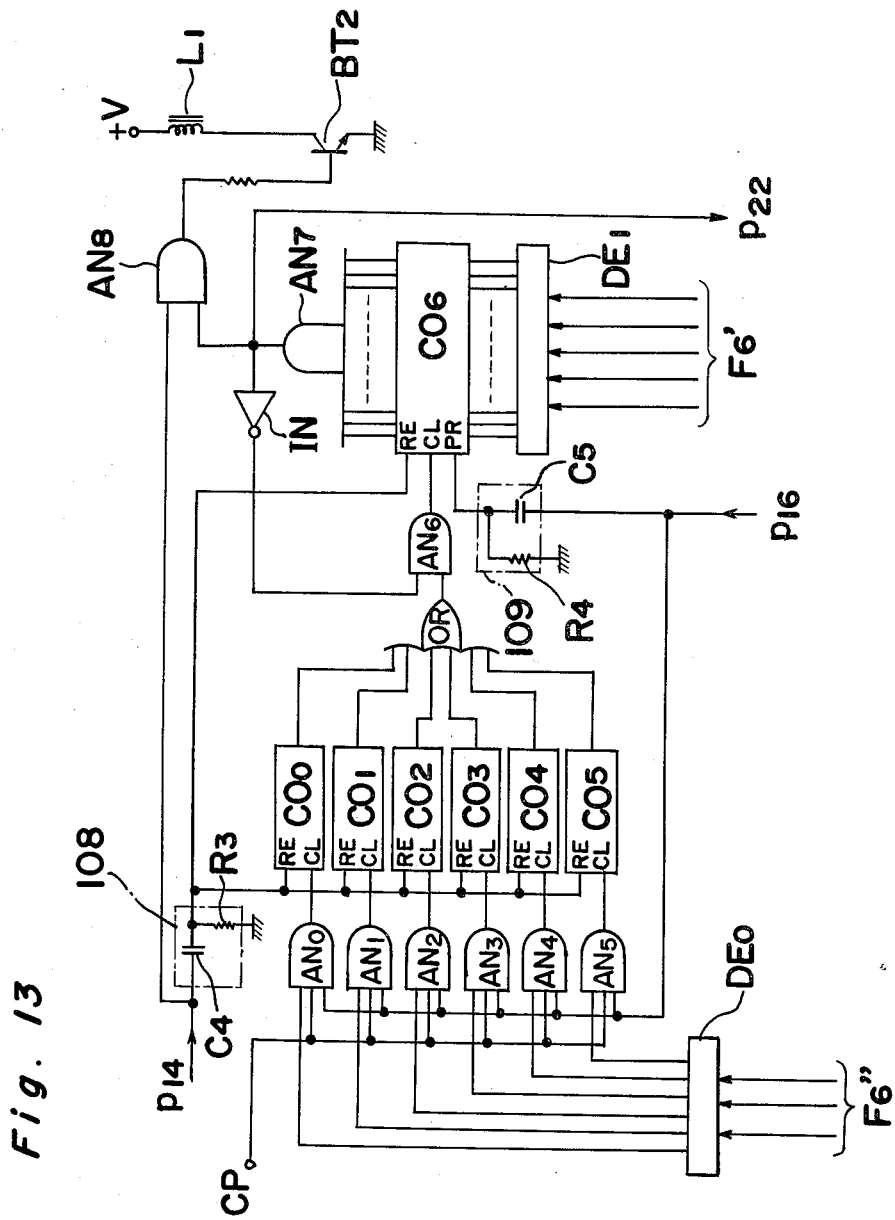
FIG. 13 is a circuit diagram of a shutter control apparatus employed in the circuit of FIG. 11.

Referring back to FIG. 11, a numeral 7 is a shutter control apparatus which is described in detail below. Referring particularly to FIG. 13, DE0 and DE1 are decoders, AN0, AN1, ..., AN5 are AND circuits, and a numeral 108 is a differential circuit constituted of a capacitor C4 and a resistor R3. $CO_0$, $CO_1$, ..., $CO_5$ are counters provided in association with the AND circuits AN0, AN1, ..., AN5. The counter $CO_0$ is so arranged that it produces one output signal for every 100 signals applied to it. Similarly, one output signal is produced from the counter $CO_1$ every 89 signals, the counter $CO_2$ every 79 signals, the counter $CO_3$ every 71 signals, counter $CO_4$ every 63 signals, and the counter $CO_5$ every 56 signals. Accordingly, frequency dividing ratios of an input clock pulse Cp are $2^0:2^{-1/6}:2^{-2/6}:2^{-4/6}:2^{-5/6} \doteq 100:89:79:71:63:56$ in accordance with the fraction part of the apex value of exposure time Tvs.

$CO_6$ is a presetable down-counter connected through an OR circuit OR and an AND circuit AN6 to the counters $CO_0$, $CO_1$, ..., $CO_5$. The preset input terminal of the down-counter $CO_6$ is connected to the output terminal of the decoder DE1. The inverting output terminal of the down counter $CO_6$ is connected through an AND circuit AN7 to an AND circuit AN8. A numeral 109 is a differential circuit, and IN is an inverter. L1 is a plunger coil connected to the collector of a transistor BT2 for controlling the shutter. When the coil L1 is energized, the core mounted inside the plunger moves against the spring force to close the shutter, and when the power to the coil L1 is cut off, the core returns to its inserted position by the spring force to open the shutter.

Accordingly, upon inversion of the output signal from terminal p14 from "Low" to "High", the counters $CO_0$, $CO_1$, ..., $CO_5$, $CO_6$ are reset by a signal produced from the differential circuit 108. Thereupon, all the inverting output terminals of the counter $CO_6$ turn turns to "High", and the output of the AND circuit AN7 turns to "High". As a consequence, the terminal p14 and the output of the AND circuit AN8 produce "High" to energize coil L1 and to close the shutter.

Thereafter, when the signal from a terminal p16 is changed from "Low" to "High", a signal from decoder DE1 is preset by a signal from the differential circuit 109. Thus, not all the inverting outputs of the counter $CO_6$ hold "High" and the output of the AND circuit AN8 produces "Low" to cut off the current to the coil L1 to open the shutter. It is to be noted that the data which will be preset by the counter $CO_6$ presents "1" for its lowermost bit, and "0" for the other bits in the case where an input signal F6' to the decoder DE1, i.e. the integer part of the apex value of the exposure time Tvs, is "10000". It is also to be noted that when the integer part is "01111", the data presents "1" for the second bit from the lowermost digit and presents "0" for the other bits, and when the integer part is "01110", the data presents "1" for the third bit from the lowermost digit and presents "0" for the other bits. Further, when the integer part is "00001", the uppermost bit represents "1" and "0" for the other bits. Accordingly, when the integer part of the apex value of the exposure time Tvs is n($-5 \leq n \leq 10$), the data to be preset in the counter $CO_6$ corresponds to $2^{10-n}$. Also, when the content of the data F6'' corresponding to the fraction part is "000", the AND circuit AN0 opens. Likewise AND circuits AN1, AN2, AN3, AN4 and AN5 open when data F6'' has "001", "010", "011", "100", and "101", respectively. And when the terminal p16 produces "High", a clock pulse CP is produced from one of the AND circuits AN0, AN1, ..., AN5. The counting of the exposure time Tvs starts when the terminal p16 produces "High". Assuming that the frequency of the clock pulse CP is fo=(102.4 KHx), $\tau$(=100,89,79,71,63,56), the time T can be expressed as $$T = 1/fo \times 2^{10-n} \times \tau.$$

After counting the time T as defined, all the inverting output terminals of the counter $CO_6$ produce "High" and the output of the AND circuit AN8 produces "High" to energize the coil L1 to close the shutter thereby completing the exposure. When the AND circuit AN7 produces "High", the output of inverter IN is turned to "Low" to close the gate of the AND circuit AN6. Thereafter, no clock pulse CP will be applied to the counter $CO_6$. Then, when the terminals p14 and p16 produce "Low", the shutter opens again. The shutter opening carried out first and last of the operation accompanies no film exposure, since a reflection mirror and an auxiliary shutter are in a position to intercept the incoming light as will be described later.

Figure 14:
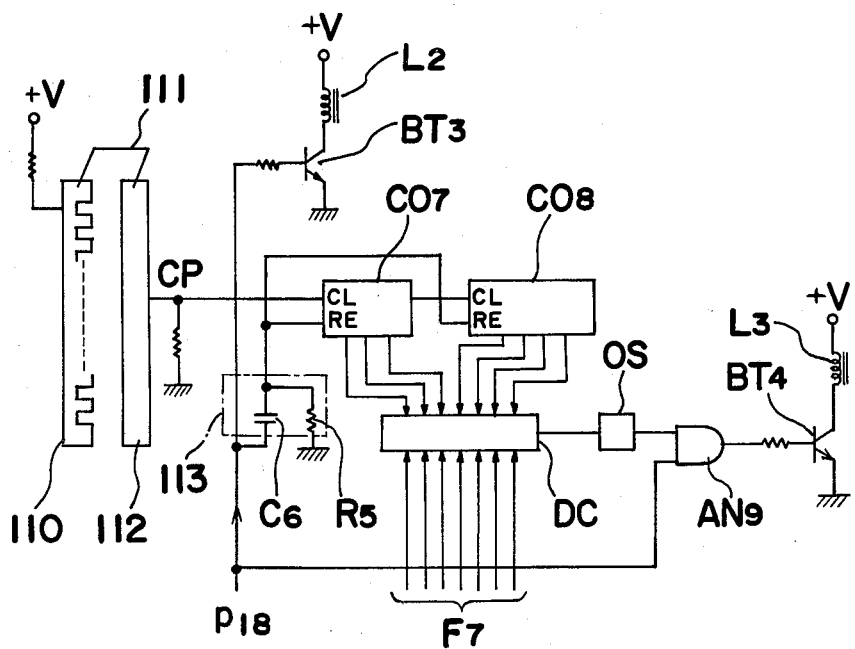
FIG. 14 is a circuit diagram of a diaphragm control apparatus employed in the circuit of FIG. 11.

Referring again to FIG. 11, a numeral 6 is the diaphragm controlling apparatus of FIG. 1 which is shown in detail in FIG. 14. Referring to FIG. 14, numeral 111 is a movable contact which moves in proportion to the diaphragm. 110 and 112 are fixed contacts. The movable contact and the fixed contacts which constitute a pulse generator for generating clock pulses CP in proportion to the stopping down of the diaphragm. $CO_7$ is a hexal counter. $CO_8$ is a decimal counter, and DC is a digital comparator. A numeral 113 is a differential circuit composed of a capacitor C6 and a resistor R5. OS is a one-shot multi-vibrator (hereinafter referred to as a one-shot circuit) having its output connected to one input terminal of an AND circuit AN9.

L2 is a plunger coil connected to the collector of a transistor BT3. When the coil L2 is energized, the core moves against the spring to reduce the opening of the diaphragm, and when it is de-energized, the core moves back to its initial position by the spring force to fully open the diaphragm. L3 represents an electromagnetic coil forming a part of a magnet unit operable to control the aperture size of the diaphragm to a predeterminal value, said magnet unit having a core formed of a permanent magnet. A signal produced from an output port F7 is a remainder of subtraction of data corresponding to the calculated diaphragm value minus "18 H". The reason why "18 H" is subtracted is because the data is greater by "00011000", i.e. "18 H", when compared with an actual value, as understood from the diaphragm value Av listed in Table 1. When the signal from a terminal p18 is turned to "High", the counters $CO_7$ and $CO_8$ are reset by the signal from the differential circuit 113. Then, the coil L2 is energized to control the diaphragm. In association with this control, the movable contact 111 moves with respect to contacts 110 and 112. In the meantime the clock pulses CP are input to the counters $CO_7$ and $CO_8$. When the data from the counters $CO_7$ and $CO_8$ coincides with the data from the output port F7, "High" signal is produced from the digital comparator DC. Thereupon, the coil L3 of the magnet unit is energized to engage and stop stopping down the aperture diaphragm. The size of aperture of the thus controlled diaphragm corresponds to the data from the output port F7. When the terminal p18 produces "Low", the electric power to the coil L2 is cut off to fully open the diaphragm by the spring force.

Referring again to FIG. 11, a numeral 113 represents a driving circuit for driving the reflection mirror and the auxiliary shutter, the driving circuit being of the same construction as that of the plungers L1 and L2 shown in FIG. 13 and FIG. 14. When the terminal p20 produces "High", the reflection mirror rises and the auxiliary shutter opens. On the other hand, when the terminal p20 produces "Low", the reflection mirror lowers and the auxiliary shutter closes.

S1 is a switch that closes by the first half depression of the entire stroke of movement of a shutter release button, and S2 is a switch which closes at a second half depression of the shutter release button. S3 is a switch which is connected with a terminal A in the case where the diaphragm priority mode is desired and a terminal T in the case where the exposure time priority mode is desired. S4 is a switch which closes when the photograph is taken with a set diaphragm value Avs and set exposure time Tvs. S5 is a switch which is closed during a period from a moment when the preparation for the exposure control is completed to a moment when the exposure control is completed.

A numeral 114 designates an apparatus for producing data corresponding to the film sensitivity Sv, a numeral 115 designates an apparatus for producing data corresponding to the predetermined exposure time Tvs and a numeral 116 designates an apparatus for producing data corresponding to the predetermined diaphragm value Avs.

A numeral 117 designates a display apparatus for displaying the calculated light quantity for the electronic flash device 10, and a numeral 118 designates a display apparatus for displaying the calculated exposure controlling value or the difference between the calculated exposure controlling value and the set exposure controlling value.

A numeral 120 is a micro-computer including a CPU 121 having registers #OR and #IR, each capable of carrying an 8-bit signal. When the registers #OR and #IR are connected in series they may be used as one register unit #OPR capable of carrying a 16-bit signal. The use is particularly suitable for addressing ROM 122 which will be described later. The CPU 121 further has an ALU, a program counter, an instruction decoder, an accumulator, flugs, a timing controller, other registers etc.. However, since these components have no direct relation with the present invention, a further description therefor is omitted for the sake of brevity. A numeral 122 is a ROM in which a program data for controlling the operation of the micro-computer 120 and various constant data are stored. A numeral 123 is a RAM for temporarily storing the data, and a numeral 124 is an I/O port.

Figure 15:
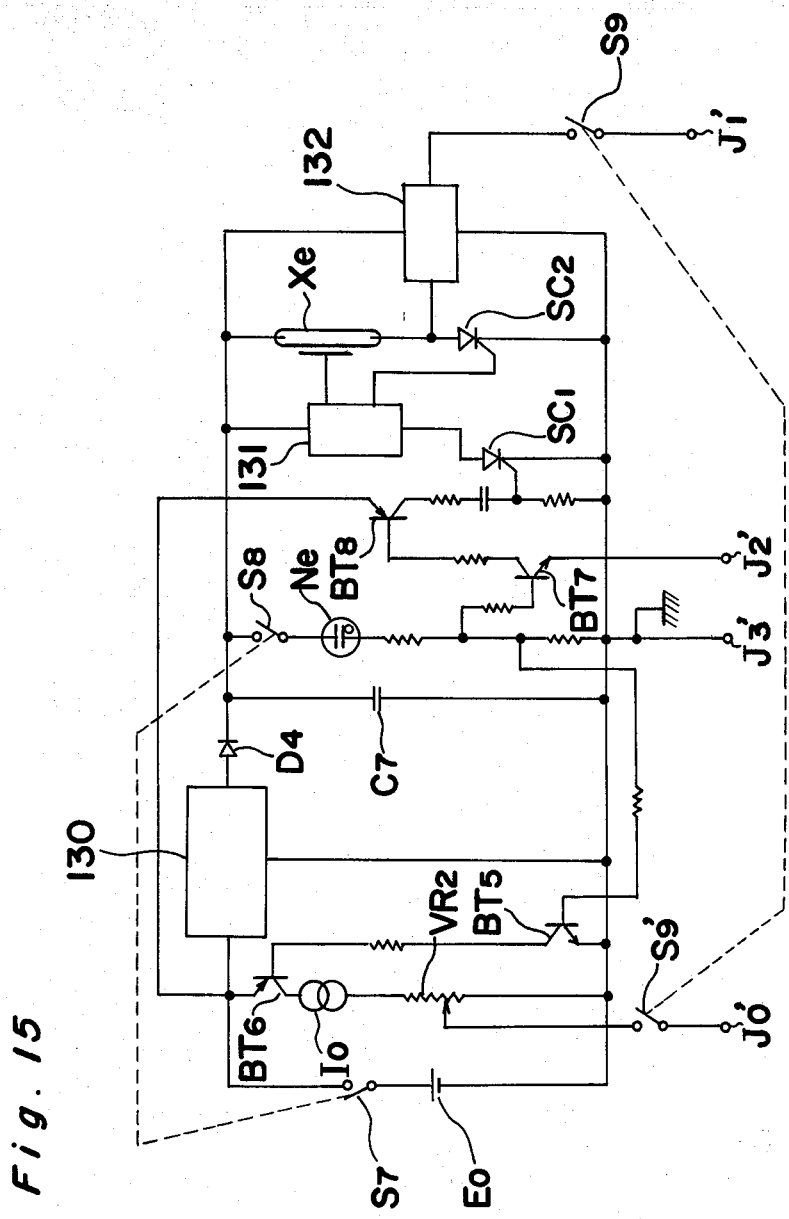
FIG. 15 is a circuit diagram of an electronic flash apparatus section of the circuit of FIG. 11.
Figure 16:
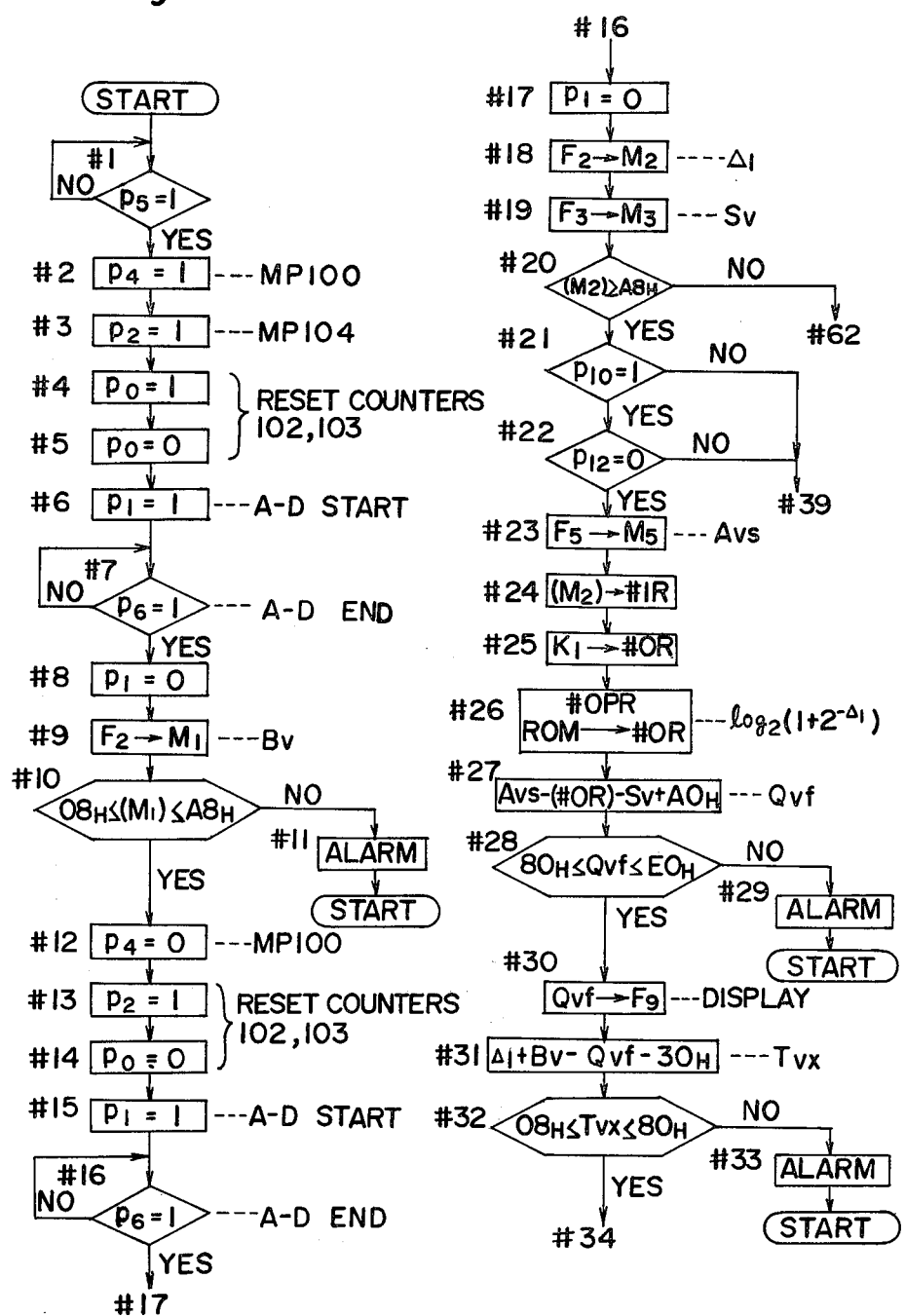
FIGS. 16 to 19 are flow-charts showing the steps of operation taken in the microcomputer in the circuit of FIG. 11.

FIG. 15 is a circuit diagram showing the electronic flash device 10. EO is a power cell for the electronic flash device 10, and S7 is a power supply switch. A numeral 130 is a DC-DC converter, and D4 is a diode for preventing reverse current. C7 is a main capacitor for retaining a voltage, and Ne is a neon tube.

S8 is a switch which operates in association with the power supply switch S7. Xe is a xenon tube, and a numeral 131 is a trigger circuit for the xenon tube Xe. A numeral 132 is a flash light emission stop circuit. S9 and S9' are switches which open during normal flash light photographing (here, the term normal flash light photographing means normal auto-flash photographing or flash light photographing under full light emission).

VR2 is a potentiometer for setting lighting contrast. Terminals Jo', J1', J2', J3', are provided for connection with terminals Jo, J1, J2, J3 provided in the camera. $I_0$ is a constant current supply circuit. BT5, BT6, ..., BT8 are transistors, and SC1, SC2 are thyristors.

When the switch S7 is closed, the DC-DC converter 130 is so operated as to charge the capacitor C7. When the charged voltage reaches a predetermined value, the neon tube Ne is lit to conduct the transistors BT5 and BT6. Thereafter a voltage corresponding to the set lighting contrast $\Delta 1$ to be outputted by potentiometer VRI and a constant current source $I_0$, is applied to the camera. When the trigger switch S6 in the camera closes, the emitter of the transistor BT7 is grounded. In this case, when the neon tube Ne is being lit, transistors BT7 and BT8 and the thyristor SC1 become conductive to actuate the trigger circuit 131. Thereupon, the xenon tube Xe and the thyristor SC2 are made conductive to emit a flash light. Thereafter when the flash light emission stop signal is applied from the camera, the output terminal of the flash light emission stop circuit 132 becomes lower than the earth potential to stop the flash light emission of the xenon tube Xe.

Then, when the power supply switch S7 opens, the switch S8 also opens. In this case even if the voltage charged in the capacitor C7 is sufficient to emit the light the neon tube Ne will not be turned on. Accordingly, the transistors BT5, BT6, ..., BT8 are turned to non-conductive, and signals corresponding to the lighting contrast $\Delta 1$ will not be produced. Thus, the xenon tube Xe does not emit light.

The operation of the above described arrangement will be described below with reference to flow-charts shown in FIG. 16, FIG. 17, FIG. 18 and FIG. 19.

When the electric power for the camera is supplied, a power-on clear signal is applied to the micro-computer 120 to reset the entire system of the micro-computer 120 to its initial condition. Thus, the system is ready for its operation.

In the step #1, it is checked whether the switch S1 is on or not. When the switch S1 is turned on, the terminal p5 produces "High". Then, in the steps #2 and #3 terminals p4 and p2 produce "High" signals, and the multiplexor 100 is so actuated as to transmit signal from the operational amplifier OA1 and multiplexor 104 is so actuated as to transmit the data from the counters 102, and 103. In the step #4, the terminal pO produces "High". Then, in the step #5, the signal at the terminal pO is turned to "Low" for the reset of the counters 102 and 103. Accordingly, at this point, the output from the comparator OA2 is "Low". Then, in the step #6, the terminal p1 produces "High". In the step #7, it is checked whether the output from the comparator is reversed or not, i.e., whether the output from the terminal p6 is "High" or not.

In the step #8, the AND circuit AN11 is opened by the "High" signal produced from the terminal p1 to start the supply of clock pulses Cp to the hexal counter 102. The counter 102 provides one pulse signal for every 6 pulses and this one pulse from the counter 102 is applied to the counter 103. The output from the counters 102 and 103 are applied through the multiplexer 104 to the D-A converter 101 from which an analog signal corresponding to the output data from the counters 102 and 103 is produced. The analog signal is compared with the output signal from the multiplexer 100 in the comparator OA2 and when the level of the analog signal coincides with that of the signal from the multiplexer 100, the signal from the comparator OA2 is reversed to close the gate of the AND circuit AN11. Then, A-D conversion of the measured ambient light is completed. It is to be noted that the output data from the counter 103 respresents the integer part while the output data from the counter 102 represents the fraction part with 1/6 EV as the smallest unit.

In the micro-computer 120 the terminal p1 produces "Low", and then, in the step #9, the A-D converted data of the measured value Bv of the ambient light from the input port F2 is stored at the address M1 of the RAM 123. In the step #10, it is checked whether the content of the M1 address is within the range of Bv defined in Table 1 or not, i.e., whether the content is above O8H or below A8H. If the content is within said range, the procedure advances to the step #12, and if the content is not within said range, an alarm is produced, as indicated in the step #11. The type of alarm is, for example, a display of a seven segment character effected by the transfer of necessary constant data from the ROM 122 to the CPU 121 and further to the output port F8. The alarm display by the seven segment character can be "OE" for the case when it is too bright and "UE" for the case when it is too dark. After the display of the alarm, the procedure returns to the "start".

In the step #12, the signal at the terminal p4 is turned "Low" and, the analog signal corresponding to the set lighting contrst Δl from the terminal Jo is produced from the multiplexer 100. Then, in each of the steps #12, #13, #14, #15, #16 and #17, a similar procedure to that described above is carried out for the A-D conversion. Then, in the step #18, the data corresponding to the lighting contrast Δl from the input port F2 is stored in the RAM 123 at an address M2, and in the step #19, the data corresponding to the set film sensitivity Sv from the input port F3 is stored in the RAM 123 at an address M3. The data of the film sensitivity Sv is expressed as ⅙ of EV unit. In the step #20, it is discriminated whether or not the content of the address M2 is A8H or more. If the content is not A8H or more, the procedure jumps to the step #62 for carrying out the normal photographing operation i.e. an ordinary photography without a flash device or an ordinary automatic flash photography. In the steps #21 and #22, the condition of the switches S3 and S4 are discriminated. If it is so discriminated that the system is in diaphragm priority mode, the procedure advances to step #23, and accordingly, the data corresponding to the set diaphragm value Avs from the input port F5 is stored at an address M5 in the RAM 123. In the step #24, the data corresponding to the lighting contrast Δl stored at the address M2 in RAM 123 is shifted to the register #1R, and in the step #25, a constant K1 is set in the register #OR. In the step #26, the address of the ROM 122 is designated by the data of the 16-bit register #OPR and the data corresponding to $\log_2(1+2^{-\Delta l})$ shown in Table 3, which is stored in the designated address, is read out. The read out data is then set in the register #OR. Then, in step #27, the calculation of $$Qvf = Avs - Sv - \log_2(1+2^{-\Delta l}) + AOH \quad (4)$$

is performed. In the steps of calculation, the data is divided into five upper bits and three lower bits. AOH is added, as defined in Table 1, to the five upper bits when the weighting of 1, 2, 4, 8, 16 to each bit is effected. Also, the calculation is performed in such an order as to prevent any data from holding a negative value during the calculation. Assume a case that Avs is 5(4OH), Sv is 5(30H), and the integer part of $\log_2(1+2^{-\Delta l})$ is 1(08H), the calculated light quantity Qvf is 1, i.e., A8H will be produced. In this case a calculation is carried out as follows.

AOH−30H=70H then,

70H−08H=68H and further,

68H+40H=A8H the fraction portion expressed by the lower three bits is calculated by the numbering system with base 6. To subtract "100" from "010", first 1 is subtracted from the data of the upper five bits, since "010" is smaller than "100". Then "100" is subtracted from "110", and the result "010" and "010" are added to obtain "100". The above explained calculation is identical to the following calculation $$m2/6 - 4/6 = (m-1)4/6$$

wherein m is an integer. Similarly, in the addition, the sum is compared with "110". When the sum is greater or equal to "110", 1 is added to the upper five bits. The result is further subtracted by "110" and the remainder is used as a data for the fraction part. The above calculation is identical to the following calculation $$m5/6 + 4/6 = (m+1)3/6$$

The above-described calculation procedure can be applied to the calculation in the following operation.

In the step #28, it is discriminated whether or not the calculated value for the light amount Qvf is within the range defined in Table 1. When it is not within the range, an alarm is produced through the display apparatus 117 in the step #29 and the procedure returns to the start. When the calculated value is within the range, the data necessary for segment display of the emitted light quantity Qvf with apex values is produced from the output port F9 in the step #30.

Figure 17:
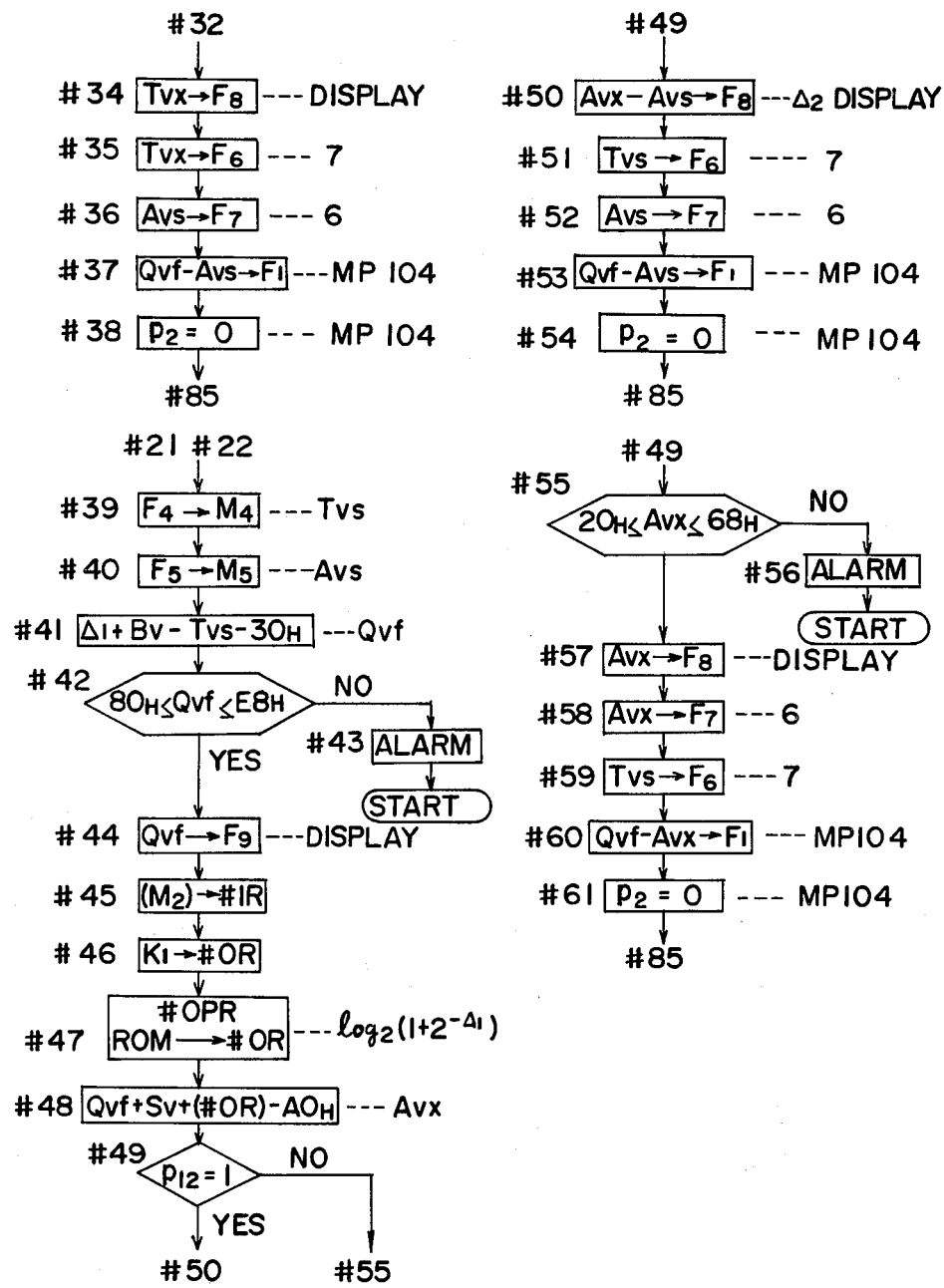

Then, the calculation of $$TVx = \Delta l + Bva - Qvf - 30H \quad (1-3)$$

is performed in the step #31. It is discriminated whether or not the result of the calculation (1-3) is within the control range defined in Table 1. When the result is not within the range, an alarm is produced through the display apparatus 118 in the step #33 and it returns to the start. When it is within the control range, the exposure time Tvx as the proper exposure is displayed by the display apparatus 118 in the step #34 as shown in FIG. 17. According to the displaying method, the segment data stored in the ROM 122 at an address designated by the data corresponding to the upper five bits is transmitted to the output port F8, in the step #34, to display the exposure time (in seconds) by the 1EV unit, then, the calculated exposure time Tvx as the proper exposure is outputted to the output port F6 in the step #35 and the diaphragm value Avs is outputted to the output port F7 in the step #36. The data to be applied to the output port F7 is the data obtained through subtraction of the "18H" from the data corresponding to the diaphragm value Avs as shown in FIG. 14. Then, the data obtained through subtraction of the diaphragm value Avs from the emitted light quantity Qvf is applied to the output port F1 in the step #37, and, in the step #38, signal at the terminal p2 is turned to "Low" and the analog signal corresponding to Qvf-Avs is produced from the D-A converter 101. Then, the procedure jumps to the step #85.

When the discrimination whether the mode is exposure time priority or manual setting in the steps #21 and #22, is carried out, the procedure advances to the step #39. In the step #39, the data of the setting exposure time Tvs from the input port F4 is shifted to an address of the RAM 123. Then, in the step #40, the data of the diaphragm Avs is shifted to an address M5 of the RAM 123 from the input port F5.

Then, in the step #41, the calculation of $$Qvf = 41 + Bva - Tvs - 30H \quad (1-1)$$

is performed. Then, in the step #42, it is discriminated whether or not the data of the light quantity Qvf is within the defined range. When it is not within the range, an alarm is produced in the step #43 and it returns to the start. When it is within the range, the light quantity Qvf is displayed with an apex value in the step #44. In the step #45, the data corresponding to the lighting contrast Δ1 stored in the address M2 of the RAM 123 is read out and shifted to the register #1R. In the step #46, a constant data K1 is set in the register #OR. In the step #47, the register #OR receives data corresponding to $\log_2(1+2^{-\Delta 1})$ from an address of ROM 122 specified by the data from the register #OPR. Then, in the step #48, the calculation of $$Avx = Qvf + Sv + \log_2(1+2^{-\Delta 1}) - AOH \qquad (3)$$

is performed and in the step #49, it is discriminated whether the terminal p12 is producing "High" or "Low". When the terminal p12 is producing "High" the mode is manual setting. In this case, in the step #50, the difference Δ2 between the calculated diaphragm Avx and the set diaphragm value Avs is displayed, with apex values, on the display apparatus 118. Then, the exposure time Tvs is transmitted to the output port F6 in the step #51, and the diaphragm value Avs is transmitted to the output port F7 in the step #52. In the step #53, Qvf-Avs is applied to the output port F1. When the terminal p2 is set with "Low" in the step #54, the procedure advances to step #85.

In the step #49, when the terminal p12 is set with "Low" indicating that the mode is exposure time priority, the procedure advances to the step #55. In the step #55, it is discriminated whether the calculated diaphragm value Avx is within the defined range or not. When it is not within the range, an alarm is produced in the step #56 through the display apparatus 118 and then, the procedure returns to start. When it is within the range, the segment data stored in the ROM 122 at the address designated by the data corresponding to the upper five bits is transmitted to the output port F8, in the step #57, to display the diaphragm value in F number. In the step #58, the data corresponding to the diaphragm value Avx is transmitted to the diaphragm control apparatus 6. Then, in the step #59, the exposure time Tvs is transmitted to the shutter control apparatus 7. In the step #60, Qvf-Avs is shifted to the output port F1. In the step #61, the terminal p2 is turned to "Low", and the procedure advances to the step #85.

Figure 18:
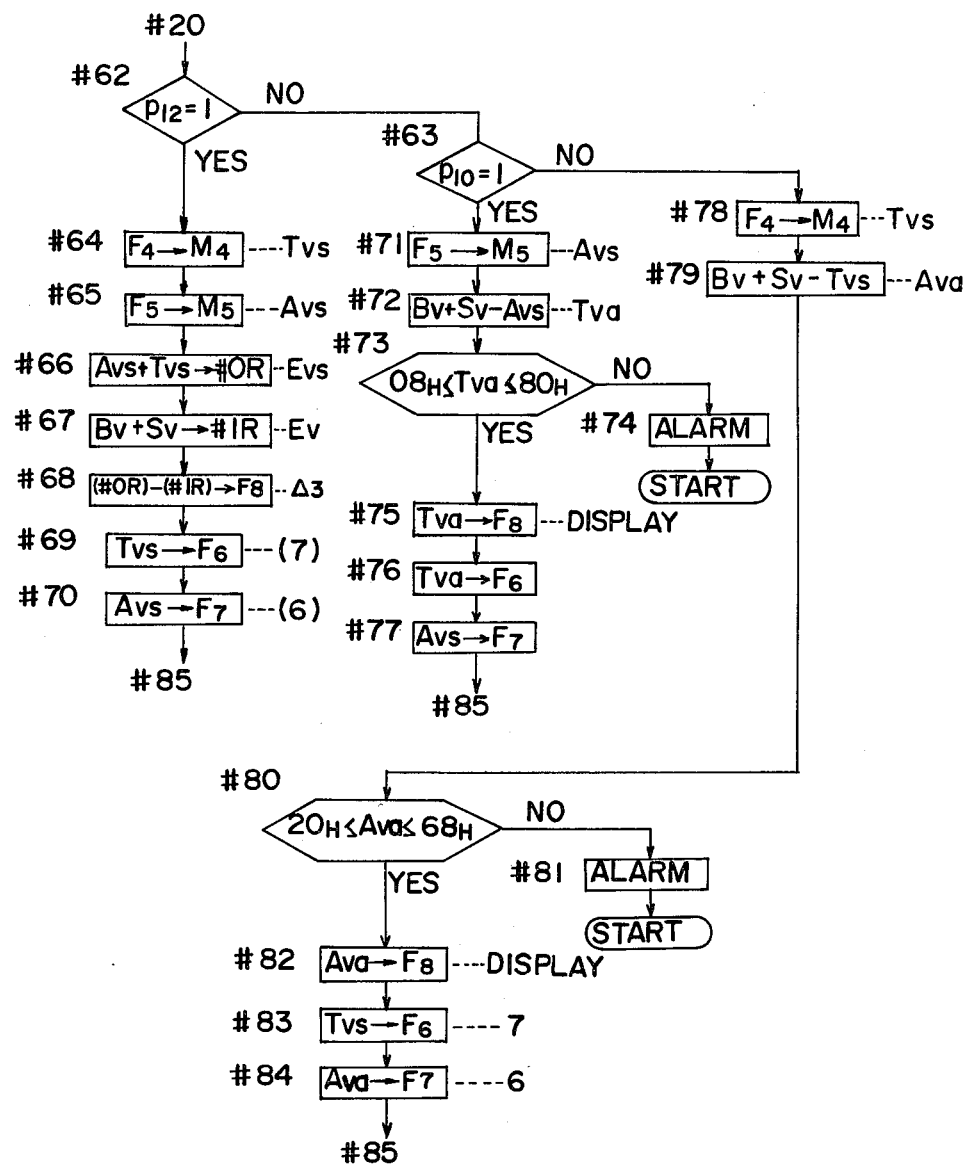

When it is discriminated in the step #20 that the mode is not flash light photographing of the present invention, the procedure advances to the step #62 as shown in FIG. 18. Thereafter, up to the step #84, the normal apex operation and displaying operation are performed.

In other words, when the mode is manual setting, the difference Δ3=Evs-Ev between the exposure value Evs calculated using the set exposure time Tvs and set diaphragm value Avs and the exposure value Ev calculated using the set film sensitivity Sv and the light measured value Bv is displayed, and the set data of exposure time control data and diaphragm value control data are produced, during the time the procedure advances from the step #64 to step #70. Thereafter, the procedure jumps to the step #85.

Also, in the case where the mode is diaphragm priority, the calculated exposure time control data and the set diaphragm control data are outputted in the steps from #63 to #77 and then, the procedure advances to the step #85.

Figure 19:
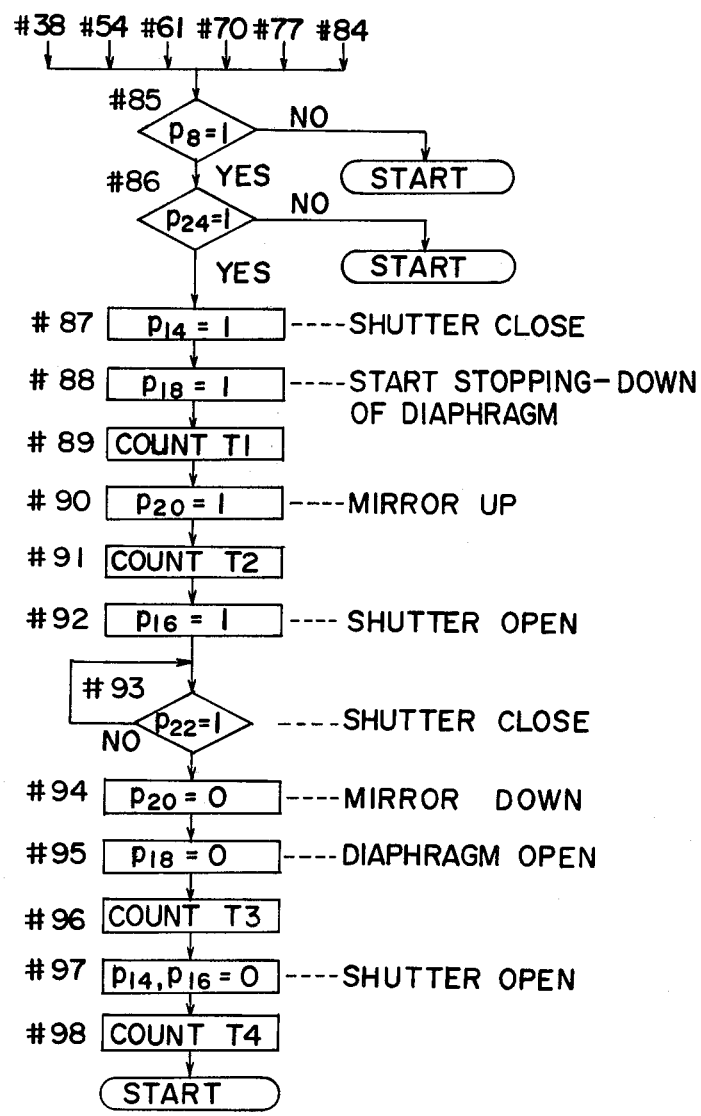

On the other hand, in the case where the mode is exposure time priority, the calculated diaphragm value Ava is displayed and the calculated diaphragm control data and the set exposure time control data are produced in the steps #63 to #84, and then the procedure advances to the step #85 shown in FIG. 19.

In the step #85, the condition of the signal at the terminal p8 is discriminated. When it is "Low", the release button is not fully depressed. Thus, the procedure returns to the start. When it is "High", the condition of the signal at the terminal p24 is discriminated in the step #86. When the signal at the terminal p24 is discriminated as "Low", the camera is in a condition when photographing is completed. Thus, the procedure cannot move to the exposure control operation. It returns to the start.

In the step #86, when the terminal p24 is producing "High" the film winding, etc. are performed and the exposure control preparation is performed. Since in this case, it is ready for exposure control, the procedure advances to the step #87 to perform the exposure controlling operation.

In the step #87, the terminal p14 produces "High" to start the operation of the shutter controlling apparatus 7 to close the shutter. Then, in the step #88, the terminal p18 produces "High" to start the stopping down operation of the diaphragm by the controlling apparatus 6, and in the step #89, time T1 is counted. During the count, the aperture size of the diaphragm controlled by the diaphragm controlling apparatus 6 is determined by the data from the output port F7.

Then, in the step #90, the terminal p20 produces "High" for driving the driving circuit 113 to raise a mirror and to open an auxiliary shutter. Then, in the step #91, time T2 is counted. During the count, the mirror is completely raised and the auxiliary shutter is also completely opened. Then, the terminal p16 produces "High" for opening the shutter by the shutter controlling apparatus 7 and to start counting the exposure time Tvs. When the shutter opens to its maximum, the switch S6 is closed to cause the electronic flash device 10 to emit light, the quantity of which is based on the controlling data.

Then, when the counting for the exposure time is completed, the terminal p22 produces "High" in the step #93 and the shutter is closed by the shutter controlling apparatus 7. Then, in the step #94, the terminal p20 produces "Low" to drive the driving circuit 113 which accordingly lowers the mirror and closes the auxiliary shutter. Then, in the step #95, the terminal p18 produces "Low" to open the diaphragm. In the step #96, time T3 is counted. During this count, the diaphragm, mirror, and auxiliary shutter are returned to their original condition. Then, in the step #97, the terminals p14 and p16 produce "Low" to open the shutter by the shutter controlling apparatus 7. In the step #98, time T4 is counted. During this count, the shutter is completely released to return it to its starting position. When the release button is depressed down, the light measuring operation and displaying operation for displaying the calculated result are performed. Desirably upon closure of the switch S2, the signal at the terminal p8 is applied to the display apparatuses 117, 118 for making the display apparatuses 117, 118 non-operative.

Second Embodiment

FIGS. 20 to 29 show a second embodiment of the present invention. Although the first embodiment relates to the lighting contrast, the second embodiment relates to a value equivalent to the ratio between the total light quantity contributing to the exposure during the exposure time and the light quantity of the ambient light only contributing to the exposure during the exposure time i.e. the difference between the two kinds of light quantities if represented in an APEX system. This value shows a value by which the light quantity in APEX system during the exposure time is increased due to the flash light in addition to the ambient light.

Figure 20:
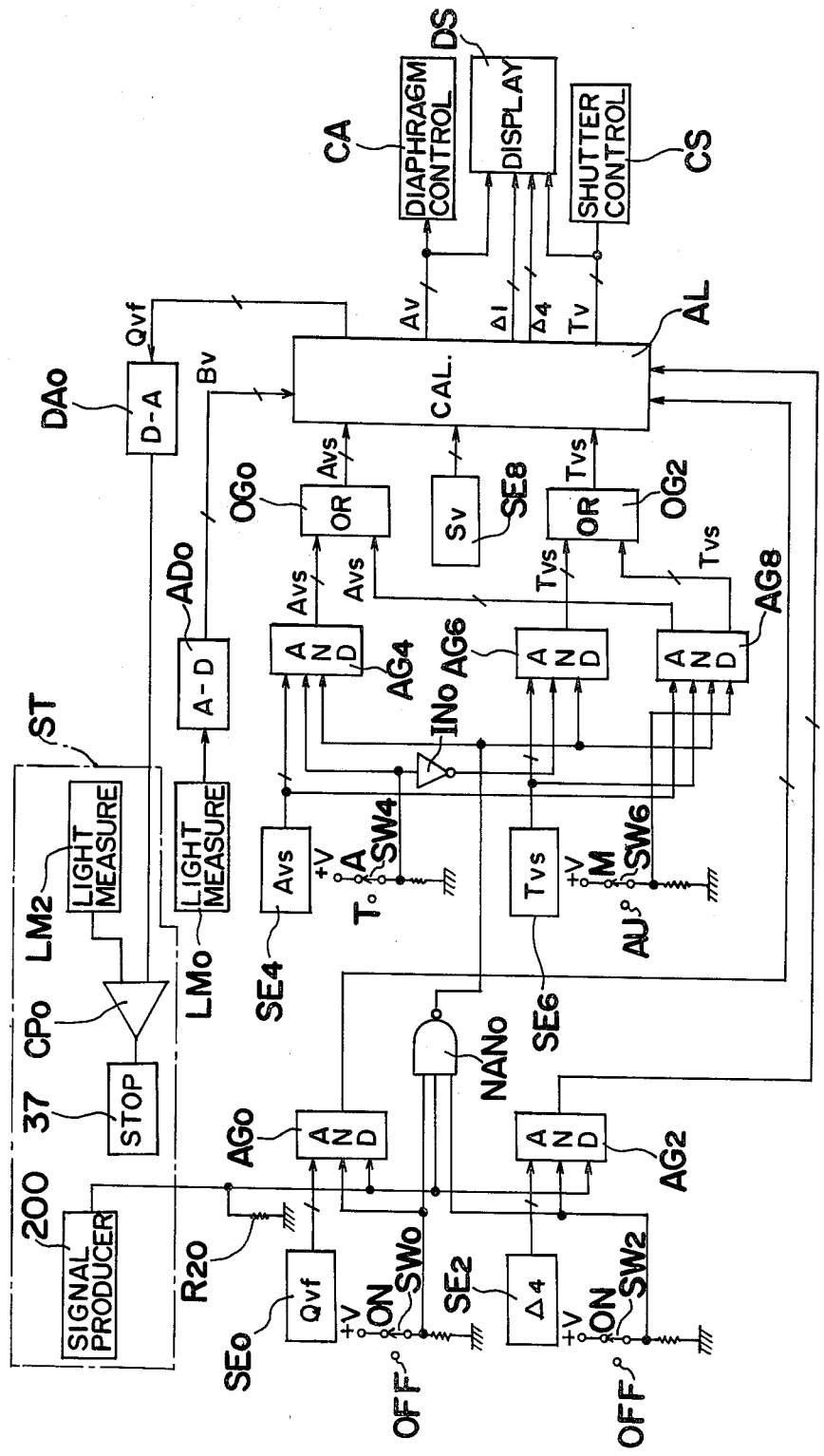
FIG. 20 is a block diagram of an exposure control system of the present invention according to the second embodiment.

FIG. 20 is a block diagram of the second embodiment. First, the structure of the respective circuits will be described. ST is a flash light emission apparatus having a signal producing circuit 200 for producing a signal "High" when it is ready to emit flash light, a light measuring circuit LM2 for measuring the flash light emitted quantity, a comparator CPo for comparing the signal produced from the light measuring circuit LM2 with the signal from the camera, and a stop circuit 37 for stopping the emission of the flash light when the output from the comparator CPo is inverted.

SEo is a setting apparatus for setting the quantity of flash light to be emitted, and for producing digital data Qvf along a signal line with a plurality of bits. SE2 is a setting apparatus for setting the quantity Δ4, by which the light quantity in the APEX system during exposure time is desired to be increased by means of the flash light in addition to the ambient light. SE4 is a setting apparatus for setting the aperture value. SE6 is a setting apparatus for setting the exposure time. SE8 is a setting apparatus for setting the film sensitivity. LMo is a light measuring circuit for measuring the ambient light. ADo is an A-D converting circuit for A-D converting the output of the light measuring circuit LMo. SWo is a switch, which becomes "ON" when the data for setting the light emission quantity is required to be outputted and becomes "OFF" when the data is not required to be outputted. SW2 is a switch, which becomes "ON" when the set data Δ4 is required to be outputted and becomes "OFF" when the data is not required to be outputted. SW4 is a switch, which is connected with a terminal A in case of the diaphragm priority mode, and with a terminal T in case of the exposure time priority mode. SW6 is a switch, which is connected with a terminal AU in case of the automatic photographing operation and with a terminal M in case of the manual photographing operation. AGo, AG2, AG4, AG6 and AG8 are gates for outputting the data set in accordance with the conditions of the switches SWo, SW2, SW4, SW6. OGo, OG2 are "OR" gates. NANo is a NAND gate. INo is an inverter. AL is a calculator for calculating the diaphragm value, exposure time, light emission quantity, value indicating the increase of light quantity due to the flash light, and the difference between the set diaphragm value and the calculated diaphragm value using the data from AND gates AGo, AG2, OR gates OGo, OG2, film sensitivity, setting apparatus SE8, and A-D converter ADo. CA is a diaphragm controlling apparatus for controlling the diaphragm using the diaphragm value data from the calculator AL. CS is a shutter controlling apparatus for controlling the shutter using the data of the exposure time from the calculator. DS is a display apparatus for displaying the various data calculated by the calculator AL. DAo is D-A converter for carrying out the D-A conversion of the data corresponding to the emitted light quantity calculated by the calculator.

The operation of the circuit apparatus will be described hereinafter. First, a case where the output from the signal producing circuit 200 is "High" will be described. In this case, the data of the emitted flash light quantity from the AND gate AGo is applied to the calculator AL when the switch SEo is "ON" and the switch SW2 is "OFF". In the diaphragm priority mode, according to the condition of the switches SW4 and SW6, the data corresponding to the diaphragm value from the AND gate AG4, the data corresponding to the brightness of the photographic object from the A-D converter ADo and the data corresponding to the film sensitivity from the film sensitivity setting apparatus SE8 are applied to the calculator AL. And in the calculator AL, the exposure time, value Δ4 and light quantity to be emitted are calculated according to the data. The display apparatus DS displays the exposure time and the value Δ4. The shutter controlling apparatus CS is controlled in accordance with the calculated exposure time period. The diaphragm controlling apparatus CA is controlled according to the set diaphragm value. The D-A converter DAo produces an analog signal coresponding to the light quantity Qvf. The signal from the converter DAo is compared, at the comparator CPo, with the output of the light measuring circuit LM2 provided in the light measuring circuit LM2 of the flash light apparatus. When the output of the comparator CPo is inverted, the stop circuit 37 operates to stop the flash light emission, thereby controlled the emission of flash light in accordance with the set quantity.

In the exposure time priority mode, the diaphragm value and data corresponding to the Δ4 are calculated, in the calculator AL, in accordance with the light quantity to be emitted, photographic object brightness, exposure time and data corresponding to film sensitivity. And the display apparatus DS displays the Δ4 and diaphragm value. The light emitting apparatus ST emits the light in accordance with the set light quantity. The diaphragm controlling apparatus CA is controlled according to the calculated diaphragm value. In addition, the exposure time CS is controlled in accordance with the set exposure time.

In the manual mode, the diaphragm value is first calculated as in the exposure time priority mode. A data corresponding to the difference between the calculated data and the data corresponding to the determined diaphragm value is calculated. The display DS is performed in accordance with the data corresponding to the difference and the value Δ4 indicating the increase of light quantity due to the flash light in addition to the ambient light is displayed. Also, the light quantity to be emitted, diaphragm value and exposure time are controlled in accordance with the set values.

On the other hand, when switches SWo, SW2 are both "ON", the output of the NAND circuit NANo becomes "Low" to close the gates of the AND gates AG4, AG6, AG8. Thus, the set exposure time and the data corresponding to the diaphragm value are not applied to the calculator AL. At this time, the set light quantity, value Δ4 indicating the gain of light quantity, film sensitivity and data corresponding to the brightness of the photographic object from the A-D converting circuit ADo are inputted to the calculator AL. And in the calculator AL, the data corresponding to the diaphragm value and the exposure time are calculated.

Then, the display corresponding to the two data is performed. The disphragm and exposure time are controlled according to the calculated data. The light emitting apparatus ST emits light in accordance with the set light quantity.

A case where the switch SWo is "OFF" and the switch SW2 is "ON" will be described hereinafter. In the diaphragm priority mode, the data corresponding to the exposure time and the emitted light quantity are calculated in accordance with the data corresponding to the brightness of the photographic object, film sensitivity, value Δ4 indicating the increase of the light quantity due to the flash light and diaphragm value. The calculated exposure time is displayed. The diaphragm is controlled according to the set value. The light emitting apparatus emits flash light in a quantity corresponding to the calculated data.

In the exposure time periority mode, the data corresponding to the diaphragm value and the flash light quantity to be emitted are calculated to display the diaphragm value. The exposure time, the diaphragm and emitting flash light quantity are controlled respectively, according to the set value, calculated value and calculated value. Also, in the manual setting mode, the data corresponding to the diaphragm value and the flash light quantity to be emitted are calculated. The data corresponding to the difference between the set diaphragm value and the calculated diaphragm value is calculated and is displayed. The diaphragm and the exposure time are controlled according to the set value. The flash light quantity to be emitted is controlled according to the calculated value.

In addition, when the switches SWo and SW2 are both "OFF", the data corresponding to the flash light quantity to be emitted and the value indicating the gain of light quantities will not be applied to the calculator AL. Thus, the normal exposure operation is performed in the calculator AL. In this case, since the data corresponding to the emitted flash light quantity is not calculated in the calculator AL the output from the D-A converter DAo is O, and the flash light emitting apparatus ST detects this fact to perform the normal flash light emission, as will be explained later.

Also, even when a flash light emission ready signal is not inputted from the signal output circuit 200, the calculator AL performs the normal exposure calculation without the flash light and the ambient light photographing operation is performed.

Figures 21, 22:
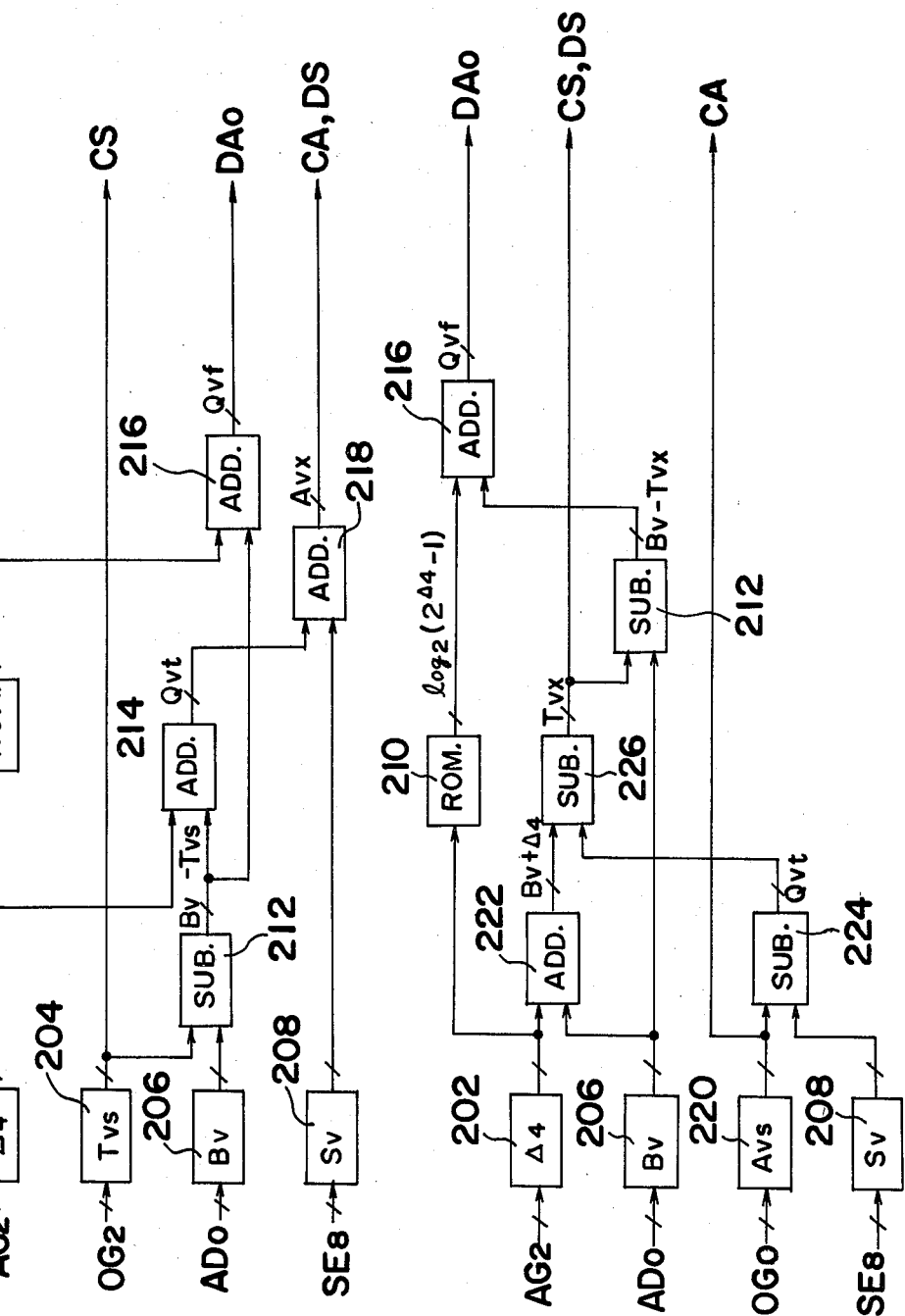

FIG. 21 is a block diagram, which shows the details of the calculator AL when the data corresponding to the Δ4 has been inputted in the exposure time priority mode. For better understanding of the description of the construction and operation of the block diagram, the reference characters used in each of the drawings are defined as follows. Tvx is an APEX value of the calculated exposure time. Tvs is an APEX value of the set exposure time period. Bv is an APEX value of the photographic object brightness by the ambient light only. Sv is an APEX value of the set film sensitivity. Avs is an APEX value of the set diaphragm value. Avx is an APEX value of the calculated diaphragm value. Avf is an APEX value of the calculated diaphragm value by the flash light quantity of the electronic flash device. Qvf is an APEX value of the emitted light quantity of the flash light. Qvt is an APEX value of the light quantity corresponding to the sum of the emitted light quantity of the flash light and the quantity of the ambient light during the exposure period. Ev is an exposure value by the ambient light. Tva is an apex value of the exposure time determined by the exposure value obtained by the ambient light and the set diaphragm value.

The following relation is established among the values of the reference characters.

$$2^{Qvf}+2^{Bv-Tv}=2^{Qvt} \quad (2-5)$$

Here, Tv represents Tvs and Tvx $$Qvf+Sv=Avf \quad (5)$$

$$Qvt+Sv=Av \quad (9)$$

Av represents Avs and Avx $$Qvt-(Bv-Tv)=\Delta 4 \quad (10)$$

$$Bv+Sv=Ev \quad (11)$$

$$Ev-Avs=Tva \quad (8)$$

Referring to FIG. 21, the operation of $$(Bv-Tvs)$$

is performed in the subtracting circuit 212, using the data from a pair of registers 204 and 206 carrying the setting exposure time Tvs from the OR gate OG2 and the photographic object brightness Bv from the A-D converter ADo. The operation of $$\Delta 4+(Bv-Tvs)=Qvt \quad (10-1)$$

is performed in the adding circuit 214 to calculate the entire light quantity Qvt, using the data from the register 202 carrying the value Δ4 from the AND gate AG2 and the data from the subtracting circuit 212. The operation of $$Qvt+Sv=Avx \quad (9-1)$$

is performed in adding circuit 218 the data calculated in the adding circuit 214 and the data corresponding to the film sensitivity Sv provided in the register 208. The sum obtained from the calculation (9-1) is the proper diaphragm value Avx. The calculated data is sent to the display apparatus DS and the diaphragm controlling apparatus CA.

On the other hand, the data Δ4 from the register 202 specifies the address of the ROM 210. The operation of ROM 210 is such that it converts the data 66 4 to the data corresponding to $\log_2(2^{\Delta 4}-1)$ which is previously stored in an address of ROM 210 specified by the data Δ4. The operation of $$(Bv-Tvs)+\log_2(2^{\Delta 4}-1)=Qvf \quad (12)$$

is performed in adding circuit 216 using the data corresponding to the $\log_2(2^{\Delta 4}-1)$ obtained from the ROM 210 and the data corresponding to Bv-Tvs from the subtracting circuit 212. The data corresponding to the flash light quantity Qvf of the flash light only is calculated and is sent to the D-A converter DAo to control the flash light quantity.

Here, the reason why the equation (12) provides the flash light quantity Qvf is explained. Rerranging the equation (2-5) by the equation (10), $$2^{Qvf}=2^{Bv-Tvs}(2^{\Delta 4}-1)$$

The logarithms of both sides of this equation result in $$Qvf = Bv - Tvs + \log_2(2^{\Delta 4} - 1) \quad (12)$$

to establish the equation (12). Accordingly, the flash light quantity Qvf of the flash light can only be given by the equation (12). The data corresponding to the set exposure time Tvs and obtained from the register 204 of FIG. 21 is sent to the shutter controlling apparatus CS.

FIG. 22 is a block diagram showing the operation of the calculator AL in the case where the value Δ4 indicating the increase of the light quantity due to the flash light is applied in case of the diaphragm priority mode. The operation of $$Avs - Sv = Qvt \quad (9-2)$$

is performed in the subtracting circuit 224 using the data corresponding to the set diaphragm value Avs and the set film sensitivity Sv from the registers 220 and 208, to calculate the entire light quantity Qvt. The data corresponding to $$(Bv + \Delta 4)$$

is calculated in the adding circuit 222 using the data corresponding to the value Δ4 and the photographic object brightness Bv from the registers 202 and 206. And the subtracting circuit 226 performs the operation of $$Bv + \Delta 4 - Qvt = Tvx \quad (10\text{-}2)$$

using the data from the adding circuit 222 and the subtracting circuit 224, to calculate the proper exposure time Tvx. The data calculated in the subtracting circuit 226 is sent to the display apparatus DS and the shutter controlling apparatus CS.

On the other hand, the data corresponding to the Δ4 from the register 202 is converted to the data corresponding to the $\log_2(2^{\Delta 4}-1)$ in the ROM 210. The data corresponding to $$(Bv - Tvx)$$

is calculated in the subtracting circuit 210 using the data corresponding to the exposure time Tvx calculated in the subtracting circuit 226 and the photographic object brightness Bv from the register 206. And the operation of $$Bv - Tvx + \log_2(2^{\Delta 4} - 1) = Qvf \quad (12)$$

is performed in the adding circuit 216 using the data from the ROM 210 and the subtracting circuit 212. The data is sent to the D-A converter DAo. The data corresponding to the set diaphragm value Avs set in the register 220 is sent to the diaphragm controlling apparatus CA.

FIG. 23 is a block diagram showing the action of the calculator AL in the case where the data corresponding to the Δ4 and the flash light quantity of Qvf have been both inputted. In a ROM 230, the data corresponding to the Δ4 from the register 202 is converted to the data corresponding to $-\log_2(1-2^{-\Delta 4})$. In the ROM 230, the address of the ROM 230 is specified by the data corresponding to the Δ4 in a manner similar to that described above for producing the data corresponding to the $-\log_2(1-2^{-\Delta 4})$ from the ROM 210. The operation of $$Qvt = Qvf + \{-\log_2(1-2^{-\Delta 4})\} \quad (13)$$

is performed in an adding circuit 232 using the data from the ROM 230 and the data corresponding to the flash light quantity Qvf from a register 228, to calculate the entire light quantity Qvt. The reason why the entire light quantity Qvt can be given by the equation (13) will be described. Since $$Bv - Tvx = Qvt - \Delta 4 \quad (10\text{-}3)$$

and $$2^{Qvf} + 2^{Bv - Tvx} = 2^{Qvt} \quad (2\text{-}5)$$

the following equation is obtained $$2^{Qvf} = 2^{Qvt} \times (1 - 2^{-\Delta 4}) \quad (2\text{-}7)$$

The logarithms of both sides in the equation (2-7gives $$Qvt = Qvf - \log_2(1 - 2^{-\Delta 4}) \quad (13)$$

Accordingly, the Qvt is obtained.

The data corresponding to $$(Bv + \Delta 4)$$

is calculated in an adding circuit 222 using the data Δ4 from the register 202 and the photographic object brightness Bv from the register 206. The operation of $$Bv + \Delta 4 - Qvt = Tvx \quad (10\text{-}2)$$

is performed in the subtracting circuit 226 using the data from the adding circuit 222 and the data corresponding to the entire light quantity Qvt from an adding circuit 232, to calculate the data corresponding to the exposure period Tvx. The calculated data in the subtracting circuit 226 is sent to the shutter controlling apparatus CS and the display apparatus DS. Also, the operation of $$Qvt + Sv = Avx \quad (9\text{-}1)$$

is performed in the adding circuit 218 according to the data corresponding to the entire light quantity Qvt from adding circuit 232 and the film sensitivity Sv from the register 208. The data corresponding to the diaphragm value Avx calculated by the equation (9-1) is sent to the diaphragm controlling apparatus CA and the display apparatus DS. The data corresponding to the emitted light quantity Qvf from the register 228 is applied to the D-A converter DAo.

FIG. 24 is a block diagram showing the action of the calculator AL in the case where the data of the flash light quantity Qvf to be emitted is applied to the calculator AL in the exposure time priority mode. In a subtracting circuit 212, $$(Bv - Tvs)$$

is calculated using the data corresponding to the photographic object brightness Bv from the register 206 and the data corresponding to the set exposure period Tvs from the register 204. Then, the operation of $$Qvf - (Bv - Tvs) = \Delta 1 \quad (1)$$

is performed in a subtracting circuit 234 using the data from the subtracting circuit 212 and the data corresponding to the set flash light quantity Qvf from the register 228. In the equation (1), the $\Delta 1$ is equivalent to the difference between the flash light quantity Qvf and the ambient light quantity Bv–Tvs of the ambient light during the exposure time and is the lighting contrast described in the first embodiment.

The data corresponding to the lighting contrast $\Delta 1$ obtained from a subtracting circuit 234 is converted to the data corresponding to the $\log_2(1+2^{\Delta 1})$ by a ROM 236 and is sent to the display apparatus DS. Since $$\log_2(1+2^{\Delta 1})=\Delta 4 \tag{14}$$

is established, the data corresponding to the $\Delta 4$ is produced from the ROM 236. The produced signal is then sent to the display apparatus DS. The reason why the equation (14) is established is described below. By the rearrangement of the equation (2-5), using the equation (1), $$2^{Bv-Tvs}(1+2^{\Delta 1})=2^{Qvt} \tag{2-8}$$

is established. By taking the logarithms of the both sides of the equation (2-8), $$\log_2(1+2^{\Delta 1})=Qvt-(Bv-Tvs) \tag{15}$$

is obtained. Since the right side of the equation (15) is equal to $\Delta 4$ as understood from the equation (10), $$\log_2(1+2^{\Delta 1})=\Delta 4 \tag{14}$$

is established.
The operation of $$\Delta 4+(Bv-Tvs)=Qvt \tag{10-1}$$

is performed in an adding circuit 214 using the data corresponding to the $\Delta 4$ from a ROM 236 and the data corresponding to the (Bv–Tvs) from the subtracting circuit 212, to calculate the entire light quantity Qvt. The operation of $$Qvt+Sv=Avx \tag{9-1}$$

is performed in an adding circuit 218 using the data corresponding to the entire light quantity Qvt of the adding circuit 214 and the data corresponding to the film sensitivity Sv from the register 208. The data corresponding to the diaphragm value Avx is calculated and is sent to the display apparatus DS and the diaphragm controlling apparatus CA. Also, the data corresponding to the set exposure time Tvs from the register 204 is sent to the shutter controlling apparatus CS. The data corresponding to the flash light quantity Qvf from the register 228 is sent to the D-A converter DAo.

FIG. 25 is a block diagram showing the operation in the case where the flash light quantity Qvf has been applied to the calculator AL in the diaphragm priority mode. The operation of $$Qvf+Sv=Avf \tag{5}$$

is performed in an adding circuit 238 using the data corresponding to the set light quantity from the register 228 and the data corresponding to the film sensitivity Sv from the register 208. The data corresponding to $$Avs-Avf=\Delta 3 \tag{6}$$

is calculated in a subtracting circuit 240 using the data of the adding circuit 238 and the data corresponding to the set diaphragm value Avs from the register 220. The value of $\Delta 3$ of the equation (6) is equivalent to the difference between the APEX value Qvt of the entire light quantity and the APEX value Qvf of the flash light quantity of the apparatus ST for emitting the flash light as apparent from the equations (1) and (9). The data $\Delta 3$ is converted to the data corresponding to $-\log_2(1-2^{-\Delta 3})$ in a ROM 242. On the other hand, the operation of $$Bv+Sv=Ev \tag{11}$$

is performed in an adding circuit 244 using the data corresponding to the photographic object brightness Bv from the register 206 and the data corresponding to the film sensitivity Sv from the register 208, to calculate the data corresponding to the exposure value Ev. The operation of $$Ev-Avs=Tva \tag{8}$$

is performed in a subtracting circuit 246 using the data corresponding to the exposure value Ev from an adding circuit 244 and the data corresponding to the set diaphragm value Avs from the register 220, to calculate the data corresponding to the proper exposure time Tva for ambient light only. The operation of $$Tva+\{-\log_2(1-2^{-\Delta 3})\}=Tvx \tag{7}$$

is performed in an adding circuit 248 using the data corresponding to the proper exposure time Tva for the ambient light only from the subtracting circuit 246 and the data corresponding to the $-\log_2(1-2^{-\Delta 3})$ from the ROM 242. The data corresponding to the proper exposure period Tvx during the flash photographing operation is calculated and is sent to the display apparatus DS and the shutter controlling apparatus CS. The reason why the equation (7) is established will be described hereinafter. Since $$2^{Avf}+2^{Ev-Tvx}=2^{Avs}, \tag{2-9}$$

a following equation is obtained by rearranging the equation (2-9) with the equation (6).

$$2^{Ev-Tvx}=2^{Avs}(1-2^{-\Delta 3}) \tag{2-10}$$

The logarithms of the both sides of the equation (2-10) provide $$Tvx=Tva-\log_2(1-2^{-\Delta 3}) \tag{7}$$

A subtracting circuit 250 calculates $$(Ev-Tvx)$$

using the data corresponding to the exposure values Ev by the ambient light from the adding circuit 244 and the data corresponding to the exposure time Tvx from an adding circuit 248. And the operation of $$Avs-(Ev-Tvx)=\Delta 4 \tag{10-3}$$

is performed in a subtracting circuit 252 using the data corresponding to the set diaphragm value Avs from the register 220 and the data corresponding to Ev−Tvx from the subtracting circuit 250. The data corresponding to the Δ4 is calculated and is sent to the display apparatus DS. Also, the data corresponding to the set flash light quantity from the register 228 is sent to the D-A converter DAo. The data corresponding to the set diaphragm value Avs from the register 220 is sent to the diaphragm controlling apparatus CA.

FIG. 26 is a block diagram showing the case of a manual mode. As carried out in the exposure time priority mode shown in FIG. 21 or FIG. 24, in the manual mode an adding circuit 218 calculates the diaphragm value Avx using the set exposure time Tvs. Then, the subtracting circuit 254 calculates the difference Δ2 between the data corresponding to the diaphragm value Avx from the adding circuit 218 and the data corresponding to the set diaphragm value Avs from the register 220.

$$Avs - Avx = \Delta 2 \qquad (16)$$

The calculated value of the subtracting circuit 254 is displayed by the displaying apparatus DS. The data corresponding to the diaphragm value Avs of the register 220 is sent to the diaphragm controlling apparatus CA. The controlling operation of the shutter controlling apparatus CS is performed using the set data.

When the data corresponding to Δ4 and the light quantity Qvf are not applied to the corresponding circuits, the exposure operation is performed with respect to the normal ambient light only, in the known manner. Therefore, the description for this operation is omitted.

Figure 27:
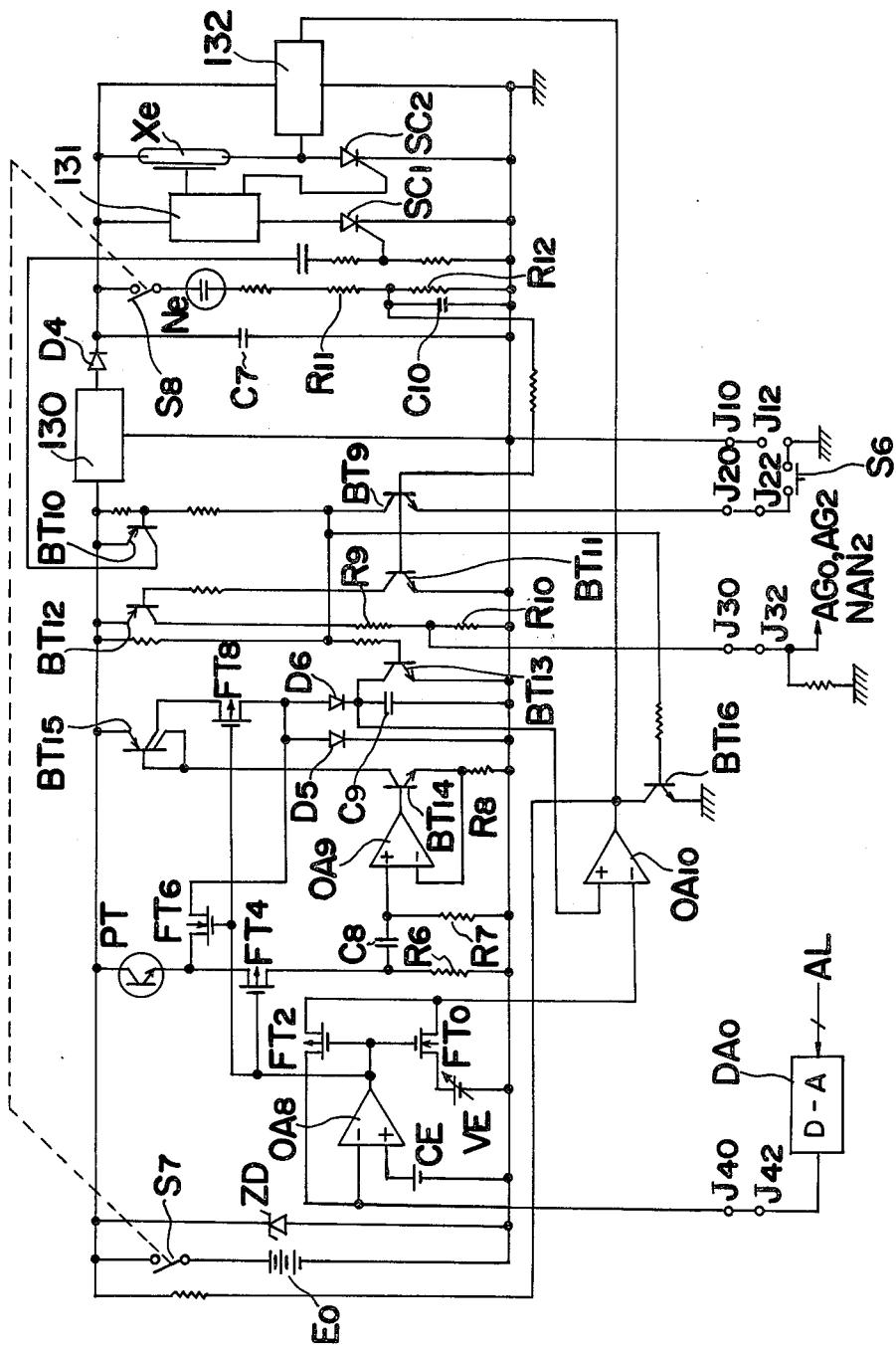
FIG. 27 is a circuit diagram of a flash light emanating apparatus employed in the circuit of FIG. 20.

FIG. 27 shows one example of a concrete circuit of the flash light emitting apparatus of FIG. 20. Referring to FIG. 27, a switch S7 is a main switch. A switch S8 opens or closes in association with the operation of the switch S7. Upon closure of the switch S7, the DC-DC converter circuit 130 is operated. A main capacitor C7 is charged through a rectification diode D4. When the charging voltage of the main capacitor C7 reaches a given value, a neon tube Ne is conducted and lit to display that the xenon tube Xe is ready to be radiated. Also, when the neon tube Ne is conducted to flow a current through resistors R11 and R12, the electric potential at a junction between the resistors R11 and R12 becomes a predetermined level capable of conducting the transistors BT9 and BT11. Accordingly, the transistors BT11 and BT12 are conducted to set a "High" level of electric potential at the junction between the resistors R9 and R10. The "High" signal at the junction is transmitted to the camera through the connecting terminals J30 and J32.

A capacitor C10 functions to maintain the transistors BT9 and BT11 conductive for some time after the xenon tube Xe has been radiated to reduce the voltage across the main capacitor C7 and to turn the neon tube Ne non-conductive. Also, a circuit is so designed that the transistors BT9 and BT11 can be maintained conductive during a period longer than that required for the flash light emitting apparatus to emit light completely.

The analog signal corresponding to the flash light quantity Qvf from the D-A converter DAo in the camera is applied to the flash light emitting apparatus ST through connecting terminals J40 and J42. Then, the analog signal is compared with the output voltage of the constant-voltage source CE at a comparator 0A8. When the output voltage of the constant-voltage source CE is greater, the system is so controlled as to carry out the ordinary automatic electronic flash photography. When the output voltage of the constant-voltage source CE is smaller, the system is so controlled as to carry out the photographing according to the signal corresponding to the light quantity Qvf from the camera.

First, a case where the controlling operation is performed with the light quantity signal from the camera will be described. In this case, since the output from the comparator 0A8 is "Low", each of P channel MOS-FET's (FT2), (FT4), (FT8) is "ON", and each of N channel MOSFET's (FT0), (FT6) is "OFF". Upon closure of X contact S6 in the camera, transistors BT9, BT10 become "ON". Accordingly, the gate potential of the thyristor SC1 rises to turn thyristor SC1 conductive. As a result, the xenon tube Xe and the thyristor SC2 are triggered by a trigger circuit 131 so that the xenon tube Xe becomes conductive, and the flash light is radiated.

Also, when the transistor BT9 becomes conductive, transistors BT13 and BT16 which have been conducting becomes non-conductive. The transistor BT13 is a discharging transistor for discharging an integrating capacitor C9. A transistor BT16 is provided for maintaining the output of an comparator 0A10 "Low" until the X contact S6 is closed.

When the xenon tube Xe emits light, the output current of the photo-transistor PT increases to increase the voltage across the resistor R6. Only the voltage increment (so-called AC component) is outputted from a high-pass filter composed of a capacitor C8 and a resistor R7. The voltage outputted from the high-pass filter is converted to current by a voltage-current converting circuit composed of an operation amplifier OA9, a transistor BT14 and a resistor R8. The current of the voltage-current converting circuit flows, through transistor BT15 and FET (FT8), into a known logarithm compression integrating circuit composed of diodes D5, D6 and a capacitor C9. In the logarithm compression integrating circuit, the voltage where the integral value of the inflowing current has been logarithmically compressed is applied across the capacitor C9. The output voltage of the capacitor C9 is compared, in the comparator OA10, with the analog signal corresponding to the light quantity QVf from the D-A converter DAo in the camera. When they reach a predetermined relation, the output of the comparator OA10 is inversed from "Low" to "High". The "High" signal from the comparator OA10 operates a stopping circuit 132 to de-actuate the thyristor SC2 to a non-conductive state. Accordingly, the light emission of the xenon tube Xe is stopped. Thus, the flash light quantity of the xenon tube Xe is controlled to the flash light quantity corresponding to the analog signal Qvf from the D-A converter DAo.

When the output voltage of the constant-voltage source CE is larger than the signal from the D-A converter DAo, the output of the comparator OA8 becomes "High" to turn the N channel MOSFET's (FT0) and (FT6) on and the P channel MOSFET's (FT2), (FT4) and (FT8) off. Thus, the output current of the phototransistor PT directly flows into the logarithm compression integrating circuit composed of the diodes D5, D6 and capacitor C9. The voltage output from the variable voltage source VE corresponding to the film sensitivity, photographing diaphragm value, etc., is inputted to the minus terminal of the comparator to control the flash light quantity through a procedure as in an ordinary automatic electronic flash device.

In the above-described embodiment, both, or either one of Δ4 and the emitted flash light quantity Qvf can be set. Also, the setting apparatus can be provided on the flash light emitting apparatus, instead of the camera. In addition, the light measuring circuit for measuring the flash light quantity of the flash light emitting apparatus, and the comparator may be provided on the camera to produce the flash light stopping signal from the camera.

Further, the data from the calculation circuit should be sent to the shutter controlling apparatus directly in the case of the lens shutter. On the contrary, in the case of focal plane shutter, an alarm may be produced or the calculated exposure factor may be corrected to provide the exposure time longer than the synchronizing time only when the calculated exposure time is shorter than the possible synchronizing time.

According to a preferred embodiment, it is advantageous to use a microcomputer. It is easy for persons in the art to draft a program for the microcomputer in accordance with the disclosed contents of the drawings shown in FIG. 20 through FIG. 27. Also, since the diaphragm and shutter controlling apparatuses and the display circuit, which are known, can be used, a description of the contents thereof is omitted.

The apparatus SE2 for setting Δ4 in FIG. 20 can be modified as follows. The brightness Bv1 of a main photographic object and the brightness Bv2 of a secondary photographic object are stored in accordance with the output of one spot light measuring circuit. From these two data, $$Bv2 - Bv1 = \Delta 5 \tag{16}$$

is calculated. If the flash light quantity QVf is determined with this Δ5 substituted for Δ4, even when the main photographic object is darker than the secondary photographic object as in counter-light photographing, the main and secondary photographic objects can be photographed under the proper exposure with the same brightness.

Also, for taking a photograph in which the main object is reproduced as if brighter than the background, i.e., the secondary object even in counter-light photography, an apparatus for setting a value l in an APEX system, by which the luminance of the main object is desired to be greater than that of the secondary object, may be provided to determine the flash light quantity. For the operation, the data Δ5 given by the equation (16) is added to the set data l to obtain Δ4 as follows:

$$\Delta 5 + l = \Delta 4 \tag{17}$$

and the flash light quantity Qvf may be obtained using Δ4 from the equation (17).

In addition, the display of the difference between Δ4 manually set or calculated and the data Δ5 obtained from the equation (16) as follows:

$$\Delta 6 = \Delta 4 - \Delta 5 \tag{18}$$

makes and it possible to understand the difference of brightness between the main photographic object and the secondary object of the picture taken in accordance with the set Δ4, previous to the photographying.

As for the light measuring circuit for obtaining Δ5 of the equation (16), it is possible to employ two spot light-measuring circuits or a combination of an average light measuring circuit and a spot light measuring circuit.

In other words, for this purpose, the light quantity Qvf that satisfies the equation $$2^{Qvf} + 2^{Bv1 - Tv} / 2^{Bv2 - Tv} = 2^l \tag{19}$$

should be obtained. Since the flash light emitting apparatus generally provides hardly any light on the secondary photographic object, the equation (19) can be rearranged as follows:

$$2^{Qvf} + 2^{Bv1 - Tv} = 2^{Bv2 + l - Tv} = 2^{Bv1 + \Delta 5 + l - Tv} \tag{19-1}$$

From this equation, it is understood that the equation (17) is established. Also, $$Qvf = Bv1 - Tv + \log_2(2^{\Delta 5 + l} - 1)$$

can be given. Here, it is to be noted that the above-described modified example can be given when l=0 in the above equation.

Also, when setting Δ4, the total light quantity of the main photographic object is $$Qvt = Bv1 - Tv + \Delta 4$$

Since the total light quantity of the secondary photographic object is Bv2−Tv, $$Qvt - (Bv2 - Tv) = (Bv1 - Bv2) + \Delta 4 = \Delta 4 - \Delta 5 = \Delta 6 \tag{18-1}$$

is established. Thus, Δ6 is obtained.

Also, in the case of a so-called programming mode where the combination of the diaphragm value Ava and the exposure time Tva are determined from the photographic object brightness Bv and the film sensitivity Sv, the same operation is required to be performed as in the diaphgragm priority mode, the exposure time priority mode, or the exposure time priority mode with the calculated diaphragm value Ava or the exposure time Tva being set.

FIG. 28 is an embodiment for calculating the Δ4 in accordance with the brightness difference between the two portions. LM4 is a light measuring circuit for measureing the brightness Bv1 of the main photographic object. LM6 is a light measuring circuit for measuring the brightness of the secondary photographic object. The outputs of the two light-measuring circuits LM4 and LM6 are applied to the A-D converter AD2 in the time sequence by a multiplexer MP and are converted into digital signals. The signals are set in registers 206 and 256 by a demultiplexer DM with time sequence. Accordingly, the brightness signal Bv1 of the main photographic object is set to the register 206 and the brightness signal Bv2 of the secondary photographic object is set to the register 256. The signals from the two registers are applied to a subtraction circuit 258, and the operation of the following equation $$Bv2 - Bv1 = \Delta 5 \tag{16}$$

is performed. SE10 is an apparatus where a signal indicative of the value l, which is a difference between luminances of the main photographic object and the secondary photographic object under flash and ambient light, is set. The signal l from the setting apparatus SE10 and the signal Δ5 from the subtracting circuit 258 are applied to the adding circuit 260 to perform the operation of the following equation (17)

$$\Delta 5 + 1 = \Delta 4 \tag{17}$$

to calculate the value Δ4, on the main photographic object. If the apparatus of FIG. 28 is replaced by the setting apparatus SE2 of FIG. 20, it is possible to take pictures with a desired contrast between the main and secondary photographic objects.

FIG. 29 shows an embodiment for calculating a value Δ6 indicating the difference of brightness in steps between the main photographic object and the secondary photographic object, by using the set or calculated value Δ4, showing the increase of light quantity due to the flash light in addition to the ambient light. As described above in connection with FIG. 28, the Δ5 is calculated from the subtracting circuit 258. This calculated data Δ5 and the data Δ4 from the calculator AL or the AND gate AG2 are applied to the subtraction circuit 262 for carrying out the operation as follows:

$$\Delta 4 - \Delta 5 = \Delta 6 \tag{18}$$

The signal Δ6 is then displayed, showing a step in an APEX system by which the luminance of the main photographic object will become greater than that of the secondary photographic object due to the flash light in addition to the ambient light.

Although it is assumed that the flash light from the flash light emitting apparatus does not reach the secondary photographic object, there may be a case when the flash light also hits the secondary object. For example, such case may be when the main and secondary photographic objects are disposed closely adjacent to each other. However, in the case of rear light photographing, the brightness of the secondary photographic object is much brighter than the main photographic object. Thus, an effect given to the secondary photographic object by the light emission of the flash light emitting apparatus can be neglected, when compared with the effect given to the main photographic object. Accordingly, there will be no problem even if Δ6 is considered as the difference in light quantity during the photographing operation between the secondary and main photographic objects.

In the embodiment shown in FIG. 20 through FIG. 29, the exposure is controlled in relation to the value Δ4 showing a value by which the light quantity will be increased due to the flash light in addition to the ambient light. As shown in the equation (14), there is the relationship of $$\log_2(1 + 2^{\Delta 1}) = \Delta 4 \tag{14}$$

$$\log_2(2^{\Delta 4} - 1) = \Delta 1 \tag{14-1}$$

with respect to the lighting contrast Δ1. Accordingly, it is the same as the first embodiment where the exposure is controlled in relation to the lighting contrast Δ1 shown in FIG. 1 through FIG. 19.

In the above-described first and second embodiments, the control of the flash light quantity from the flash light emitting apparatus is carried out by using the light measuring output of the reflected light quantity from the photographing object. Strictly speaking, accordingly, "Qvf" in the first and second embodiments means the flash light quantity reflected from the object. On the contrary, in the next embodiment of FIG. 30 through FIG. 39, the operation is controlled by the use of a signal of the distance to the photographing object. In other words, the incident light quantity to the photographing object is controlled and Qvf means the incident light in the following embodiments.

Third Embodiment

The principle of the third embodiment will now be described. The relationship of $$G = a\sqrt{2^{Sv} \cdot P} \tag{20}$$

is satisfied wherein P is the flash light quantity from light the emitting tube of the flash-light emitting apparatus, Sv is an apex value of film sensitivity, G is a guide number and a is a constant. The guide number G is defined, when Sv=5, as follows.

$$G = a\sqrt{2^5 \cdot P} \tag{20-1}$$

The relationship of $$\sqrt{2^{Avf}} \cdot D = (a \cdot G)\sqrt{2^{Sv-5}} \tag{21}$$

is given among the object distance D, the APEX value Avf of the diaphragm value determined by only the flash light quantity, the flash light quantity α.G (α is variable) from the flash-light emitting apparatus, and the apex value Sv of the film sensitivity. Since the relationship of $$Qvf + Sv = Avf \tag{5}$$

is given between the apex value Avf of the liquid quantity incident to the photographic object by the flash light and the apex value Avf of the diaphgram value, the equation (21) becomes as follows.

$$\sqrt{2^{Qvf}} \cdot D = (a \cdot G)\sqrt{2^{-5}} \tag{21-1}$$

The logarithm of both sides of the equation (21-1) provides $$\log_2(\alpha.G) = \frac{1}{2}(Qvf + 5) + \log_2 D \tag{21-2}$$

Accordingly, if the shooting distance D and the incident light quantity Qvf applied by the flash light to the photographic object are previously known the flash light amount (α.G) or the log₂(α.G) can be calculated from the equation (21-1) or the equation (21-2). When the flash light amount is controlled according to this value, the apex value of the incident light quantity by the flash light to the photographic object would be Qvf and the incident light quantity would be $2^{Qvf}$. The relationship of $$2^{Av} = 2^{Sv} \cdot 2^{Qvt} = 2^{Sv} \cdot (2^{Qvf} + 2^{Bv-Tv}) \tag{2}$$

is established wherein Bv is an apex value of photographic object brightness by incident light system, Qvt is an apex value of total light quantity incident to photographic object during a flash-light photographic operation, Tv is an exposure time and Av is a diaphragm value. Also, the lighting contrast Δ1 is expressed as follows.

$$\Delta 1 = Qvf - (Bv - Tv) \quad (1)$$

A value Δ4 is expressed as follows.

$$\Delta 4 = Qvt - (Bv - Tv) \quad (10)$$

When the exposure time Tvs and the lighting contrast Δ1 are set, the incident light quantity Qvf by the flash from the equation (1) is given by $$Qvf = \Delta 1 + (Bv - Tvs). \quad (1\text{-}1)$$

The flash light quantity of the flash-light emitting apparatus is controlled, in accordance with the equation (21-2) from the obtained value and the distance D. In addition, the (Bv-Tvs) is removed from the equation (2) with the use of the equation (1) to establish $$2^{Avx} = 2^{Sv} \cdot 2^{Qvf} \cdot (1 + 2^{-\Delta 1}) \quad (2\text{-}1)$$

The logarithm of both sides of the equation (2-1) provides $$Avx = Qvf + Sv + \log_2(1 + 2^{-\Delta 1}) \quad (3)$$

Also, from the equation (14), $$\Delta 4 = Qvt - (Bv - Tvs) = \log_2(1 + 2^{\Delta 1}) \quad (14)$$

is obtained to provide Δ4.

When the diaphragm value Avs and the lighting contrast Δ1 are set, the incident light quantity by the flash light to the photographic object is expressed as follows.

$$Qvf = Avs - Sv - \log_2(1 + 2^{-\Delta 1}) \quad (4)$$

Accordingly, the flash light quantity by the flash light can be controlled by equation (21-2) from the value and the object distance D. In addition, the exposure time Tvx is calculated as $$Tvx = \Delta 1 + Bv - Qvf \quad (1\text{-}3)$$

Also, the Δ4 is obtained from the equation (14).

When the exposure time Tvs and the Δ4 are set, $$Qvf = Bv - Tvs + \log_2(2^{\Delta 4} - 1) \quad (12)$$

is given to obtain the incident light quantity to the photographic object by the flash light. The diaphragm value Avx is obtained from the equation of $$Avx = Qvt + Sv = Bv + Sv + \Delta 4 - Tvs \quad (9\text{-}1)$$

Also, the lighting contrast Δ1 is given by $$\Delta 1 = \log_2(2^{\Delta 4} - 1) \quad (14\text{-}1)$$

When the diaphragm Avs and Δ4 are set, a following equation is obtained from the equation (6)

$$Tvx = Bv + \Delta 4 - Qvt \quad (10\text{-}2)$$

$$= Bv + \Delta 4 - (Avs - Sv)$$

The incident light quantity Qvf to the photographic object by the flash light is given by $$Qvf = Bv - Tvx + \log_2(2^{\Delta 4} - 1) \quad (12)$$

from the equation (9). The lighting contrast Δ1 is given from the equation (14).

When the incident light quantity Qvf to the photographic object by the flash light, and the exposure time Tvs are set, the flash light quantity from the flash light can be controlled by the use of set value Qvf and the distance D. The equation (1)

$$\Delta 1 = Qvf - (Bv - Tvs) \quad (1)$$

provides the lighting contrast Δ1 and the equation (14) provides the value Δ4. Further, the equation (3) provides the diaphragm value Avx.

When the incident light quantity Qvf to the photographic object by the flash and the diaphragm value Avs are set, first, $$\Delta 3 = Avs - Avf \quad (6)$$

$$= Avs - (Qvf + Sv)$$

is calculated. Then, $$Tvx = Bv + Sv - Avs - \log_2(1 - 2^{-\Delta 3}) \quad (7)$$

$$= Tva - \log_2(1 - 2^{-\Delta 3})$$

is calculated to obtain the exposure time Tvx. Also, the Δ4 can be obtained from the equation (14-1).

Since the normal camera light measuring system is of a reflection light type, the operation of $$Bv = Bv' + K \quad (22)$$

is required to convert the output Bv' of the light measuring circuit into value of the incident light type. Here K is a constant corresponding to the reflectance of the standard photographic object. The reflection light decreases by the reflectance of the photographic object when compared with the incident light.

Also, the signal of the object distance D can be obtained from the known distance detecting apparatus or from a member provided in association with the focus adjustment of the lens.

Figure 30:
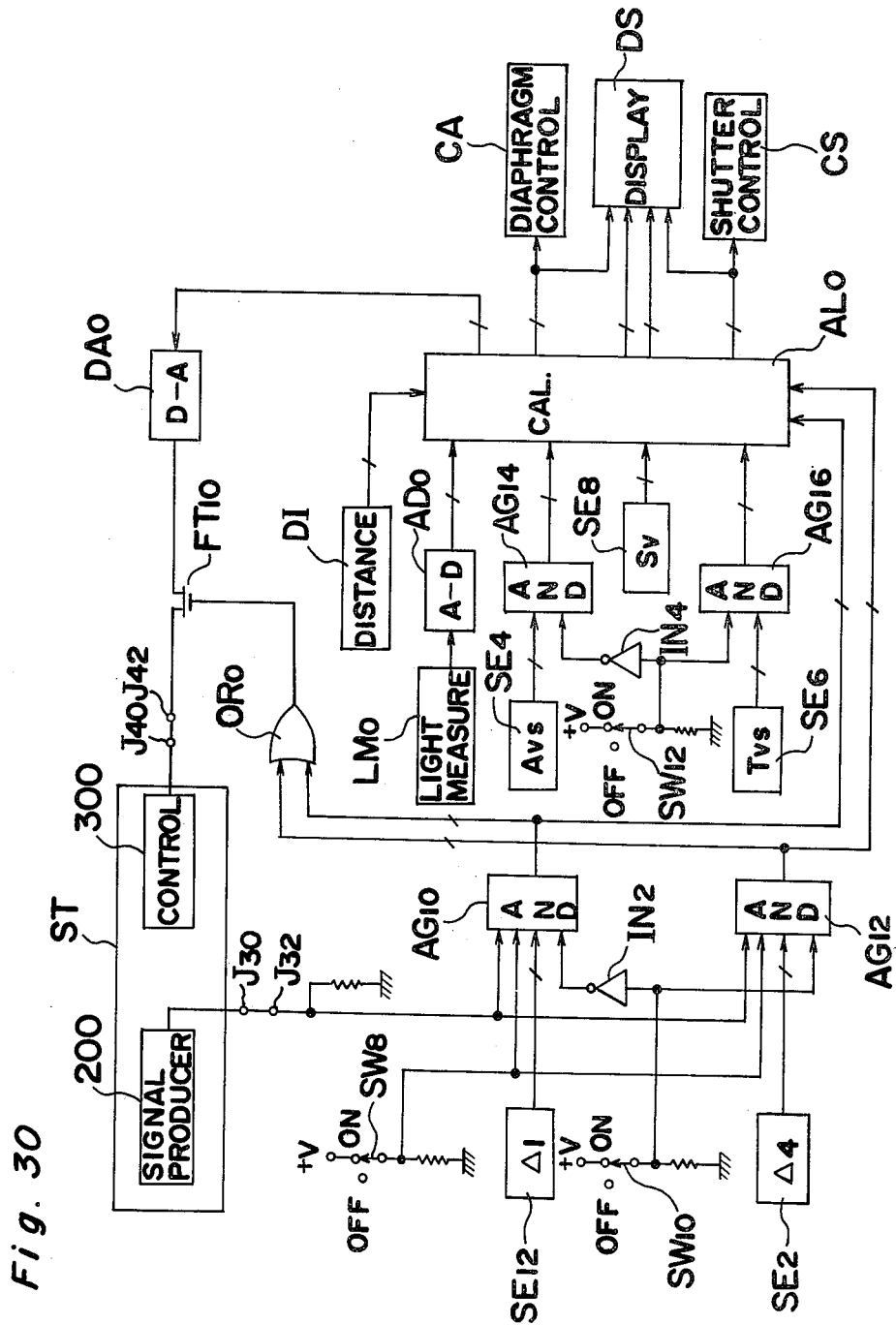
FIG. 30 is a block diagram of an exposure control system of the present invention according to the third embodiment.

FIG. 30 is a block diagram showing a third embodiment of the present invention. SE12 is a setting apparatus wherein the data corresponding to the lighting contrast Δ1 is outputted. SE2 is a setting apparatus wherein the data corresponding to the Δ4 is outputted. SE4 is a setting apparatus wherein the data corresponding to the diaphragm value Avs is outputted. SE6 is a setting apparatus wherein the data corresponding to the exposure time Tvs is outputted. SE8 is a setting apparatus wherein the data corresponding to the film sensitivity Sv is outputted. LMo is a light measuring circuit for measuring the ambient light by the reflection light system. ADo is an A-D converter. D1 is a distance signal outputting apparatus composed of a distance detecting apparatus for outputting the data corresponding to the photographic object distance D or an apparatus for outputting a lens-focus adjusting position signal. ALo is a calculator. CA is a diaphragm controlling apparatus. DS is a display apparatus. CS is a shutter controlling apparatus. DAo is a D-A convertor.

ST is a flash-light emitting apparatus having terminals J30 and J40 provided for the connection with the terminals J32 and J42, respectively, of the camera. The flashlight emitting apparatus ST has a signal outputting circuit 200 for outputting a signal "High" when it is ready to emit light and a light emission control circuit 300 for controlling the flash light quantity according to a signal from the D-A converter DAo.

The operation will be described below. In the case where the switches SW8 and SW10 are "ON", and the signal outputting circuit 200 is producing "High", the set data of Δ4 from the setting apparatus SE2 is outputted from an AND gate AG12. At this time, the output of an inverter IN2 is "Low" and thus the AND gate AG10 is closed for producing "0". On the contrary, when the switch SW10 is "OFF", the AND gate AG10 is opened for allowing the set data of the lighting contrast Δ1 from the setting apparatus SE12 to pass through the AND gate AG10. In this case, the output of the AND gate AG12 is 0. Also, when the switch SW8 is "OFF" or the signal of "high" is not outputted from the signal outputting circuit 200, the AND gates AG10, AG12 are both closed so that the output of the both gates is 0.

When the switch SW12 is "ON", AND gate AG16 is opened while an AND gate AG14 is closed. Accordingly, the data corresponding to the setting exposure time Tvs produced from the setting apparatus SE6 is outputted from the AND gate AG16. In this case, output of the AND gate AG14 is 0. When the switch SW12 is "OFF", the output of an inverter IN4 is "High". Accordingly, the AND gate AG14 is opened to allow the data corresponding to the set diaphragm value Avs to pass through the AND gate AG14.

The operation circuit ALo calculates in accordance with the above-described equation using the data from the AND gates AG10, AG12, AG14, and AG16, the distance signal outputting apparatus D1, the A-D converter ADo and the setting apparatus SE8 to obtain the exposure control value, the flash light quantity, and values Δ1 and Δ4. The data corresponding to the calculated exposure control value and the calculated value Δ1 or Δ4 are applied to the display apparatus DS to display the calculated value.

The data corresponding to the calculated or set diaphragm value from the calculator ALo is applied to the diaphragm control apparatus CA for controlling the diaphragm to a diaphragm value corresponding to the data which has been inputted through the function of the known diaphragm controlling apparatus CA. Also, the data corresponding to the calculated or set exposure time from the calculator ALo is inputted to the shutter controlling apparatus CS. The exposure time corresponding to the inputted data is obtained through the function of the known shutter controlling apparatus CS. The data of the flash light quantity calculated by the calculator ALo is converted into an analog signal by the D-A converter DAo. The analog signal is then applied to the flash light quantity controlling circuit 300 to control the flash light quantity of the flash light emitting apparatus ST in a manner described later.

Also, when the data from the AND gates AG10, AG12 are not produced, the calculator ALo performs the operation as in the ordinary ambient light photography without flash or in the ordinary automatic electronic flash photography to control the exposure. In addition, at this time, the output of an OR circuit ORo is "Low", and thus the FET (FT10) becomes non-conductive to provide no signals to the control circuit 300. As described later, the control circuit 300 detects the above fact to control the flash light quantity through the normal reflection-light-type when the light emitting preparation is completed.

FIG. 31 is a block diagram illustrating the operation of the calculator ALo, which converts the photographic object brightness under the ambient light measured by the reflection light type as obtained from the A-D converter ADo into data corresponding to the photographic object brightness Bv measured by the incident light type. The data Bv' from the A-D converter ADo is set in a register 302. The data from an outputting circuit 304 for outputting the fixed data K corresponding to the reflectance of the standard photographic object, and the data from register 302 are applied to an adding circuit 306 to carry out $$Bv = Bv' + K \tag{22}$$

The result from this circuit 306 provides the data Bv of the photographic object brightness at the incident light type. The calculated data is set in a register 312 in FIG. 32 et seq.

FIG. 32 is a block diagram illustrating the operation of the calculator ALo in the case where exposure time Tvs and the lighting contrast Δ1 are set. The data Bv from a register in which the data from the adding circuit 306 is set, and the data Tvs from the register 314 in which the data from an AND gate AG16 is set are inputted to a subtracting circuit 318 to calculate the data corresponding to Bv-Tvs. And the data from the substracting circuit 318 and the data corresponding to the lighting contrast Δ1 from the register 310 are inputted to an adding circuit 324 to calculate $$\Delta 1 + (Bv - Tvs) = Qvf \tag{1-1}$$

The result from this circuit 324 provides the incident light quantity to the photographic object by the flash light emission.

The data corresponding to the set lighting contrast Δ1 from the register 310 specifies the address of a ROM 326. The data, $\log_2(1+2^{-\Delta 1})$ corresponding to the set lighting contrast Δ1 which is fixedly stored in a specified address is outputted from the ROM 326. Namely, the ROM 326 functions as a data converter for converting the data corresponding to the lighting contrast Δ1 into the data corresponding to the $\log_2(1+2^{-\Delta 1})$. And the data Qvf from an adding circuit 324, the data $\log_2(1+2^{-\Delta 1})$ from the data converting ROM 326 and the data corresponding to the film sensitivity Sv from a register 316 are inputted to an adding circuit 336. In the adding circuit 336, $$Avx = Qvf + Sv + \log_2(1+2^{-\Delta 1}) \tag{3}$$

is performed to calculate the data corresponding to the controlling diaphragm value Avx. Thus obtained data Avx is inputted to the diaphragm apparatus CA and the display apparatus DS.

Also, the data converting ROM 322 converts the data corresponding to the set lighting contrast Δ1 from the register 310 into the data corresponding to $$\Delta 4 = \log_2(1+2^{\Delta 1}) \tag{14}$$

This data is a data corresponding to Δ4 as described hereinabove and is inputted to the display apparatus DS.

The data produced from the adding circuit 324 and corresponding to the incident light quantity Qvf by the flash-light emission to the photographic object, and the data from a fixed data outputting circuit 328 for outputting the fixed data corresponding to Sv=5 are inputted to an adding circuit 330, in which $$Qvf+5$$

is performed. The obtained sum is shifted one bit to a lower bit by a shift circuit 334 and is converted to the data corresponding to $$(Qvf+5)/2$$

On the other hand, the data from a register 308 in which the data D from the distance signal outputting apparatus DI is set is inputted to the data converting ROM 320 for producing the data corresponding to the $\log_2 D$. The data corresponding to the $\log_2 D$ from the data converting ROM 320 and the data corresponding to the $(5+Qvf)/2$ from the shift circuit 334 are inputted to the adding circuit 332 to carry out $$\log_2(\alpha.G)=(Qvf=5)/2+\log_2 D \qquad (21\text{-}2)$$

The sum obtained from the adding circuit 332 is the data corresponding to the flash light quantity of the flash light emitting apparatus ST. The data corresponding to the calculated $\log_2(\alpha.G)$ is then inputted to the D-A converter DAo.

Also, the data corresponding to the set exposure time Tvs is inputted to the shutter controlling apparatus CT.

Figure 33:
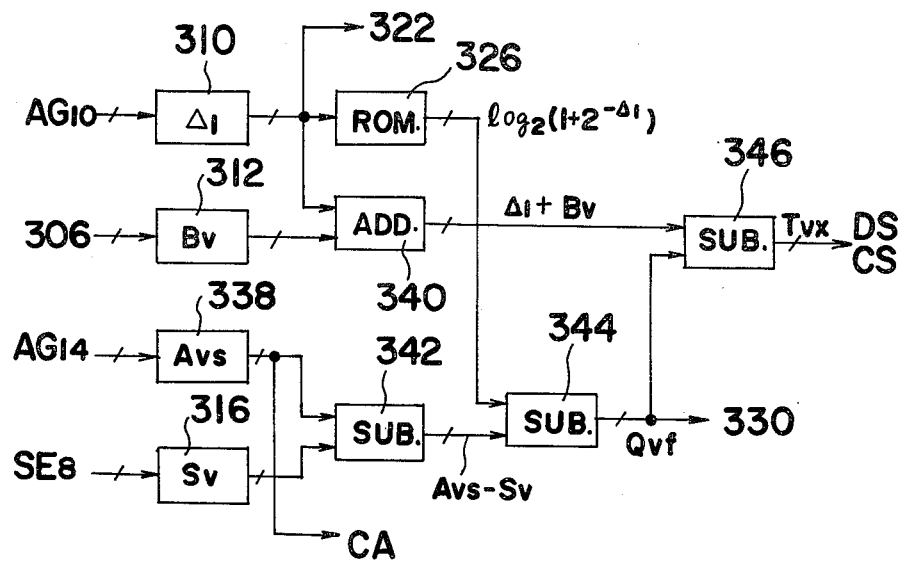

FIG. 33 is a block diagram illustrating the operation of the calculator ALo in the case where Δ1 is set in the diaphragm priority mode. The data from a register 338 in which the data corresponding to the set diaphragm value Avs is set and the data corresponding to the film sensitivity Sv from the register 316 are inputted to a substracting circuit 342 to calculate $$Avs-Sv$$

The data corresponding to the $\log_2(1+2^{-\Delta 1})$ according to the data from a register 310 is outputted from the data converting ROM 326. The data from the data converting ROM 326 and the data from a subtracting circuit 342 are inputted to a subtracting circuit 344 to perform the operation of $$Qvf=Avs-Sv-\log_2(1+2^{-\Delta 1}). \qquad (4)$$

Accordingly, the data corresponding to the incident light quantity Qvf by the flash light emission to the photographic object is calculated. The data corresponding to the calculated Qvf is sent to the adding circuit 330 of FIG. 32 to calculate the data corresponding to the flash light quantity $\log_2(\alpha.G)$ of the flash light emitting apparatus ST as in FIG. 32.

On the other hand, the data corresponding to Δ1 from a register 310 and the data corresponding to the Bv from a register 312 are inputted to an adding circuit 340 to perform the operation of $$\Delta 1 + Bv.$$

The data obtained from the adding circuit 340 and the data corresponding to the Qvf from the subtracting circuit 344 are inputted to an subtracting circuit 346 to perform the operation of $$Tvx=\Delta 1+Bv-Qvf \qquad (1\text{-}3)$$

The data corresponding to the exposure time Tvx calculated in the subtracting circuit 346 is inputted to the display apparatus DS and the shutter controlling apparatus CS.

Also, the data corresponding to Δ1 from the register 310 is sent to the data converting ROM 322 of FIG. 32 to output the data of Δ4 to the display apparatus DS. Also, the data corresponding to Avs from the register 338 is inputted to the diaphragm controlling apparatus CA.

Figure 34:
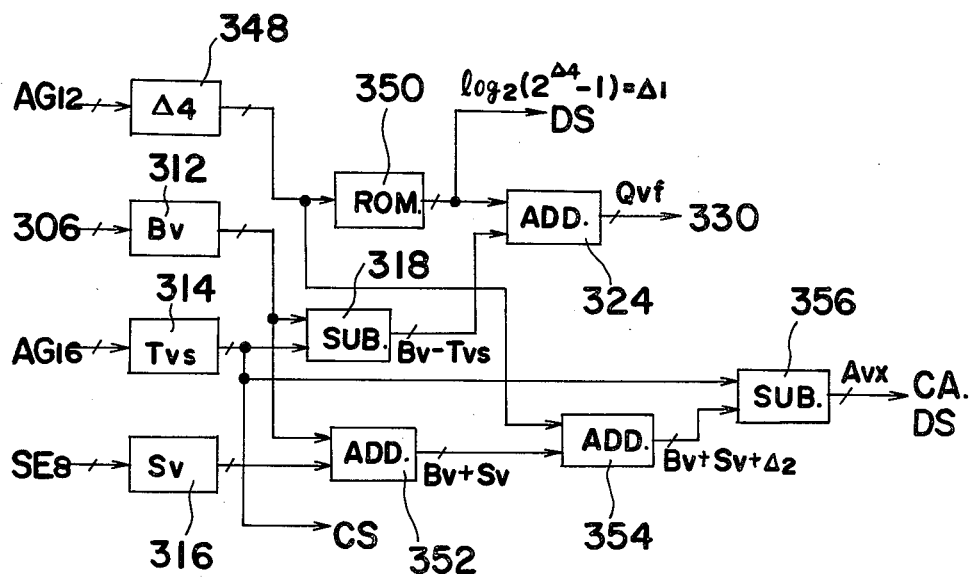

FIG. 34 is a block diagram illustrating the operation of the calculator ALo in the case where the data corresponding to Δ4 is set in the exposure time priority mode. The data corresponding to Bv from a register 312 and the data corresponding to Tvs from a register 314 are inputted to a subtracting circuit 318. The subtracting circuit 318 performs the operation of $$Bv-Tvs.$$

Also, the data from a register 348 corresponding to the set Δ4 is inputted to a data converting ROM 350 to output the data corresponding to $$\Delta 1=\log_2(2^{\Delta 4}-1) \qquad (14\text{-}1)$$

from the ROM 350. The data corresponding to the lighting contrast Δ1 is inputted to the display apparatus DS to perform the displaying operation. Also, the data from the ROM 350 and the data from the subtracting circuit 318 are inputted to an adding circuit 324 to perform the operation of $$Qvf=Bv-Tvs+\log_2(2^{\Delta 4}-1) \qquad (12)$$

to calculate the incident light quantity Qvf caused by the flash light emission to the photographic object. The data obtained from the adding circuit 324 is inputted to the adding circuit 330 of FIG. 32 to calculate the data corresponding to the flash light quantity $\log_2(\alpha.G)$ of the flash-light emitting apparatus ST in a process similar to that described in FIG. 32.

The data corresponding to Bv from the register 312 and the data corresponding to Sv from a register 316 are inputted to an adding circuit 352 to perform the operation of $$Bv+Sv$$

The data obtained from the adding circuit 352 and the data corresponding to Δ4 from the register 348 are inputted to an adding circuit 354 to perform the operation of $$Bv+Sv+\Delta 4.$$

This calculated data and the data corresponding to the set exposure time Tvs from the register 314 are inputted to a subtracting circuit 356 to perform $$Avx=(Bv-Tvs)+\Delta 4+Sv \qquad (9\text{-}1)$$

to calculate the data corresponding to the diaphragm value Avx This data is inputted to the diaphragm control apparatus CA and the display apparatus DS. Also, the data corresponding to the set exposure time Tvs from the register 314 is inputted to the shutter controlling apparatus CS.

Figure 35:
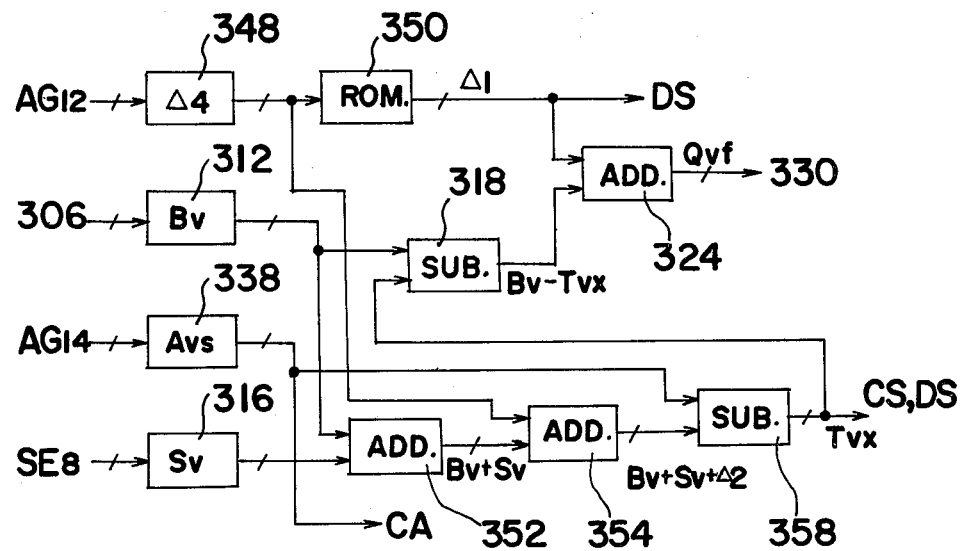

FIG. 35 is a block diagram illustrating the operation of the calculator ALo in the case where Δ4 is set in the diaphragm priority mode. The data corresponding to Bv from a register 312 and the data corresponding to Sv from a register 316 are imputted to adding circuit 352 to perform the operation of $$Bv+Sv.$$

This calculated data and the data corresponding to Δ4 from a register 348 are inputted to an adding circuit 354 to perform the operation of $$Bv+Sv+\Delta 4$$

Then, the calculated data from the adding circuit 354 and the data corresponding to the set diaphragm value Avs from a register 338 are inputted to a subtracting circuit 358 to perform the operation of $$Tvx = \Delta 4 + Bv - (Avs - Sv) \qquad (10\text{-}2)$$

to calculate the data corresponding to the exposure time Tvx. The obtained data corresponding to the Tvx is inputted to the display apparatus DS and the shutter controlling apparatus CS.

Also, the data corresponding to the calculated Tvx and the data corresponding to Bv from a register 312 are inputted to a subtracting circuit 318 to perform the operation of $$Bv-Tvx.$$

Also, the data corresponding to Δ4 from the register 348 is inputted to a data converting ROM 350 to output the data corresponding to $$\Delta 1 = \log_2(2^{\Delta 4} - 1) \qquad (14\text{-}1)$$

from the ROM 350. The data corresponding to the lighting contrast Δ1 from the ROM 350 is inputted to the display apparatus DS.

The data from the ROM 350 and the data from the subtracting circuit 318 are inputted to an adding circuit 324 to perform the operation of $$Qvf = (Bv-Tvx) + \log_2(2^{\Delta 4} - 1). \qquad (12)$$

The data corresponding to the incident light quantity Qvf by the flash light emission to the photographic object is calculated and thereafter the data corresponding to the flash light quantity $\log_2(\alpha.G)$ of the flash-light emitting apparatus ST is calculated in the same process as that of FIG. 32.

Figure 36:
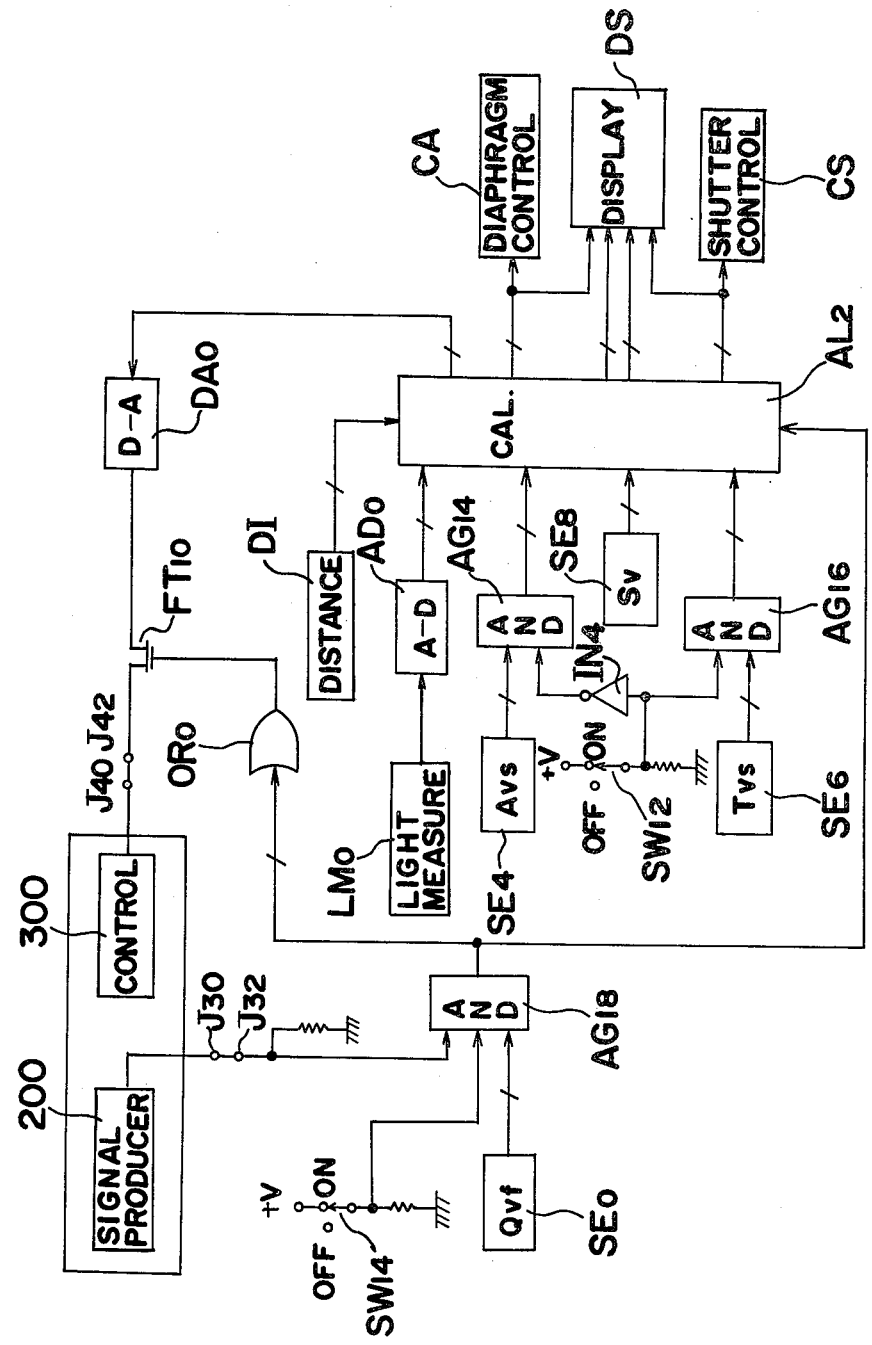
FIG. 36 is a block diagram for setting incident light intensity to the object by the flash light.

FIG. 36 is a modified case where the incident light quantity Qvf by the flash light emission to the photographic object can be set to a setting apparatus SEo. Upon inputting of an emission preparation completing signal from the signal outputting circuit 200 of the flash light emitting apparatus with a switch SW14 being "ON", the data from the setting apparatus SEo is outputted from an AND gate AG18 and further inputted to the calculator AL2. Also, when the data from the AND gate AG18 is outputted, the output of an OR circuit ORo becomes "High" and the FET(FT10) becomes conductive to allow the analog signal corresponding to the flash light emitting quantity from the D-A converter DAo to be inputted to the flash light quantity controlling circuit 300.

According to the various input data, the calculator AL2 calculates and produces data corresponding to Δ1, data corresponding to Δ4, data corresponding to flash light quantity $\log_2(\alpha.G)$, and data corresponding to the exposure time Tvx or the diaphragm value Avx. Also, when the data is not outputted from the "AND" gate AG18 as in FIG. 30, the calculator AL2 performs the known operation as in the ordinary ambient light photography or in the ordinary automatic electronic flash photography.

Figure 37:
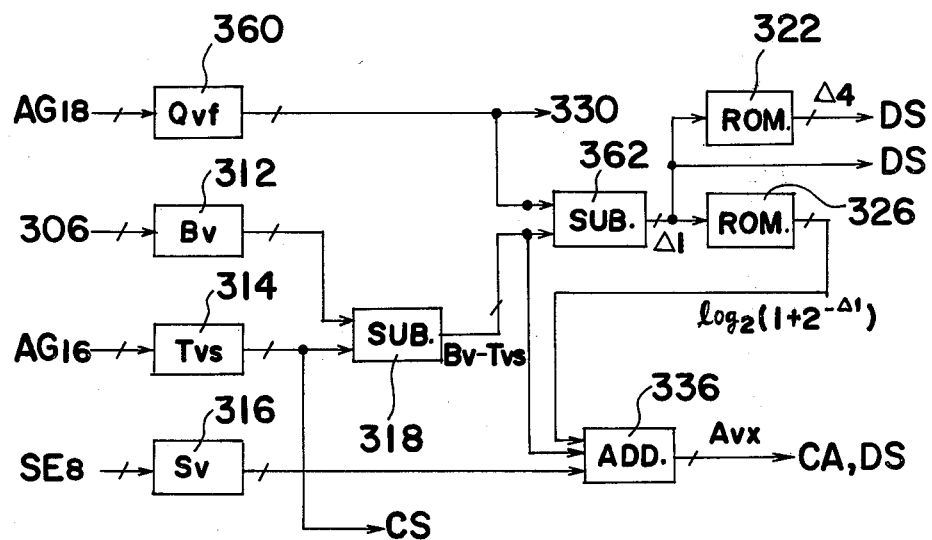
FIGS. 37 and 38 are block diagrams each showing the calculation carried out in a calculator employed in the exposure control system of FIG. 36 under different conditions.

FIG. 37 is a block diagram illustrating the operation of the calculator AL2 in the case when the incident light quantity Qvf by the flash light emission to the photographic object is set and in the case of the exposure time priority mode. The data corresponding to Qvf from a register 360 is inputted to the adding circuit 330 of FIG. 32 to calculate data corresponding to the flash light quantity $\log_2(\alpha.G)$ of the flash light emitting apparatus ST as in FIG. 32. The data corresponding to Bv from the register 312 and the data corresponding to the Tvs from a register 314 are inputted to a subtracting circuit 318 to perform the operation of $$Bv-Tvs.$$

This calculated data and the data corresponding to Qvf from the register 360 are inputted to a subtracting circuit 362 to perform the operation of $$\Delta 1 = Qvf - (Bv - Tvs) \qquad (1)$$

to calculate the data corresponding to the lighting contrast Δ1. The calculated data Δ1 is inputted to the display apparatus DS. Also, the data 1 is inputted to a data converting ROM 322 which accordingly produces the data corresponding to Δ4 shown by $$\Delta 4 = \log_2(1 + 2^{\Delta 1}). \qquad (14)$$

This data Δ4 is sent to the display apparatus DS.

The data corresponding to the lighting contrast Δ1 from the subtracting circuit 362 is inputted to a data converting ROM 326 and is converted to the data corresponding to the $\log_2(1+2^{-\Delta 1})$. The data obtained from the ROM 326, the data from a subtracting circuit 318, and the data from a register 316 are inputted to an adding circuit 336 to perform the operation of $$Avx = Qvf + Sv + \log_2(1+2^{-\Delta 1}). \qquad (3)$$

The calculated data corresponding to the diaphragm value Avx is calculated, and is inputted to the display apparatus DS and the diaphragm controlling apparatus CA. Also, the data corresponding to Tvs from a register 314 is inputted to the shutter control apparatus CS.

Figure 38:
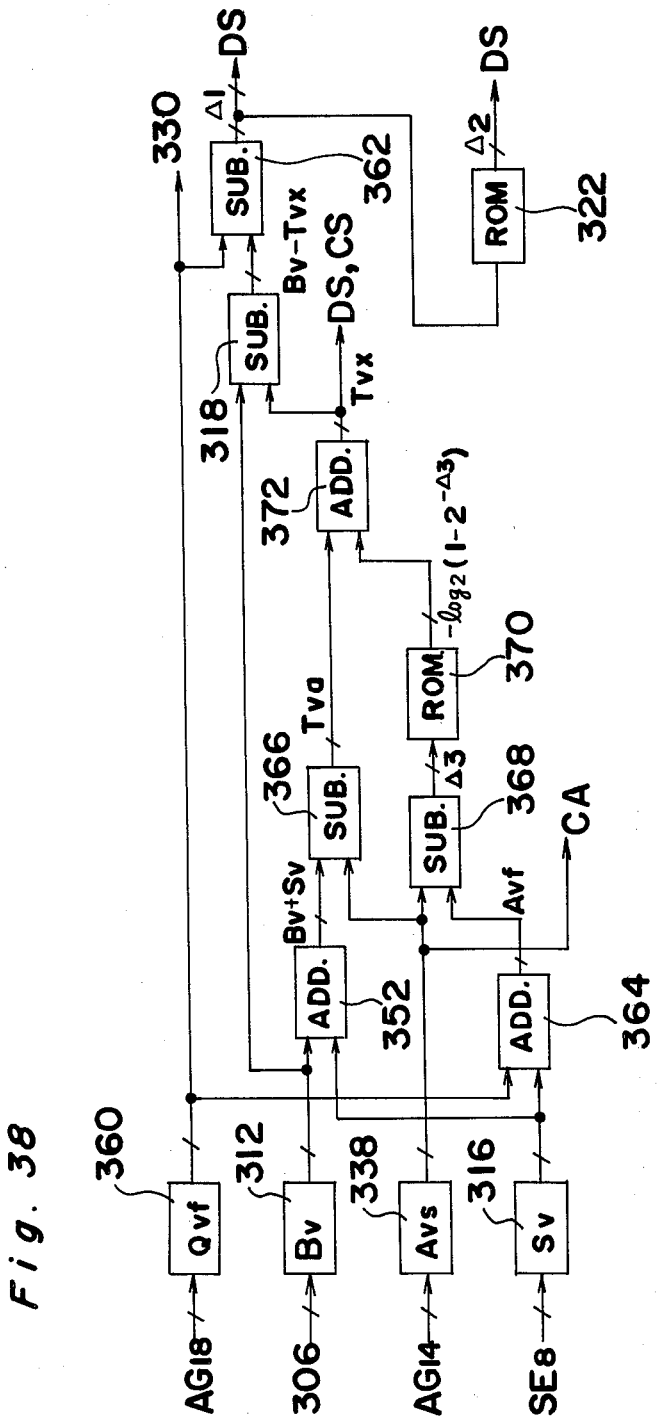

FIG. 38 is a block diaphragm illustrating the operation of the calculator AL2 in the case where the incident light quantity by the flash light to the photographic object is set in the diaphragm priority mode. In an adding circuit 352, data corresponding to Bv from a register 312 and data corresponding to Sv from a register 316 are inputted to perform the operation of $$Bv+Sv.$$

This calculated data and the data corresponding to the set diaphragm value Avs from a register 338 are inputted to a subtracting circuit 366 to calculate the data corresponding to $$Tva = Bv + Sv - Avs \tag{8}$$

wherein Tva is an exposure time determined by ambient light only.

The data corresponding to Qvf from a register 360 and the data corresponding to the Sv from a register 316 are inputted to an adding circuit 364 to perform the operation of $$Qvf + Sv = Avf \tag{5}$$

to calculate the data corresponding to the diaphragm value Avf determined by the incident light quantity Qvf effected only by the flash light. This calculated data and the data from a register 338 are inputted to a subtracting circuit 368 to perform the operation of $$Avx - Avf = \Delta 3. \tag{6}$$

The data corresponding to $\Delta 3$ calculated in the subtracting circuit 368 is inputted to a data converting ROM 370 to output the data corresponding to $$-\log_2(1 - 2^{-\Delta 3})$$

from the ROM 370. This data and the data corresponding to Tva calculated in a subtracting circuit 366 are inputted to an adding circuit 372. The operation of $$Tva + \{-\log_2(1 - 2^{-\Delta 3})\} = Tvx \tag{7}$$

is performed in the adding circuit 372 to calculate the data corresponding to the exposure time Tvx. The calculated data is then inputted to the display apparatus DS and the shutter controlling apparatus CS.

The data corresponding to the exposure time Tvx from an adding circuit 372 and the data from the register 312 are inputted to a subtracting circuit 318 to perform the operation of $$Bv - Tvx$$

This calculated data and the data corresponding to Qvf from the register 360 are inputted to the subtracting circuit 362 to perform the operation of $$\Delta 1 = Qvf - (Bv - Tvx). \tag{1}$$

The obtained data corresponding to the lighting contrast $\Delta 1$ is inputted to the display apparatus DS. Also, the data corresponding to the calculated lighting contrast $\Delta 1$ is inputted to a data converting ROM 322 to output the data corresponding to $$\Delta 4 = \log_2(1 + 2^{\Delta 1}). \tag{14}$$

The obtained data corresponding to $\Delta 4$ is applied to the display apparatus DS.

The data corresponding to the incident light quantity Qvf to the photographic object by the set flash light from a register 360 is inputted to the adding circuit 330 of FIG. 32 to calculate the data corresponding to the flash light quantity $\log_2(\alpha.G)$ of the flash-light emitting apparatus ST in the same process as that of FIG. 32. Also, the data corresponding to the set diaphragm value Avs from a register 338 is inputted to the diaphragm control apparatus CA.

Figure 39:
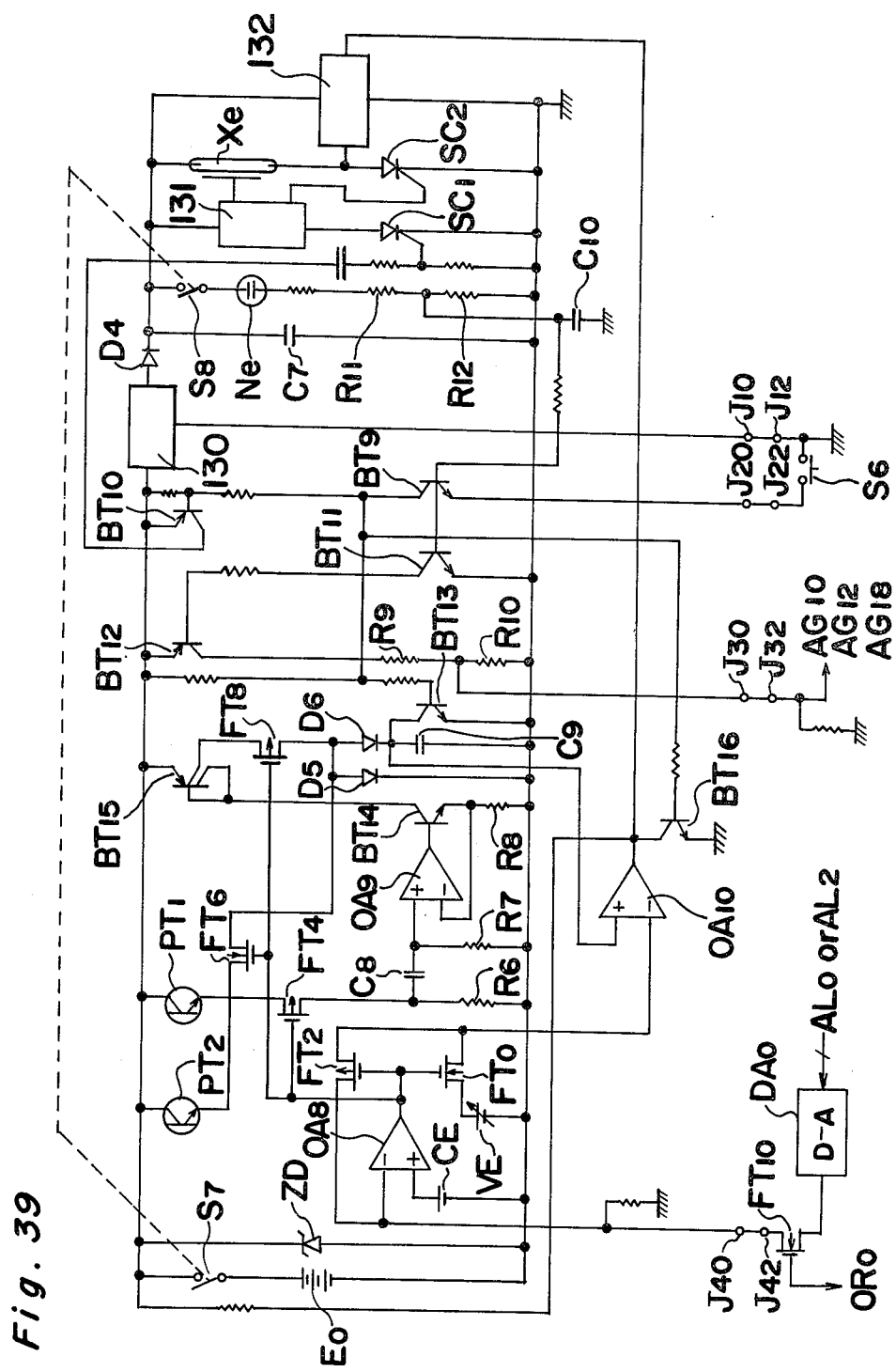
FIG. 39 is a circuit diagram of a flash light emanating apparatus employed in the exposure control system of FIG. 30 and FIG. 36.

FIG. 39 is a concrete circuit diagram of a flashlight emitting apparatus ST. The operation and construction thereof will be described hereinafter. Upon closure of a power supply switch S7, a switch S8 which operates in association with the power supply switch S7 is also closed. And a DC-DC converter 130 is operated to charge a main capacitor C7 through a diode D4. When the charging voltage of the main capacitor C7 reaches a predetermined value, a neon tube Ne is lit to indicate that the potential at a junction between resistors R11 and R12 has reached a level capable of conducting transistors BT9 and BT11, and thyristor SC1. When the transistor BT11 conducts, a transistor BT12 becomes conductive to set a predetermined potential at a junction between resistors R9 and R10 to produce a signal indicative of completion of the emitting preparation, to the camera through terminals J30 and J32. Upon supply of an analog signal corresponding to the flash light quantity $\log_2(\alpha.G)$ through terminals J42 and J40 from the camera, the voltage of the supplied analog signal is compared with the output voltage of a constant voltage source CE. The output level of the constant voltage source CE is lower than the lowest level of the input signal from the camera. Accordingly, the output of a comparator QA8 produces "Low" without fail when the signal from the camera has been inputted. When the signal is not supplied, an inverting input of the comparator QA8 is grounded to produce "High" from the comparator QA8.

When the comparator QA8 produces "Low" in the above described manner, P channel FET's (FT2), (FT4) and (FT8) become conductive. On the other hand when the output of the comparator OA8 is "High", the N channel FET's (FTo) and (FT6) become conductive.

Then, upon closure of the X contact S6 in the camera for supplying the start signal of the light emission, the transistors BT9 and BT10 become conductive and a thyrister SC1 becomes conductive to operate a trigger circuit 131. Thus, a xenon tube Xe and a thyristor SC2 become conductive to start emitting the light. The output current from a photo-transistor PT1, which is so positioned as to receive flash light directly from the xenon tube XE, flows into a resistor R6 through the FET(FT4) to convert the output current to voltage. The voltage across the resistor R6 caused by the light emission of the xenon tube Xe, i.e., the voltage corresponding to the flash light from the xenon tube Xe, is produced from the high-pass filter composed of a capacitor C8 and a resistor R7. The output from the high-pass filter is converted into current by a voltage current converting circuit composed of an operational amplifier OA9, a transistor BT14 and a resistor R8. The converted current flows through a transistor BT15 and the FET(FT8) to a known logarithm compression integrating circuit composed of the diodes D5, D6 and a capacitor C9. At this moment, the transistor BT9 becomes conductive to turn transistors BT13 and BT16 non-conductive. Even if the voltage charged in the main capacitor becomes low by the emission of light from the xenon tube Xe to render the neon tube Ne non-conductive, the transistors BT9 and BT11 remain conductive due to the charge maintained in capacitor C10 during a time period required for the xenon tube Xe to fully emit light.

The voltage charged in the capacitor C9 is compared, in the comparator QA10, with the analog signal of the log₂(α.G) corresponding to the flash-light quantity from the FET(FT2). When they coincide with each other, the output is inversed to "High" to operate a light emission stopping circuit 132 to stop the light emission from the xenon tube Xe.

When the signal corresponding to the flash light quantity log₂(α.G) is not inputted from the camera, the FET's (FT0) and (FT6) are conductive to apply output current from the photo-transistor PT2 for receiving reflection light from the photographic object to the logarithm compression integrating circuit composed of diodes D5, D6 and a capacitor C9, and to apply an analog signal from the variable voltage source VE, which outputs the voltage corresponding to the film sensitivity and the photograph diaphragm, to the inverting input terminal of the comparator QA10. Accordingly, in this case, the light quantity controlling operation of a reflection light type which is the same as in the normal auto-flash device, is carried out.

In the above embodiment, such a modification may be possible that resistor R6, high-pass filter C8+R7, voltage-current converter QA9+BT14+R8, transistor BT15, and field effect transistor FT8 are omitted for the output of the phototransistor PT1 to directly flow into logarithmic conversion integrator D5+D6+C9 by way of field effect transistor FT4.

Although the above description is directed to the mode of diaphragm priority and exposure time priority, the manual mode can be carried out in a similar manner. In the manual mode, an operation similar to that for the exposure time priority mode is performed to display the difference Δ2 between the calculated diaphragm value and the set diaphragm value. Also, in the case of a program shutter where the combination of the diaphragm value and exposure time are determined according to the brightness of the ambient light, the same operation as that for the exposure time priority mode is performed.

Also, a setting apparatus for setting Δ1, Δ4 and QVf may be provided on the side of the flash-light emitting apparatus to output the analog signal, so that the A-D conversion may be performed on the camera side. The description herein below is directed to various modifications.

Modifications

FIGS. 40 to 46 illustrate a modification of the third embodiment described with reference to FIGS. 30 to 39. The modification described here is simplified, when compared with the third embodiment, since the setting or calculation-display of Δ1 and Δ4 are not performed. In this modification, a suitable procedure is carried out for a case when the calculated diaphragm value has exceeded a controllable limit or a case when the value of the flash light quantity of the calculated flash-light emitting apparatus has exceeded the value of the fully emitted flash light quantity.

Figure 40:
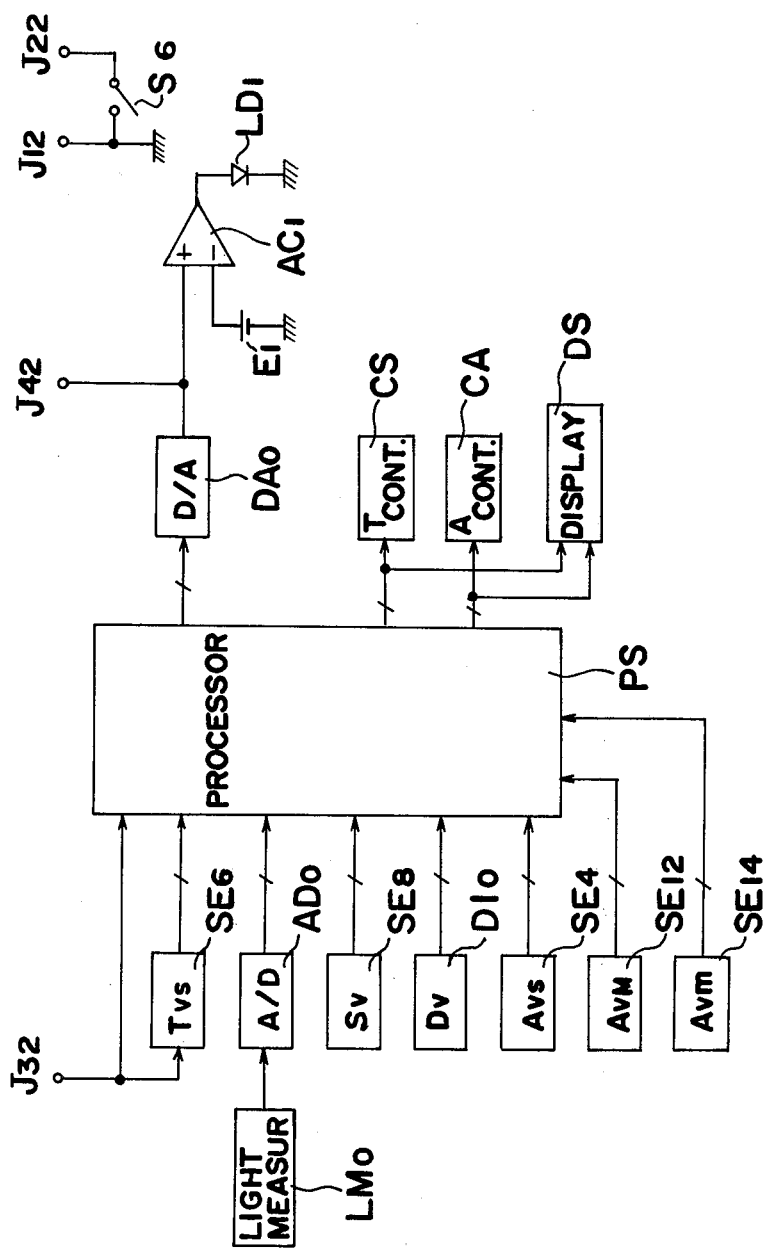
FIGS. 40 and 41 together show a block diagram of an exposure control system which is a modification of FIG. 30, FIG. 40 particularly showing parts to be employed in a camera, and FIG. 41 particularly showing parts to be employed in a flash light emanating apparatus.

FIG. 40 is a block diagram showing components employed in the camera. SE6 is an exposure time outputting apparatus for producing a signal indicative of the set exposure time when taking a photograph under ambient light only. The apparatus SE6 also produces, when the light emission preparation completing signal from a flash-light emitting apparatus shown in FIG. 41 has been inputted through the terminal J32, a signal indicative of the exposure time for the synchronized shutter speed. When the camera is of a type where the flash light photographing operation can be effected for all the exposure time, such as a lens shutter camera, the signal indicative of the exposure time is produced independently of the light emission preparation completing signal.

LMo is a light measuring circuit which produces an analog signal indicative of the photographic object brightness. The produced analog signal is converted into a digital signal by an A-D converter ADo. SE8 is a film sensitivity setting apparatus. DIo is an apparatus for outputting an object distance signal indicative of the distance from the flash-light emitting apparatus to the photographic object, and is composed of e.g., a member provided in association with the distance ring of the lens or of the known apparatus for detecting the distance to the photographic object. SE4 is a diaphragm signal outputting apparatus for producing a signal indicative of the set diaphragm value or a signal K2 of a constant value when the camera is in the mode of auto-diaphragm. SE12 is an apparatus for producing a diaphragm value signal corresponding to the fully open aperture size, and SE14 is an apparatus for producing a diaphragm value signal corresponding to the minimum aperture size.

PS, which is concretely shown in FIG. 42 through FIG. 46, is a processor which calculates signals of the light quantity to be emitted from the flash-light emitting apparatus, the exposure time and the diaphragm value using the signals from the terminal J32, the outputting apparatuses SE6, SE8, D10, SE4, SE12, SE14 and the D-A transducer ADo. DAo is a D-A converter which converts the digital signal of the flash light quantity from the processor PS into analog signal. The analog signal of the flash light quantity from the D-A converter is applied to the flash-light emitting apparatus through a terminal J42 and also to the comparator AC1 for comparison with the output voltage of the constant-voltage source E1. In this case, when the output from the D-A converter DAo is greater than the output voltage from the constant-voltage source E1, the comparator AC1 produces "High", causing a light emitting diode LD1 to produce light, indicating that the flash photographing operation will be performed. When the output from the comparator AC1 is "Low" and the light-emitting diode is not lit, the photographing operation under the ambient light only will be performed.

CS is an exposure time control apparatus for controlling the shutter using the signal of the exposure time from the processor PS. CA is a diaphragm control apparatus for controlling the diaphragm using the signal of the diaphragm value from the processor PS. DS is a display apparatus for displaying the exposure time and the diaphragm value using the signal from the processor PS. A terminal J12 is provided to connect the ground of the flash-light emitting apparatus with that in the camera. A switch S6 is a synchronous switch for starting the flash-light emission, and is closed when the shutter is fully opened. A terminal J22 is provided for transmitting a flash-light emission starting signal to the flash-light emitting apparatus.

Next, the operation performed in the processor PS will be described. When the film ASA is 100, the relation of $$F.D = G \quad (23)$$

is satisfied, wherein F is an F-number, D is a distance to the photographic object, and G is a guide number. The guide number G is originally defined when the film ASA is 100. The guide number G can be expressed as follows.

$$G = \sqrt{2^5 \cdot b \cdot P} \quad (20\text{-}2)$$

wherein P is the flash light quantity from a flash light tube of the flash-light emitting apparatus, and b is a constant which is determined by the reflector, etc. of the flash-light emitting apparatus. Here, $$F = 2^{Av}.$$

When $$D^2 = 2^{Dv} \quad (24)$$

$$b \cdot p = 2^{Pv} \quad (25)$$

the (23) equation can be generally expressed as $$F \cdot D = G \cdot \sqrt{2^{Sv-5}} \quad (23\text{-}1)$$

From the equations (20-1), (24), (25) and (23-1)

$$Av + Dv = Pv + Sv \quad (26)$$

is established. When the flash light is used for taking a photograph, the following equation should be satisfied to obtain a proper exposure.

$$2^{Sv} \cdot (2^{Bv-Tv} + 2^{Qvf}) = 2^{Av} \quad (2)$$

in which $2^{Bv-Tv}$ is the quantity of ambient light during the exposure time $2^{-Tv}$, and $2^{Qvf}$ is the incident light quantity to the photographing object by the light emission from the flash-light emitting apparatus.

The calculation procedure carried out in the processor PS is explained in steps in the paragraphs and sub-paragraphs below with Roman numerals.

(I) The diaphragm value Avs and the exposure time Tvs is set, and the proper diaphragm value Ava for the exposure under ambient light only is calculated by using the set film speed Sv, photographic object brightness Bv and set exposure time Tvs.

$$Ava = Bv + Sv - Tvs \quad (8)$$

(i) When Ava≦Avs, the exposure control is performed according to values of Ava and Tvs. In this case, the flash-light emitting apparatus will not be used.

(ii) When Ava<Avs, the light quantity Pvx of the flash light is calculated according to the following revised equations (26-1) and (2-9) from the equations (26) and (2).

$$Avf + Dv = Pvx + Sv \quad (26\text{-}1)$$

$$2^{Ava} + 2^{Avf} = 2^{Avs} \quad (2\text{-}9)$$

in which Avf is a proper diaphragm value for the exposure under the flash-light only from the flash-light emitting apparatus. When defined as $$Avs - Ava = \Delta 4, \quad (10)$$

Avs can be eliminated from the equations (2-9) and (10) to provide $$Avf = Ava + \log_2(2^{\Delta 4} - 1). \quad (12\text{-}1)$$

From the equation (26-1), $$Pvx = Ava + \log_2(2^{\Delta 4} - 1) + Dv - Sv \quad (27)$$

is calculated.

(iii) Assume that the maximum flash light quantity of the flash-light emitting apparatus is Pvc, $$Avfc = Pvc - Dv + Sv \quad (26\text{-}2)$$

is obtained from the equation (26) when Pv>Pvc. Then, $$Avfc - Ava = \Delta 1 \quad (1\text{-}5)$$

is calculated to eliminate Avfc from the equations (1-5) and (2) to provide $$Avx = Ava + \log_2(1 + 2^{\Delta 1}) \quad (28)$$

(iv) When $\Delta 1 < K3$, K3 being a constant value, the contribution of the flash light to the exposure would be small relative to that of the ambient light even by the emission of the flash-light emitting apparatus, and therefore, the diaphragm value is controlled at Ava with no flash light being emitted.

(v) When Avx calculated in (iii) is smaller than diaphragm value Avm corresponding to the fully open aperture size i.e., when Avx<Avm, Avfc is obtained from the equation (26-2), and then, $$Avm - Avfc = \Delta 3 \quad (6)$$

is calculated. Since the equation (2) can be revised as $$2^{Bv+Sv-Tvx} + 2^{Avfc} = 2^{Avm},$$

Avm can be eliminated to provide $$Tvx = Bv + Sv - Avfc - \log_2(2^{\Delta 3} - 1). \quad (7\text{-}1)$$

(II) When only the exposure time Tvs is set, the same steps as those in the steps (I)–(iii) and (–iv) are performed for the steps (II)–(i) and (–ii), respectively.

(iii) When Avx calculated in the step (II)–(i) is greater than the diaphragm value AvM corresponding to the minimum aperture size i.e., when Avx>AvM, Av is substituted for Avs of the step (I)–(ii) and a similar operation is carried out.

(iv) When Ava>AvM in the step (II)–(iii), the signal of Ava is outputted. In this case, since the available aperture value is AvM, the aperture size can not be any smaller than the size corresponding to AvM.

(v) When Avx<Avm in the case of the step (II)–(iii), the same operation as in the step (I)–(v) is performed.

Figure 41:
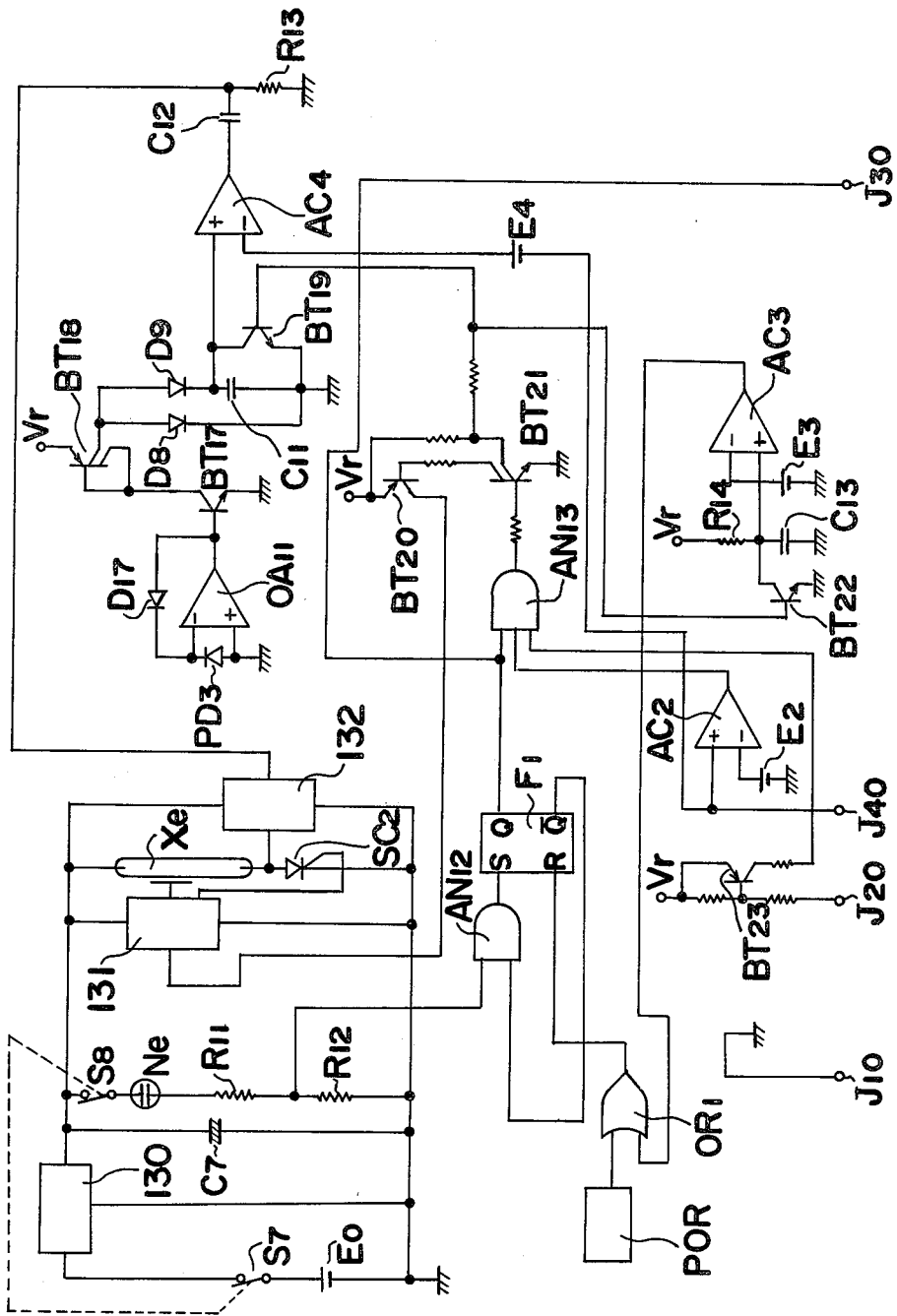

FIG. 41 is a concrete circuit example of the flash-light emitting apparatus. Eo is a power supply battery. S7 is a power supply switch. S8 is a switch which operates in association with the power supply switch S7. Numeral 130 is a D.C-D.C converter. C7 is a main capacitor. Numeral 131 is a triggering circuit for the xenon tube Xe. Numeral 132 is an emission stopping circuit. PD3 is a light receiving element, which is provided at a position capable of monitoring directly the emission of the xenon tube Xe. POR is a power-on reset circuit for outputting a reset signal for the flip-flop F1 when the power supply switch S7 is closed. A circuit wherein no power supply line is shown is driven by the output voltage Vr of a constant-voltage source (not shown) which is power supplied through a switch S7. Terminals J10, J20, J30 and J40 are connected with terminals J12, J22, J32 and J42 respectively, of the camera shown in FIG. 40.

Upon closure of the power supply switch S7, power is fed to all the circuits. The reset signal is outputted from the power-on reset circuit POR to reset the flip-flop F1. At this moment, if the voltage charged in the main capacitor C7 is above a predetermined value, the flip-flop F1 is immediately set by the output signal from the AND circuit AN12. On the other hand, if the charged voltage is below the predetermined value, the capacitor is charged until the charged voltage reaches the predetermined value. When the charged voltage reaches the predetermined value, the neon tube Ne is lit and conducted to produce a predetermined voltage level at a junction between the resistors R11 and R12 sufficient to set the flip-flop F1. The signal Pv indicative of the flash light quantity from a terminal J42 is compared with the output voltage of the constant-voltage source E2. The output voltage of the constant-voltage source E2 is equal to the constant voltage source E1. When the signal from the terminal J40 is Pv>E2, the output of the comparator AC2 becomes "High".

When the output of the comparator AC2 is "High" and the Q output of the flip-flop F1 is "High", the synchronous switch S6 on the camera side of FIG. 40 is closed to render a transistor BT23 conductive and the output of the AND circuit AN13 becomes "High". Thus, the transistors BT20 and BT21 become conductive. The trigger circuit 131 is operated through conduction of the transistor BT20 to cause the xenon tube Xe to emit light. Also, at the same time, the transistors BT22 and BT19 become non-conductive. Since the light receiving element PD3 is located at a position capable of directly monitoring the emission of the xenon tube Xe, the collector current of transistors BT17 and BT18 corresponds to the emitted light strength of the xenon tube Xe. This collector current flows into the logarithm compression integrating circuit composed of diodes D8 and D9 and a capacitor C11. Accordingly, the output voltage of the capacitor C11 corresponds to the logarithm compression value of the emitted light quantity of the xenon tube Xe. This output voltage of the capacitor C11 is compared with the signal which is the sum of a constant value produced from the constant-voltage source E4, and the signal Pv produced from the terminal J40. When the output voltage of the capacitor C11 coincides with the sum, the output of the comparator AC4 becomes "High". Then a pulse is produced from a differential circuit composed of a capacitor C12 and a resistor R13 for operating the stopping circuit 132 to stop the light emission of the xenon tube Xe. As is apparent from the definition of the equation (25), the reason for adding the constant value to the signal of the terminal J40 is that the definition for the value Pv includes the item b(<1), whereas the output voltage of the capacitor C11 excludes the item b. Accordingly, by adding the constant value to the value Pv, the item b can be eliminated, thus allowing the comparison between the signal and the output of the capacitor C11.

A time counting circuit composed of a resistor R14, a capacitor C13, a constant-voltage source E3 and a comparator AC3 becomes "High", after a time interval longer than that from the start of the light emission of the xenon tube Xe to the full emission thereof, to reset the flip-flop F1 to initiate the system as obtained when the power supply switch S7 is on. Also, the output from the Q terminal of the flip-flop F1 is applied through the terminal J30 to the camera side for informing that the flash device is prepared to flash.

Figure 42:
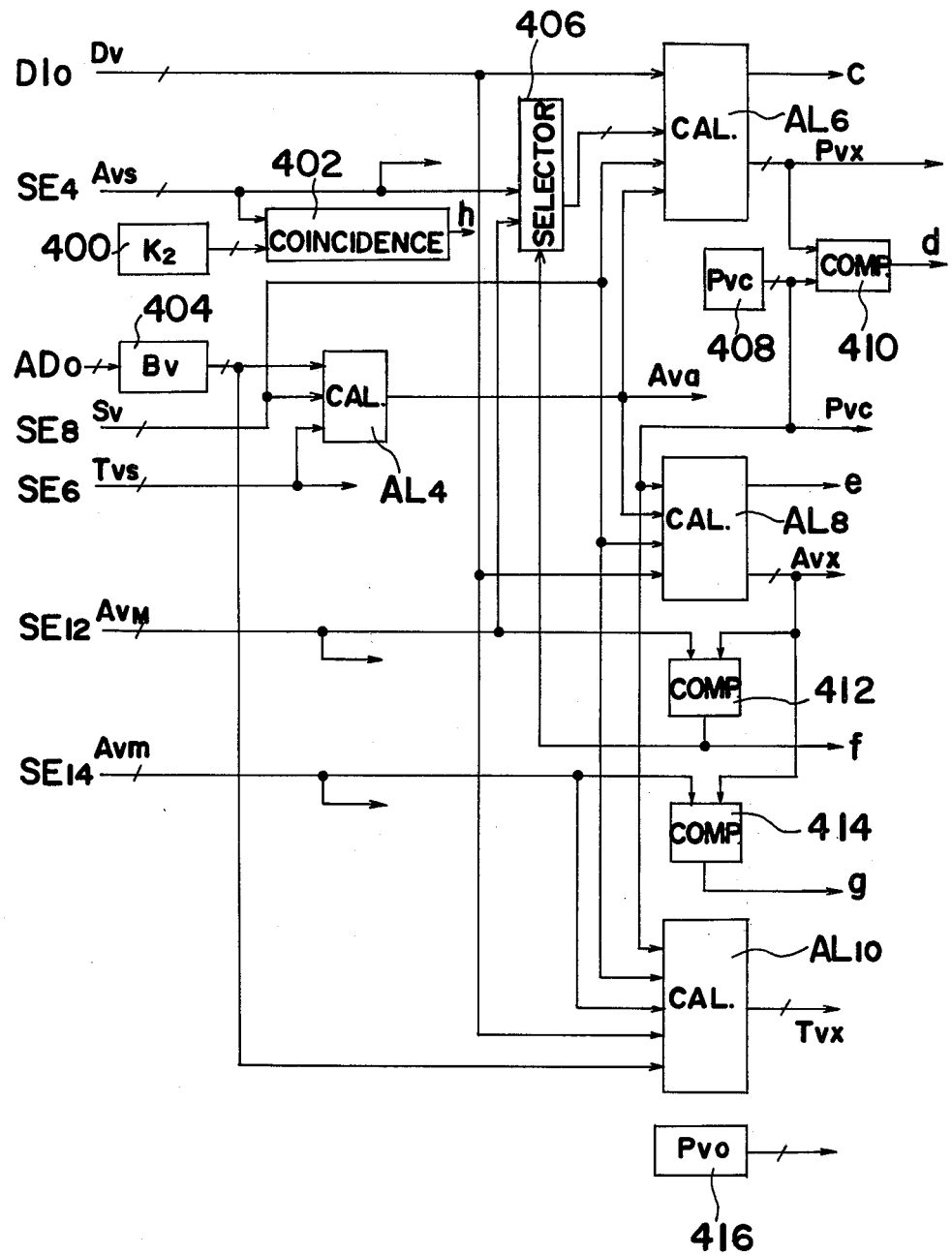
FIG. 42 is a block diagram showing an input unit of a processor employed in the exposure control system of FIG. 40.

FIG. 42 is a block diagram showing the input unit and the calculator unit of the processor PS. Numeral 400 produces data K2 which coincides with the signal from the diaphragm signal outputting apparatus SE4 in the autodiaphragm control mode. The signal K2 from 400 and the data from the diaphragm signal outputting apparatus SE4 are applied to a coincidence detecting circuit 402. When they coincide with each other, the terminal h becomes "High" to indicate that the mode is the autodiaphragm control mode. Numeral 404 is a register wherein the signal Bv indicative of the photographic object brightness from the A-D converter ADo is set. AL4 is a calculator for performing the operation $$Ava = Bv + Sv - Tvs \qquad (8)$$

using the signal from a register 404, a film sensitivity setting apparatus SE8 and an exposure time equal outputting apparatus SE6. Numeral 406 is a data selector to which the signal AvM from the diaphragm value signal outputting apparatus SE12 of the minimum aperture is outputted when the output f of a comparing circuit 412 is "High", and the signal Avs from the diaphragm signal outputting apparatus SE4 is outputted when output f is "Low".

AL6 is a calculator for receiving distance signal Dv, diaphragm signal Avs or Avm, film sensitivity Sv and diaphragm signal Ava which is a proper diaphragm value for the photograph under ambient light only and obtained from the calculator AL4 to calculate the signal Pvx indicative of the light quantity to be emitted from the flash-light emitting apparatus.

The detail of the calculator AL6 is shown in FIG. 43. Numeral 408 is a block for outputting the signal Pvc of the maximum flash light quantity of the flash-light emitting apparatus. The signal from the block 408 is compared, at a comparing circuit 410, with the signal from the calculator AL6. When the Pvx is larger than Pvc, the output terminal d of the comparing circuit 410 produces "High".

A calculator AL8 receives the signal Pvc of the maximum flash light quantity, the diaphragm signal Ava from the calculator AL4, the signal Sv of the film sensitivity and the distance signal Dv, to calculate a proper diaphragm signal Avx. The detail of the calculator AL8 is shown in FIG. 44. A comparing circuit 412 compares the diaphragm signal Avx calculated at the calculator AL8 with the diaphragm value signal AvM of the minimum aperture. When Avx>AvM, the terminal f becomes "High". Also, a comparing circuit 414 compares the diaphragm signal Avx with the diaphragm value signal Avm indicative of the fully opened aperture. When Avx<Avm, the terminal g becomes "High".

A calculator AL10 calculates the signal Tvx indicative of the proper exposure time, using the signal Pvc indicative of the maximum flash light quantity, the signal Sv of the film sensitivity, the diaphragm value signal Avm of the fully opened aperture, the distance signal Dv and the signal Bv of the photographic object brightness from the register 404. The detail of the calculator AL10 is shown in FIG. 45. Numeral 416 is a block for outputting the light emitting signal Pvo to prevent the flash-light emitting apparatus from flashing. The signal Pvo converted into an analog signal by the D-A converter DAo takes a value smaller than the output signal from the constant-voltage sources E1 and E2. Accordingly, the outputs from the comparators AC1, AC2 become "Low" to prevent the flash-light emitting apparatus from flashing. In this case, the photographing operation is performed only with the ambient light.

FIG. 43 is a block diagram which shows the detail of the calculator AL6. Numeral 418 is a circuit for comparing the diaphragm signal Ava with a signal Avs or AvM. When Ava>Avs(AvM), a terminal c is made "High". In the subtracting circuit 420, the operation of the equation (8)

$$Avs(AvM) - Ava = \Delta 4 \qquad (10)$$

is performed. The obtained $\Delta 4$ is used for producing a data corresponding to $\log_2(2^{\Delta 4} - 1)$ from a ROM 422. The operation of $$Avf = Ava + \log_2(2^{\Delta 4} - 1) \qquad (12\text{-}1)$$

is performed in an adding circuit 424. Then, the operation of $$Pvx = Ava + \log_2(2^{\Delta 2} - 1) + Dv - Sv \qquad (27)$$

is performed in an adding circuit 426 and a subtracting circuit 428 to calculate the flash light quantity Pvx of the flash-light emitting apparatus.

FIG. 44 is a block diagram showing the detail of the calculator AL8. In the adding circuit 430 and the subtracting circuit 432, the operation of $$Avfc = Pvc - Dv + Sv \qquad (26\text{-}2)$$

is performed. In the subtracting circuit 434, $$Avfc - Ava = \Delta 1 \qquad (1\text{-}5)$$

is calculated. The calculated data $\Delta 1$ is compared, at a comparing circuit 438, with the data K3 from a circuit 436 for outputting the fixed data. When $K3 > \Delta 1$, the terminal e is made "High". In a ROM 440, the data $\Delta 1$ from the subtracting circuit 434 is converted into $\log_2(1 + 2^{\Delta 1})$, and in an adding circuit 442, $$Avx = Ava + \log_2(1 + 2^{\Delta 1}) \qquad (28)$$

is calculated to provide a proper diaphragm value Avx.

FIG. 45 is a block diaphragm showing the detail of a calculator AL10. An operation of $$Avfc = Pvc + Sv - Dv \qquad (26\text{-}2)$$

is performed in an adding circuit 444 and a subtracting circuit 448. In a subtracting circuit 450, the operation of $$Avm - Avfc = \Delta 3 \qquad (6)$$

is performed. The data $\Delta 3$ from the subtracting circuit 450 is converted into the data $\log_2(2^{\Delta 3} - 1)$ in ROM 452. In an adding circuit 454, the operation of $$Avfc + \log_2(2^{\Delta 3} - 1)$$

is performed. In an adding circuit 446, the operation of $$Bv + Sv$$

is performed. In a subtracting circuit 456, the operation of $$Tvx = Bv + Sv - \{Avfc + \log_2(2^{\Delta 3} - 1)\} \qquad (7\text{-}1)$$

is performed to calculate the proper exposure time Tvx.

Figure 46:
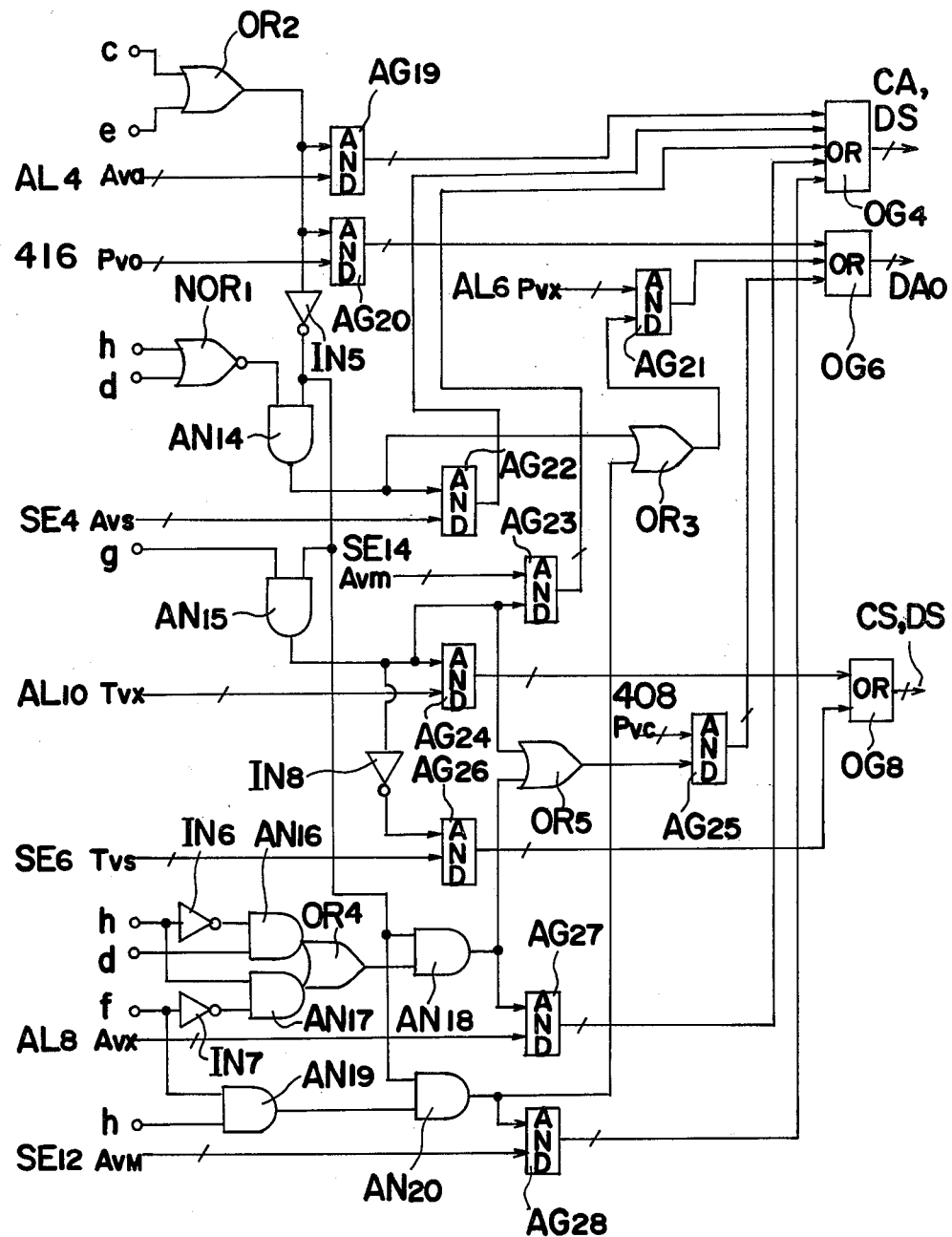
FIG. 46 is a logic circuit showing an output unit of a processor employed in the exposure control system of FIG. 40.

FIG. 46 is a logic circuit showing the output unit of the processor PS. In the case of (I)-(i), Ava≧Avs is established and the terminal c becomes "High". Accordingly, the output from an OR circuit OR2 becomes "High" to open AND gates AG19 and AG20 so that the proper diaphragm value Ava for the ambient light only produced from the calculator AL4 is outputted from an OR gate OG4, and the data Pvo that prevents the firing of the flash-light emitting apparatus obtained from a data outputting circuit 416 is produced from an OR gate OG6. Also, since the output from an AND circuit AN15 produces "High" only in the case of (I)-(v) or (II)-(v), the output from an inverter IN8 produces, "High" in the other cases. The data Tvs from an exposure time output apparatus SE6 is outputted through an AND gate AG26 and an OR gate OG8.

In the case of the (I)-(ii), terminals h, c, d are "Low". Accordingly, the output from AND circuit AN14 becomes "High" to open AND gates AG22, AG21 to produce data Avs from the diaphragm value signal outputting apparatus SE4 and data Pvx indicative of the flash light quantity from the calculator AL6.

In the case of the (I)-(iii), since Pvx>Pvc, the terminal d is "High". In this case, h, c, e, f, g are "Low". Accordingly, the output from AND circuit AN18 is "High" to open AND gate AG27 to output the data Avx indicative of the diaphragm value from the calculator AL8. When the output from OR circuit OR5 becomes "High", AND gate AG25 is opened to output the data Pvc indicative of the maximum flash light quantity.

In the case of the (I)-(iv), the terminal e becomes "High" to output Ava, Pvo and Tvs as in the case of (I)-(i).

In the case of the (I)-(v), a relation Avx<Avm is established to allow the terminal g to produce "High". Accordingly, AND circuit AN15 produces "High" to open AND gate AG24. The data Tvx from the calculator AL10 is outputted. Also, AND gate AG23 is opened to produce the diaphragm value Avm indicative of the fully opened aperture. Also, since the output of OR circuit OR5 is "High", AND gate AG25 is opened to output the signal Pvc of the maximum flash light quantity.

In the case of (II), since the data Avs from diaphragm value signal outputting apparatus SE4 is equal to K2, the terminal h produces "High".

In the case of the (II)-(i), since signals at terminals e, f and g are "Low", AND circuit AN17 produces "High", and OR circuit OR4, AND circuit AN18 and OR circuit OR5 produces "High". Accordingly, AND gates AG25 and AG27 are opened to produce the signal Pvc of the maximum flash light quantity and the signal Avx of the diaphragm value from the calculator AL8.

In the case of the (II)-(ii), $\Delta 2 \leq K3$ is established to produce "High" from e. Accordingly, Ava, Pvo and Tvs are produced in a similar manner to the case of (I)-(i) and (-iv).

In the case of the (II)-(iii), a relation of Avx>AvM is established to allow the terminal f to produce "High". In this case, since the terminal h is "High", AND circuits AN19 and AN20 produce "High" to open the AND gates AG21 and AG28. Accordingly, the diaphragm value AvM indicative of the minimum aperture and the flash light quantity Pvx calculated in the calculator AL6 are produced.

In the case of the (II)-(iv), a relation of Ava<AvM is established to produce "High" from the terminal C. In this case, signals Ava, Pvo and Tvs are produced in a manner similar to the case of (II)-(ii).

In the case of the (II)-(v), a relation of Avx>Avm is established to produce "High" from the terminal g.

Accordingly, AND circuit AN15 produces "High", causing AND gate AG23 to produce signal Avm indicative of the fully opened aperture, and AND gate AG24 to produce signal Tvx indicative of the exposure time obtained from the calculator AL10. The "High" signal from the AND circuit AN15 also causes AND gate AG25 to produce signal Pvc indicative of the maximum flash light quantity.

For the accommodation in a camera having a focal plane shutter, the modification described above has such a feature that a certain exposure time signal Tvs is produced from the exposure time signal outputting apparatus upon receipt of an emission preparation completing signal from the flash-light emitting apparatus. However, when the above modification is to be accommodated in a camera having a lens shutter, the certain exposure time signal is not necessarily produced. Only the diaphragm value may be set to calculate and control the exposure period with the same operation as that of the operation circuit AL10.

Although the operation performed by the processor PS can take many variations and modifications other than that described above, such modifications fundamentally are included in the present invention so long as the calculation involves three factors of flash light quantity, diaphragm value and exposure time, and calculates one unknown factor using the other two known factors as expressed in the equations (26) and (2).

Although embodiment and modifications are shown by way of block diagrams, it is preferable to use a micro-computer.

It is to be noted that when the light measuring circuit is operated with TTL, full aperture measuring, it is necessary to add fully opened aperture value Avm to the measured light value Bv-Avm to eliminate the term "−Avm" in the measured light value. In addition, since the above modification calculates the proper exposure value using the incident light quantity to the photographic object, it is necessary, if the light measuring is carried out by the use of reflected light, to compensate the measured light value to a value that would be obtained by the incident light. This compensation can be carried out by adding a predetermined constant K corresponding to the standard reflectance of the photographic object to the output signal Bv obtained from the light measuring circuit.

FIGS. 47 to 53 show a modification of the embodiment described in FIGS. 1 to 27. The modification described here is simplified in that Δ1, Δ4 are not set or calculated-displayed. It is further simplified that the flash light quantity from the flash-light emitting apparatus is controlled by way of reflection light system, and that the proper exposure value can be obtained in consideration of the ambient light. Furthermore, in the case where the calculated diaphragm value exceeds a controllable range, or where the reflection light quantity even by the full emission of the flash-light emitting apparatus has a great possibility of not reaching the calculated reflection light quantity, a suitable procedure is prepared.

Figure 47:
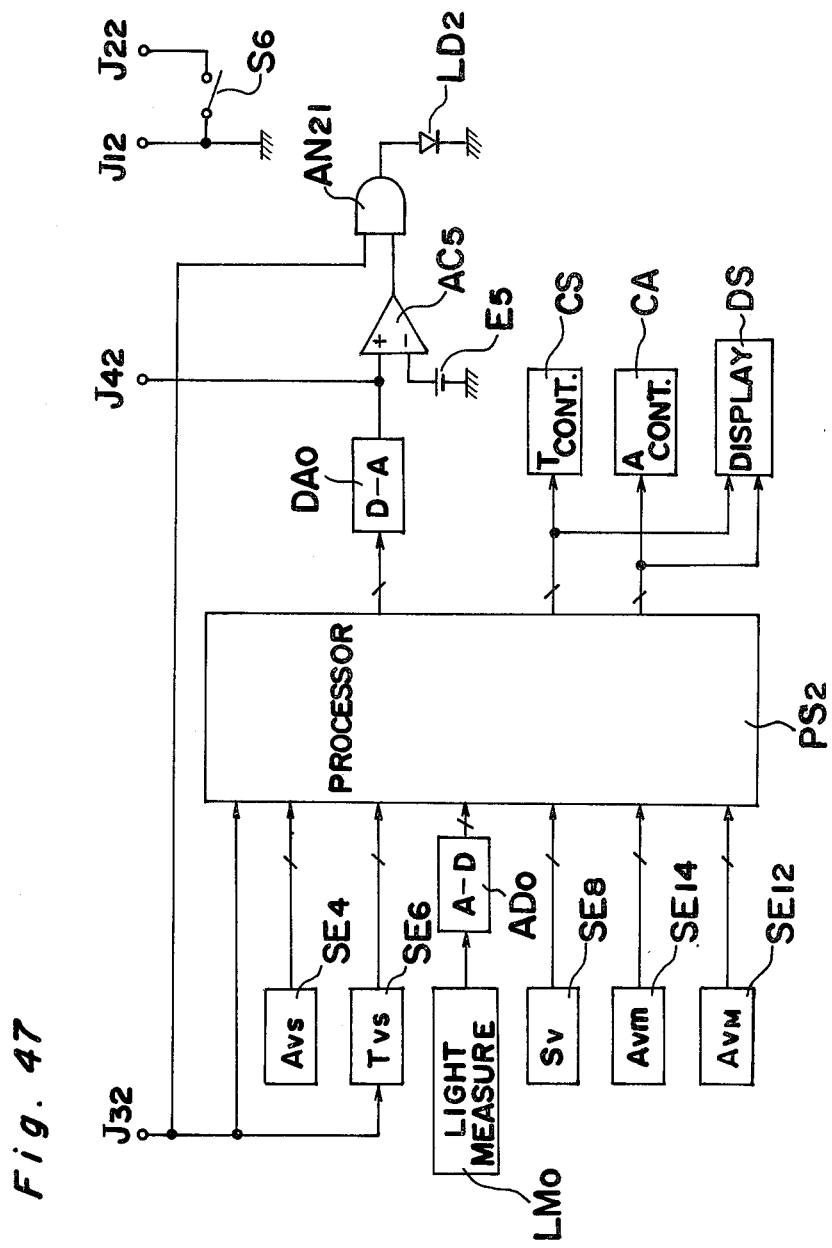
FIGS. 47 and 48 together show a block diagram of an exposure control system which is a modification of FIG. 1, FIG. 47 particularly showing the parts to be employed in a camera, and FIG. 48 particularly showing the parts to be employed in a flash light emanating apparatus.

FIG. 47 is a block diagram showing this modification. SE4 is a diaphragm value signal outputting apparatus. When the diaphragm value has been set, the signal of the set value Avs is outputted. When the diaphragm is automatically controlled, a constant value K2 is outputted. SE6 is an exposure time signal outputting apparatus. When the light emission preparation completing signal from the flash-light emitting apparatus shown in FIG. 48 has been inputted from the terminal J32, the signal of the exposure time of the synchronizing speed for a flash-light photographing operation is outputted. This is a case of a camera provided with a focal plane shutter. In the case of a camera (for example, a camera provided with a lens shutter) which can use flash light for all the exposure time, the signal of the exposure time which is set regardless of whether the light emission preparation completing signal is outputted, LMo is a light measuring circuit for measuring the ambient light. ADo is an A-D converter for converting the output of the light measuring circuit LMo into a digital signal. SE8 is a film sensitivity setting apparatus for outputting the signal Sv of the set film sensitivity. SE14 is a diaphragm value signal outputting apparatus for outputting the fully opened aperture value signal Avm. SE12 is a diaphragm value signal outputting apparatus for outputting minimum aperture value signal AvM.

PS2 is a processor responsive to the above signal outputting apparatuses for calculating the light quantity to be reflected from the photographing object illuminated by the flash light of the flash-light emitting apparatus, or diaphragm value or exposure time to achieve a correct exposure. DAo is a D-A converter which converts, into an analog signal, the digital signal from the processor PS2 indicative of the reflection light quantity. The signal from the D-A converter DAo is sent to the flash-light emitting apparatus of FIG. 48 through a terminal J42. Also, when the flash-light photographing operation is not performed, the signal level from the D-A converter DAo is lower than the output of the constant-voltage source E5 to produce "Low" from the comparator AC5. LD2 is a light-emitting diode for use in the display. When the flash light photographing operation is performed, the terminal J32 produces "High", and the comparator AC5 also produces "High" to light the light emitting diode LD2. As will be described latter, when the light emission stopping signal is not outputted even if the flash-light emitting apparatus is fully emitted, the flashing operation of the light emitting diode LD2 is performed by the signal from the terminal J32. CS is an exposure time control apparatus for controlling the exposure time according to the signal from the processor PS2. CA is a diaphragm control apparatus for controlling the diaphragm according to the signal from the processor PS2. DS is a diaplay circuit for the display according to the signals of the exposure time and the diaphragm value from the process PS2. S6 is a switch for triggering the flash-light emitting apparatus.

Next, the operation performed in the processor PS2 will be described. A relationship for the proper exposure in a case where the reflection light quantity from the photographic object by the light emission of the flash-light emitting apparatus is $2^{Qvf}$ is expressed as follows, $$2^{Sv} \cdot (2^{Bv-Tv} + 2^{Qvf}) = 2^{Av}. \qquad (2)$$

(I) When the exposure time Tvs and the diaphragm value Avs are set, following steps are taken.

(I)-(i) First, $$(Avs-Sv)-(Bv-Tvs)=\Delta 4 \tag{10}$$

is calculated. Then, (Avs-Sv) is eliminated from the equations (2) and (10) to provide $$2^{Qvfx}=2^{Bv-Tvs}(2^{\Delta 4}-1) \tag{2-6}$$

and $$Qvfx=(Bv-Tvs)+\log_2(2^{\Delta 4}-1) \tag{12}$$

is obtained. Accordingly, the reflection light quantity, which becomes proper in exposure, from the photograhic object illuminated by the flash light of the flash-light emitting apparatus is calculated.

(I)-(ii). In the step (I)-(i), if $(Avs-Sv) \leq (Bv-Tvs)$, the calculated proper exposure value will be of a value applicable for the photograph under ambient light only. Thus, a signal Qvfo which prevents the emission of flash-light is outputted. The signal Ava of the calculated diaphragm value $$Ava=Bv+Sv-Tvs \tag{8}$$

is outputted.

(I)-(iii) In a case where the reflected light quantity from the photographic object by the effect of flash-light emission in the step (I)-(i) has not reached the calculated reflection light quantity Qvfx even if the flash-light emitting apparatus is fully emitted, an alarm is given.

(II) When only the exposure time Tvs is set, following the steps are taken.

(II)-(i) If the flash-light is emitted with half of its full power, a signal Qvfk corresponding to a reflected light quantity from the object having a standard reflectance and located at a certain distance is used to calculate $$Qvfk+Sv=Avfk. \tag{5-1}$$

This is a diaphragm value which becomes proper exposure with only the emission of the flash-light emitting apparatus. Also, since the equation (2) can be rearranged as $$2^{Ava}+2^{Avfk}=2^{Avx} \tag{2-10}$$

and since $$Avfk-Ava=\Delta 1, \tag{1-6}$$

Avfk can be eliminated from the equations (2-10) and (1-6) to provide $$Avx=Ava+\log_2(1+2^{\Delta 1}). \tag{28}$$

This is a diaphragm value which achieves a proper exposure in the flash-light photography.

(II)-(ii) In the previous step (II)-(i), when $\Delta 1 \leq K_3$ (constant), no contribution to the exposure by the emission of the flash-light emitting apparatus compared with the ambient light is provided. Thus, the photographing operation is performed with the ambient light only as in the step (I)-(ii).

(II)-(iii) When $Avx > AvM$, in which Avx is the value obtained in the step (II)-(i), $$(AvM-Sv)-(Bv-Tvs)=\Delta 4 \tag{10-4}$$

is calculated. Then, as in the step (I)-(i), $$Qvfx=(Bv-Tvs)+\log_2(2^{\Delta 4}-1) \tag{12}$$

is calculated.

(II)-(iv) When $Avx < Avm$, in which Avx is the value obtained in the step (II)-(i), $$(Avm-Sv)-(Bv-Tvs)=\Delta 4 \tag{10-5}$$

is calculated. Then, $$Qvfx=(Bv-Tvs)+\log_2(2^{\Delta 4}-1) \tag{12}$$

is calculated.

(II)-(v) In the step (II)-(iii) or (II)-(iv), photography under the ambient light is carried out when $\Delta 4 \leq 0$, as similar to the step (I)-(ii).

(II)-(vi) In any of the steps (II)-(i), (II)-(iii) and (II)-(iv), if the reflected light quantity from the object by the emission of the flash light does not reach Qvfk or Qvfx, an alarm is given by a light emitting diode LD2 as in the step (I)-(iii).

(III) When Qvfx calculated in the step (I)-(i), (II)-(iii) or (II)-(iv) is greater than the value Qvfc (signal corresponding to the reflection light quantity from the photographic object of a standard reflectance at a certain distance when the flash light emitting apparatus has been fully emitted), i.e., when $Qvfx > Qvfc$, the possibility is high that the photograph will be under-exposed, due to the fact that the flash-light lacks power. In this case, Avs, Avm or AvM is set as a diaphragm value. The reflection light quantity from the photographic object by the emission is set as Qvfc. By using these values, the exposure time Tvx is calculated. For this calculation, first, $$(Avs, AvM, Avm-Sv)-Qvfc=\Delta 3 \tag{6-1}$$

is calculated. The equation (2) can be revised as $$2^{Bv-Tvx}+2^{Qvfc}=2^{Avs,AvM,Avm-Sv} \tag{2-11}$$

Then, (Avs, AvM, Avm−Sv) is eliminated from the equations (6-1) and (2-11) to calculate $$Tvx=Bv-Qvfc-\log_2(2^{\Delta 3}-1). \tag{7-2}$$

The obtained exposure time properly controls the exposure. It is to be noted that even in this case, an alarm indicating the lack of flash-light power is necessary.

Figure 48:
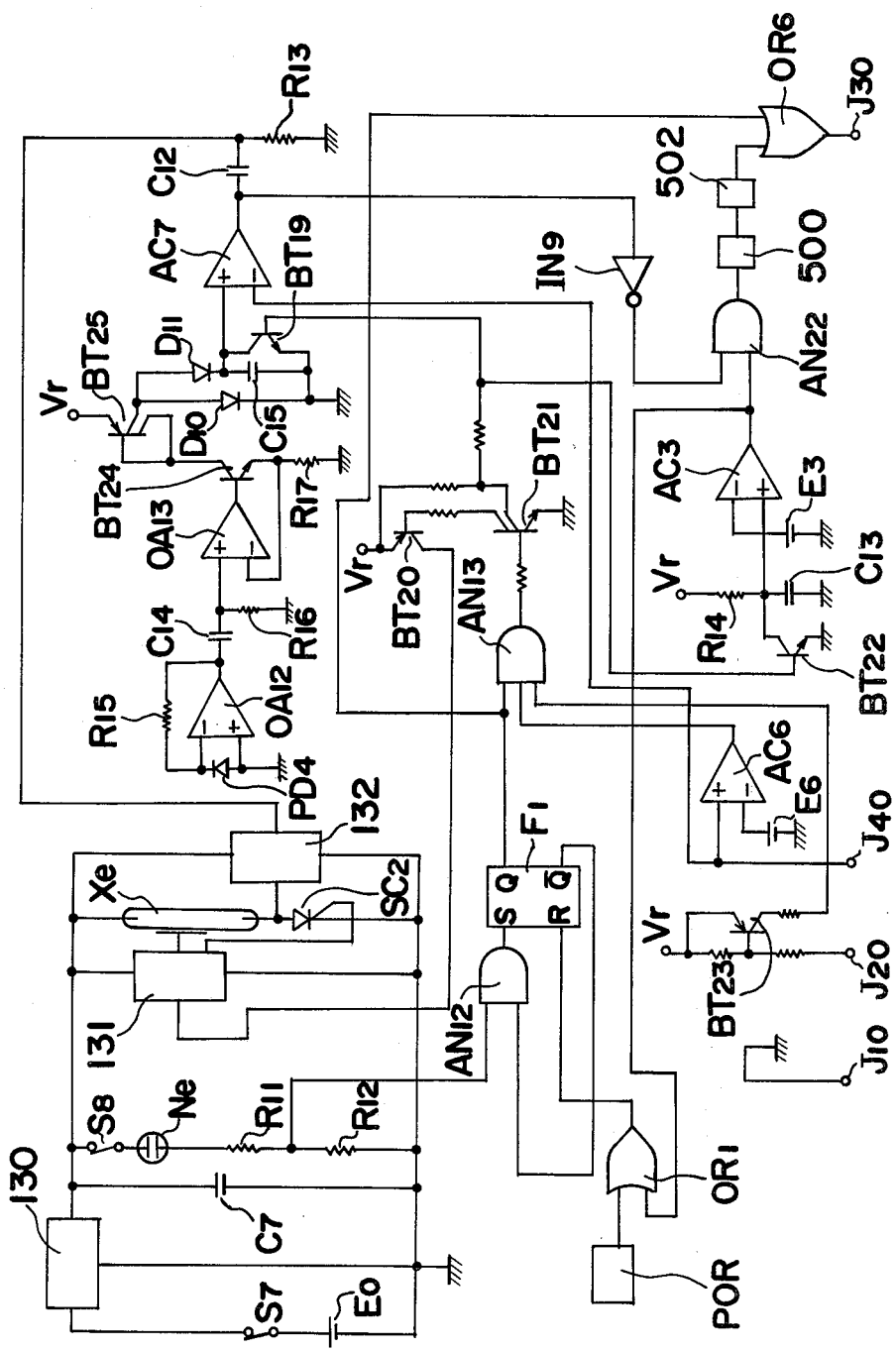

FIG. 48 is a circuit diagram of the flash-light emitting apparatus connected to the block in the camera shown in FIG. 47. The same reference characters are given to the same circuit components as those of FIG. 41. Numeral 500 is one-shot circuit which outputs "High" for a predetermined time in response to the step-up of the output from the AND circuit AN22. Numeral 502 is a pulse generator which outputs clock pulses when the one-shot circuit is producing "High".

Upon closure of the switch S7, the signal from the power-on resetting circuit POR resets the flip-flop F1. When the voltage charged in the main capacitor C7 reaches a predetermined value, the neon tube Ne becomes conductive and lit, and a junction between the resistors R11 and R12 become "High" to set the flip-flop F1. The signal of the reflection light quantity from the photographic object by the emission of the xenon tube Xe from the D-A converter DAo of FIG. 47 is inputted to a comparator AC6 of the flash-light emitting apparatus through terminals J42 and J40, to compare the output voltage of the constant-voltage source E6. Since the output voltage of the constant-voltage source E6 is equal to the output voltage of the constant-voltage source E5 on the camera side, the output of the comparator AC6 produces "Low" in the case of a signal Qvfo which prevents the emission of light, and "High" when the signal of the reflection light quantity is inputted.

When the shutter of the camera is fully opened, the synchronous switch S6 is closed to conduct the transistor BT23. Accordingly, the flip-flop F1 is set. At this time, if the output of the comparator AC6 is "High", the output of the AND circuit AN13 becomes "High". Thus, the transistors B21 and BT20 become conductive to operate the trigger circuit 131 to allow the xenon tube Xe to be conductive and to emit. Also, by the conduction of the transistor BT21, the discharging transistors BT19 and BT22 of the capacitor C13 and C15 become non-conductive.

A light-receiving element PD4 is located at a position capable of receiving reflection light from the photographic object by the emission of the flash-light emitting apparatus. The voltage corresponding to the light intensity received by the light receiving element PD4 is outputted from a circuit composed of the light receiving element PD4, operation amplifier OA12 and resistor R15. The signal, wherein the DC component produced by the ambient light is cut, corresponding to the reflection light strength through the emission of the xenon tube Xe is outputted from the high-pass filter composed of a capacitor C14 and a resistor R16. This signal is converted into current by a voltage-current converting circuit, which is composed of the operation amplifier OA13, transistor BT24 and resistor R17. The signal flows, through the transistor BT25, into a logarithm compression integrating circuit, composed of the diodes D10, D11 and a capacitor C15, wherein the signal is integrated. And the comparator AC7 compares the signal of the reflection light quantity from the capacitor C15 with the signal of calculated reflection light quantity from the terminal J40. When they coincide with each other, the output of the comparator AC7 becomes "High". A circuit 132 for stopping the light emission is operated with the signal from a differential circuit composed of capacitor C12 and resistor R13 to stop the light emission of the xenon tube Xe.

A circuit composed of the resistor R14, capacitor C13, transistor BT22, constant-voltage source E3 and comparator AC3 is a circuit for a time counting operation. The transistor BT22 becomes non-conductive at the start of the emission of the xenon tube Xe to start the charging operation to the capacitor C13. After a time interval which is longer than time for the xenon tube Xe to fully emit, the voltage charged in the capacitor C13 exceeds the output voltage of the constant-voltage source E3 so that the output of the comparator AC3 becomes "High". Then, output of OR circuit OR1 becomes "High" to set the flip-flop F1. Accordingly, the system returns to the condition obtained when the switch S7 is closed.

In a case where the output of the comparator AC7 is "Low" at a time point when the output of the comparator AC3 becomes "High", i.e., where the reflection light quantity by the emission of the xenon tube Xe does not reach the predetermined reflection light quantity even if it is fully emitted, the output of AND circuit AN22 becomes "High", since the output of the inverter IN9 is "High". The signal "High" is outputted for a certain period of time from one-shot circuit 500, during which the clock pulse is outputted from the pluse generator 502 and is inputted to AND circuit AN21 of FIG. 47 through OR circuit OR6 and terminals J30, J32. Thus, the light emitting diode LD2 flashes to alarm the under-exposure. The output from the Q terminal of the flip-flop F1 is connected with other input terminal of the OR circuit OR6. The signal from the terminal is the completion signal for the emission preparation.

Figure 49:
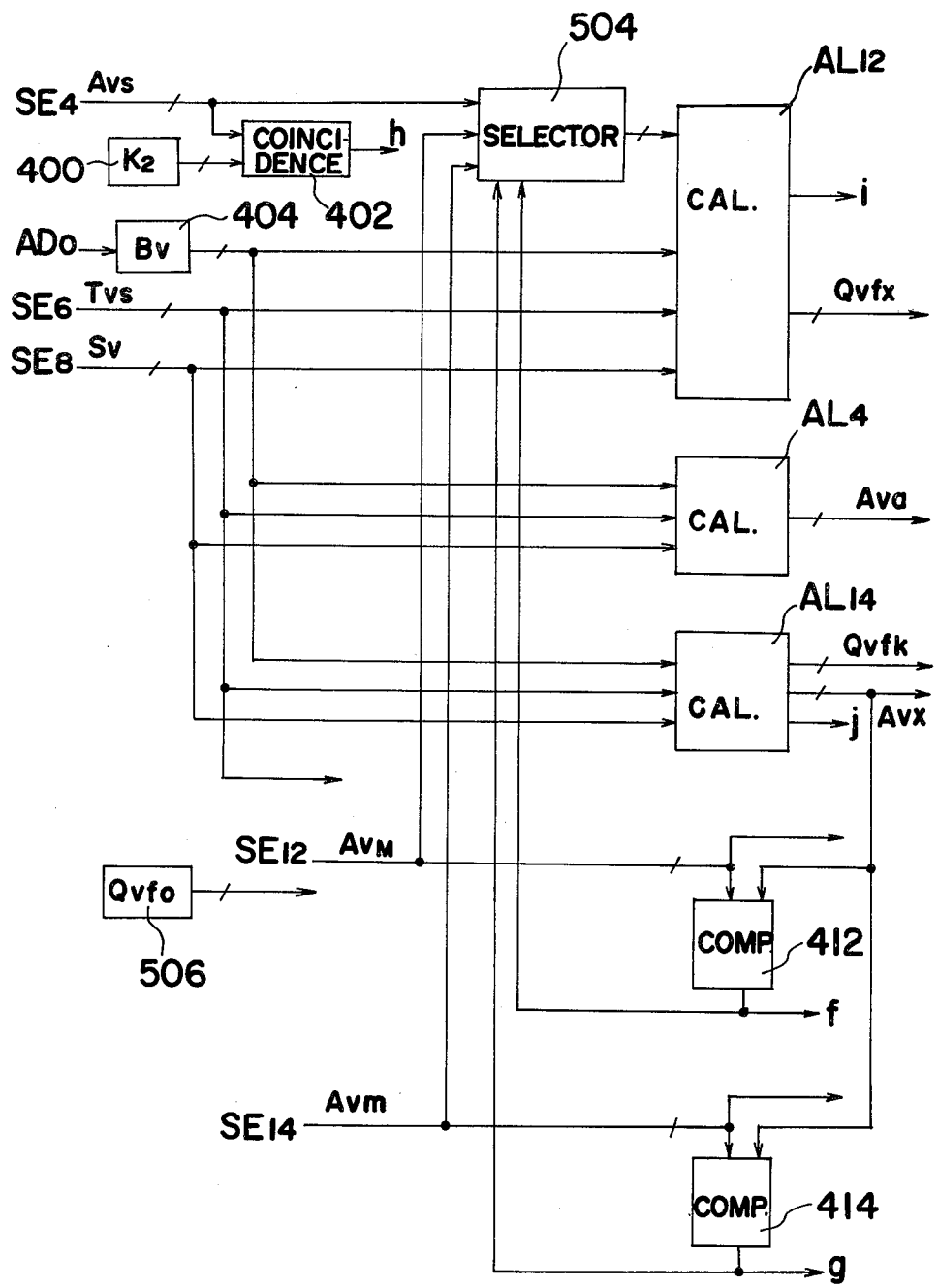
FIG. 49 is a block diagram showing an input unit and operation unit of the processor shown in FIG. 47.

FIG. 49 is a block diagram showing the input unit and calculator unit of the processor PS2. Numeral 400 is a fixed data outputting circuit to produce a signal which is the same as the signal K2 from the diaphragm signal outputting apparatus SE4 upon autodiaphragm control mode. The signal from the fixed data outputting circuit 400 and the signal from the diaphragm value signal outputting apparatus SE4 are inputted to a coincidence detecting circuit 402 and the terminal h becomes "High" when they coincide with each other. Accordingly, the terminal h becomes "High" when the mode is auto-diaphragm. Numeral 404 is a register where the data from the A-D converter ADo is set. Numeral 504 is a data selector where the signal AvM of the diaphragm value of the minimum aperture is outputted when the terminal f is "High", the signal Avm of the diaphragm value of the fully open aperture when the terminal g is "High", and the signal Avs from the diaphragm value signal outputting apparatus SE4 when the terminals f, g are "Low". Numeral 506 is a data outputting circuit for outputting data Qvfo which is adapted to prevent the flash-light emitting apparatus from emitting light.

Figure 50:
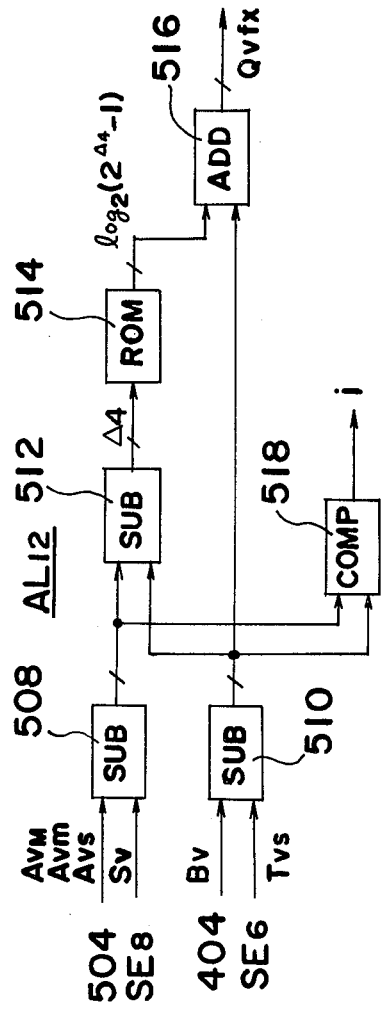
FIGS. 50 and 51 are block diagrams showing details of various calculators employed in the operation unit of FIG. 49.
Figure 51:
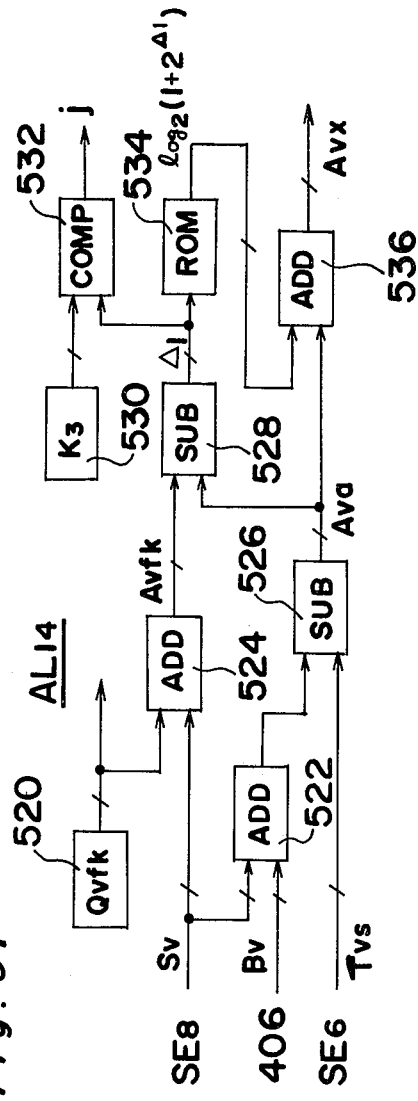

A calculator AL12 calculates the reflection light quantity Qvfx, which becomes proper in exposure using the signals Avs, AvM, Avm of the diaphragm value from the data selector 504, the signal Bv of the photographic object brightness from the register 404, the signal Tvs from the exposure time signal outputting apparatus Se6 and the signal Sv from the film sensitivity setting apparatus SE8. When $$Bv - Tvs \geq Avs, AvM, Avm - Sv$$

the terminal i becomes "High". The details of the block are shown in FIG. 50. AL4 is a calculator for calculating the diaphragm value.

$$Ava = Bv + Sv - Tvs \quad (8)$$

which becomes proper in exposure with only the ambient light using the signal Bv from the register 404, the signal Tvs from the exposure time signal outputting apparatus SE6 and the signal Sv from the film sensitivity setting apparatus SE8. AL14 is a calculator for calculating the proper diaphragm value Avx, using the signal Bv from the register 404, the signal Tvs from the exposure time signal outputting apparatus SE6, the signal Sv from the film sensitivity setting apparatus SE8 and the signal Qvfk of a predetermined reflection light quantity. Since the flash light does not contribute to the exposure when $\Delta 1 \leq K3$ is established, the terminal j is made "High". The detail of the calculator AL14 is shown in FIG. 51.

Numeral 412 is a comparing circuit, which compares the signal Avx from the calculator AL14 with the diaphragm value AvM of the minimum aperture. When $$Avx > AvM,$$

the comparator 412 produces "High" from the terminal f. Numeral 414 is a comparator which produces "High" from a terminal g when $$Avx < Avm$$

is established.

FIG. 50 is a block diagram showing the detail of the calculator AL12. The subtracting circuit 508 calculates Avs−Sv, AvM−Sv or Avm−Sv using the diaphragm value signals Avs, AvM, Avm from the data selector 504 and the signal Sv from the film sensitivity setting apparatus SE8. The subtracting circuit 510 calculates Bv−Tvs from the signal Bv from the register 404 and the signal Tvs from the exposure time signal outputting apparatus SE6. The subtracting circuit 512 calculates $$(Avs - Sv) - (Bv - Tvs) = \Delta 4 \tag{10}$$

or $$(AvM - Sv) - (Bv - Tvs) = \Delta 4 \tag{10-4}$$

or $$(Avm - Sv) - (Bv - Tvs) = \Delta 4 \tag{10-5}$$

The calculated Δ4 is inputted to the ROM 514 in which the data Δ4 is converted into the data $\log_2(2^{\Delta 4} - 1)$. The data $\log_2(2^{\Delta 4} - 1)$ and the data Bv-Tvs from the subtracting circuit 510 are inputted to the adding circuit 516 in which the operation of $$Qvfx = (Bv - Tvs) + \log_2(2^{\Delta 4} - 1) \tag{12}$$

is carried out to calculate the proper reflection light quantity Qvfx. Also, the comparing circuit 518 compares the Bv−Tvs with the data Avs−Sv, AvM−Sv or Avm−Sv from the subtracting circuits 508 and 510. When Bv−Tvs ≧ Avs−Sv, AvM−Sv, Avm−Sv the terminal i produces "High" to prevent the emission of flash light.

FIG. 51 is a block diagram showing the detail of calculator AL14 of FIG. 49. The adding circuit 522 and the subtracting circuit 526 calculate the operation of $$Ava = Bv + Sv - Tvs \tag{8}$$

using the signal Sv from the film sensitivity setting apparatus SE8, the signal Bv from the register 406, and the signal Tvs from the exposure time signal outputting apparatus SE6. Numeral 520 is a data outputting circuit wherein the data Qvfk of the reflection quantity is outputted when flash light from the emitting apparatus has been fired under the condition (II)-(i) described above. This data and the data from the film sensitivity setting apparatus are inputted to the adding circuit 524 to perform the operation of $$Qvfk + Sv = Avfk \tag{5-1}$$

The operation of $$Avfk - Ava = \Delta 1 \tag{1-6}$$

is performed at the subtracting circuit 528. The result Δ1 is sent to the ROM 534 and is converted into the data $\log_2(1 \times 2^{\Delta 1})$. The converted data and the data Ava from the subtracting circuit 526 are sent to the adding circuit 536 in which $$Avx = Ava + \log_2(1 + 2^{\Delta 1}) \tag{28}$$

is carried out to calculate the proper diaphragm value Avx. Also, when K3 ≧ Δ1 has been established comparator 532 between the Δ1 calculated in the subtracting circuit 528 and the data K3 from the fixed data outputting circuit 530, $\log_2(1 + 2^{\Delta 1}) \doteq 0$ is established. In this case, even if flash-light from the emitting apparatus is emitted, the flash light quantity does not contribute to the exposure relative to the ambient light quantity. Thus, the terminal j produces "High".

Figure 52:
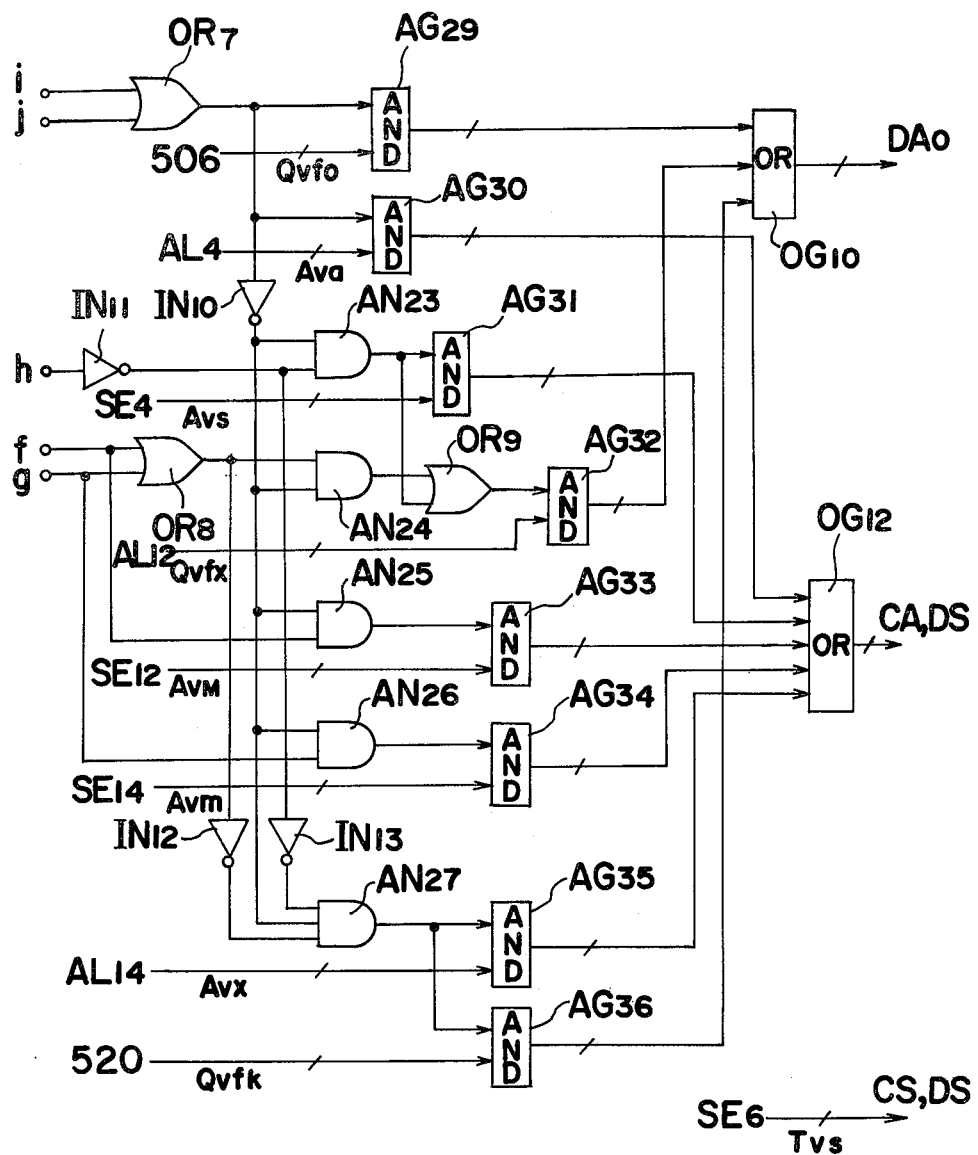
FIG. 52 is a logic circuit showing an output unit of the processor shown in FIG. 47.

FIG. 52 is a logic circuit of the output unit of the processor PS2.

In the step (I)-(i), all the terminals f through j are "Low". Accordingly, the outputs of the circuit AN23 and the OR circuit OR9 become "High" to open the gates of the AND gates AG31 and AG32. The data Qvfx of the reflection light quantity from the calculator AL12 is outputted from the OR gate OG10. The data Avs from the diaphragm value signal outputting apparatus SE4 is outputted from the OR gate OG12.

In the step (I)-(ii), the terminal i becomes "High". Accordingly, the output of OR circuit OR7 becomes "High" to open the AND gates AG29 and AG30. Thereupon, the data Qvfo from the fixed data outputting circuit 502 is produced from the OR gate OG10 to prevent the emission of the flash light, and data Ava of the diaphragm value from the calculator AL4 is outputted from the OR gate OG12.

In the step (II), since the diaphragm is in an automatic mode, the terminal h becomes "High".

In the step (II)-(i), only the terminal h becomes "High" and only the AND circuit AN27 becomes "High". Accordingly, the AND gates AG35 and AG36 are opened to allow the OR gate OG10 to produce data Qvfk having a predetermined reflection light quantity which is transmitted from the fixed data outputting circuit 520 in the calculator AL14. The data Avx of the proper diaphragm value from the calculator AL14 is outputted from the OR gate OG12.

In the step (II)-(ii), Δ1 ≦ K3 is established and the terminal j is "High". Accordingly, the data Qvfo and Ava are outputted as in the step (I)-(ii).

In the step (II)-(iii), Avx > AvM is established and the terminal f is "High". Accordingly, the outputs of OR circuit OR8, AND circuits AN24, AN25, and OR circuit OR9 produce "High" to open the AND gates AG32 and AG33. The data Qvfx of reflection light quantity from the calculator AL12 is outputted from OR gate OG10. The signal AvM from the diaphragm value signal outputting apparatus SE12 of the minimum aperture is outputted from the OR gate OG12.

In the step (II)-(iv), Avx < Avm is established and the terminal g becomes "High". The outputs of OR circuit OR9 and AND circuit AN26 produce "High" to open the AND gates AG32 and AG34. Accordingly, the data Qvfx of the reflection light quantity from the calculator AL12 is outputted from the OR gate OG10. The data Avm from the diaphragm value signal outputting apparatus SE14, which outputs the diaphragm value signal of the fully open aperture is outputted from the OR gate OG12.

In the step (II)–(v), the terminal i becomes "High" as in the step (I)–(ii), and the data of Qvfo and Ava are outputted.

The data Qvfx, Qvfk or Qvfo from the OR gate OG1 is sent to the D-A converter DAo, for conversion into an analog signal. The converted analog signal is then sent to comparator AC5 and the flash-light emitting apparatus through the terminals J42 and J40. The data Ava, Avs, AvM, Avm and Avx from OR gate OG12 are sent to the diaphragm controlling apparatus CA and the display apparatus DS. The signal Tvs from the exposure time signal outputting apparatus SE6 is normally sent to the exposure time controlling apparatus CS and the displaying apparatus DS.

Figure 53:
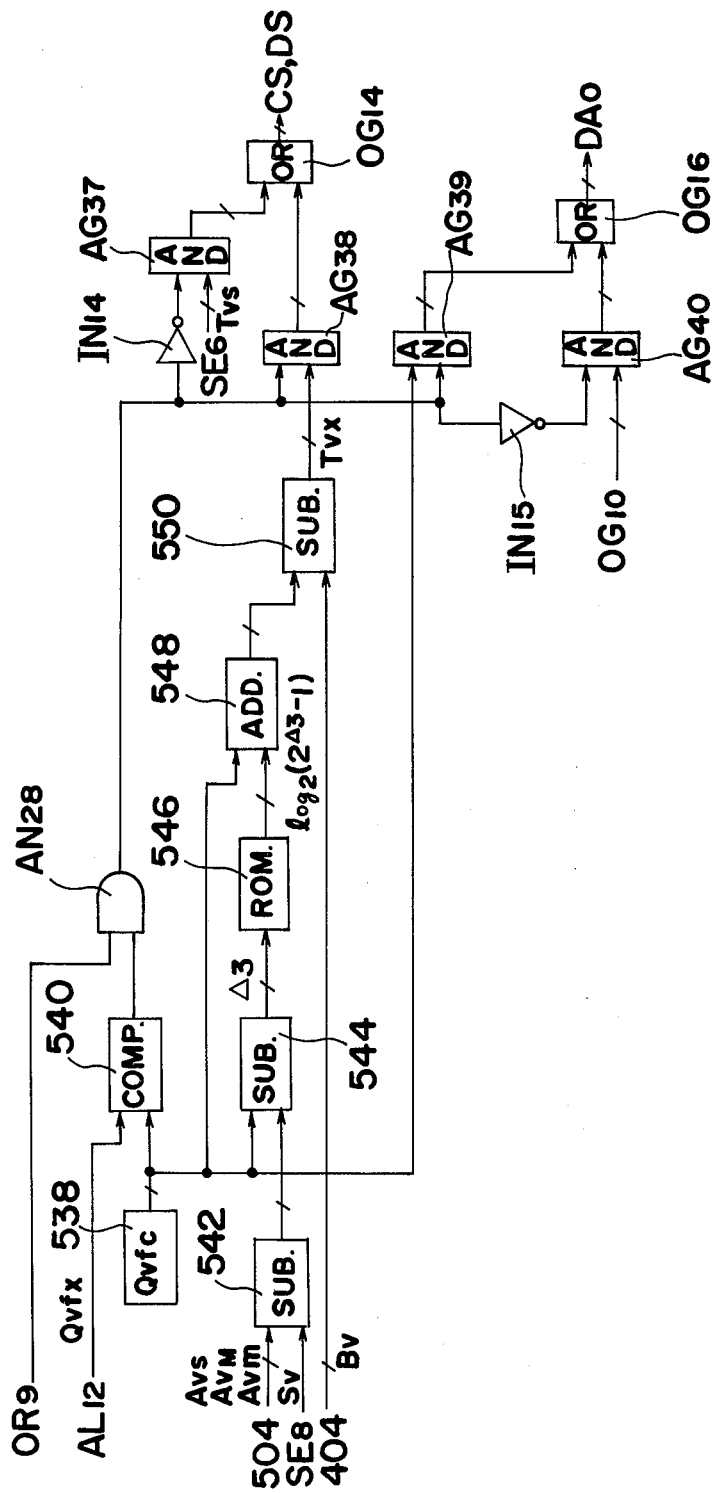
FIG. 53 is a block diagram showing a further calculation carried out in the processor shown in FIG. 47.

FIG. 53 is a block diagram of a portion to be added in a case where the function of the above-described (III) is provided in the processor PS2. Numeral 538 is a fixed data outputting circuit for outputting the data Qvfc corresponding to the reflection light quantity from the photographic object of a standard reflection at a given distance when the above-described flash-light emitting apparatus is fully emitted. The data from this circuit and the data Qvfx from the calculator AL12 are inputted to a comparing circuit 540. When Qvfx>Qvfc, the output becomes "High". In the subtracting circuit 542, the data Avs, AvM or Avm from the data selector 504 and the Sv from the film sensitivity setting apparatus SE8 are inputted to perform the operation of $$Avs - Sv$$

or $$AvM - Sv$$

or $$Avm - Sv.$$

In the subtracting circuit 544, the operations of $$\left.\begin{array}{l}(Avs - Sv) - Qvfc = \Delta 3 \\ (AvM - Sv) - Qvfc = \Delta 3 \\ (Avm - Sv) - Qvfc = \Delta 3\end{array}\right\} \quad (6\text{-}1)$$

are performed using the data Qvfc from the fixed data outputting circuit 538 and the data from the subtracting circuit 542. In the case of (III), since Qvfx>Qvfc and (Avs, AvM, Avm−Sv)≧Qvfx, the data Δ3 holds a value greater than 0. The data Δ3 is inputted to the ROM 546 for the conversion into $\log_2(2^{\Delta 3} - 1)$, which is in turn inputted to the adding circuit 548, in which the addition $$Qvfc + \log_2(2^{\Delta 3} - 1)$$

is calculated, and the obtained sum is inputted to the subtracting circuit 550. Also, the data Bv from the register 404 is inputted to the subtracting circuit 550 to calculate $$Tvx = Bv - Qvfc - \log_2(2^{\Delta 3} - 1) \quad (7\text{-}2)$$

In the step (III), the output of OR circuit OR9 and the output of the comparing circuit 540 are "High".

Thus, the output of AND circuit AN28 is "High". Accordingly, the AND gates AG38 and AG39 are opened to allow the data Tvx coming from the subtracting circuit 550 to pass through the OR gate OG14 and to allow the data Qvfc coming from the fixed data outputting circuit 538 to pass through the OR gate OG16.

As described hereinabove, the signal of a given exposure time is not required to be outputted when the emitting preparation completing signal, in the case of the lens shutter camera, has been inputted from the exposure period signal outputting apparatus. In the case of a focal plane shutter camera, the signal corresponding to the synchronizing speed may be outputted when the exposure time signal indicates a time shorter than the synchronizing speed and the exposure time signal may be outputted as it is when the exposure time signal is longer than the synchronizing speed.

The Avx is calculated using the Qvfk. When Avx>AvM and when Qvfk is calculated using AvM, since Qvfk is actually larger than Qvfx, the Qvfx>Qvfc will not be established. Accordingly, in this case, AvM will not be produced from the data selector 504 in the step (III).

Also, it is not necessarily required to calculate Tvx only when the Qvfx has become larger than Qvfc. An automatic mode for the exposure time may be provided to perform the same operation as that of the step (III) according to the Avs and Qvfk. When Tvx exceeds a limit that introduces a hand blur, an alarm is produced for this case or in the case of the step (III).

In this modification, only the block diagrams are shown. However, a person in the art may easily carry out this embodiment by a digital circuit or microcomputers in accordance with the above disclosure. It is to be noted that in the case of TTL fully open aperture light measurement, the light measured value is Bv-Avm. Thus, the Avm is required to be added to the light measuring output.

Figure 54:
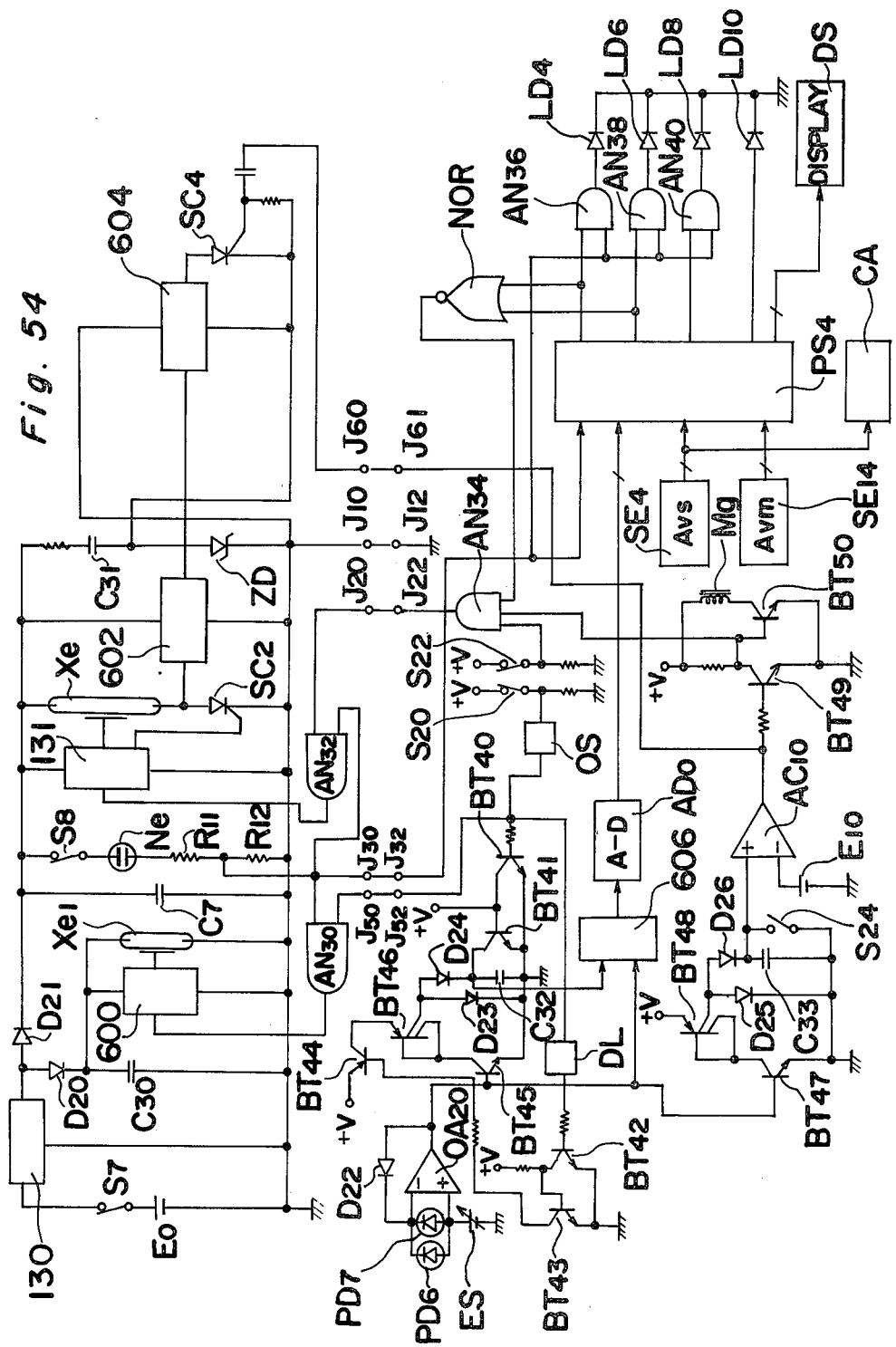
FIG. 54 is a circuit diagram of an exposure control system of a further modification.

In the embodiment of FIG. 54, FIG. 55 and FIG. 56, the reflection light quantity from the photographic object is measured at a preliminary flash light emission. The exposure time is calculated and displayed according to the measured value, photographic object brightness, set diaphragm value and film sensitivity. The exposure time and the flash-light quantity are controlled by the measurement of light reflected by the film face and the first blind of the focal plane shutter.

A switch S20 is provided for the preliminary flash light emission. When the switch S20 is closed, a "High" signal of a given time period is outputted from the one-shot circuit OS. During this time period, the preliminary flash light emission is performed and the A-D conversion of the measured value is completed. The signal from the one-shot circuit OS is sent to the flash-light emitting apparatus through terminals J52, J50. The preliminary flash light emitting signal is outputted from the AND circuit AN30, since the junction between the resistors R11 and R12 is "High" when the neon tube Ne is conductive and lit. Thereupon, the trigger circuit 600 is operated to emit light from the preliminary flash light emitting xenon tube Xel by the discharge of the capacitor C30. At this time, the transistor BT40 becomes conductive to render the transistor BT41 non-conductive. Also, since the output of a delaying circuit DL is "Low", the transistor BT42 is non-conductive and the transistors BT43 and BT44 are conductive. Light receiving elements PD6 and PD7 are positioned as shown in FIG. 56. Accordingly, at a time when the preliminary flash light emission is performed, a reflection mirror 700 is down to allow the incoming light to reach only the light receiving element PD6. ES is a voltage source wherein the voltage corresponding to the film sensitivity is outputted. The delaying circuit DL renders the output "High" after a predetermined time period ($2^{-Tvc}$) from the emission of the preliminary flash light. This time period is longer than the time necessary for the flash-light emitting apparatus to carry out preliminary flash light emission. Accordingly, an integrated value of the sample held in the capacitor C32 at a time when the transistor BT44 is turned to non-conductive is as follows.

$$Sv+Qvl-Avm=\log_2\{2^{Bv-Tvc}+2^{Qvfp}\}+Sv-Avm \quad (30)$$

This value is applied to the A-D converter ADo through an analog multiplexer 606 and further to the processor PS4. Thereafter, the output of the operation amplifier OA20 is produced from the multiplexer 606 and is inputted to the A-D converter ADo for the A-D conversion. The A-D converted signal, which can be expressed as, $$Bv+Sv-Avm=Ev-Avm \quad (31)$$

is inputted to the processor PS4.

A block diagram showing the operation carried out in the processor PS4 is shown in FIG. 55.

The data Ev-Avm and Qvl+Sv−Avm from the A-D converter ADo are set in the registers 610 and 612. The data from the registers 610, 612 and the data of fully opened aperture value Avm from the data outputting apparatus SE14 are inputted to the adding circuits 616 and 618, respectively, to calculate the data of EV, Qvl+Sv. The data from the data outputting circuit 614, which outputs the data Tvc of the integrated time during the preliminary flash light emission, and the data Ev from the adding circuit 616 are inputted to the subtracting circuit 620 to calculate the Ev-Tvc. Then, in the subtracting circuit 622, the operation of $$Qvl+Sv-(Ev-Tvc)=\Delta 7 \quad (32)$$

is performed. The calculated data Δ7 is applied to the data converting ROM 624 for obtaining the data of $\log_2(2^{\Delta 7}-1)$. Then, in the adding circuit 626 the operation of $$(Ev - Tvc) + \log_2(2^{\Delta 7} - 1) = Qvfp + Sv \quad (33)$$
$$= Avfp$$

is performed. The calculated Qvfp is a value provided through the logarithmic compression of the reflection light quantity by the preliminary flash light emission. Avfp is a diaphragm value for achieving a proper exposure under only the preliminary flash light. The reason why the value is calculated at the equation (33) will be described hereinafter. The equation (30) becomes $$2^{Sv}\cdot 2^{Qv}=2^{Ev-Tvc}+2^{Qvfp}\cdot 2^{Sv} \quad (30\text{-}1)$$

From the equations (30-1) and (32), Qv+Sv is eliminated to give the equation (33).

Numeral 628 is a data outputting circuit for outputting the data Δf corresponding to the ratio (difference at logarithmic compression system) between the main emission (fully emitted light by the xenon tube Xe) and the preliminary emission (emission by xenon tube Xel). The data obtained from the circuit 628 and the data Avfp from the adding circuit 626 are inputted to the adding circuit 630 to perform the operation of $$Avfp+\Delta f=Avf \quad (34)$$

to calculate the diaphragm value Avf which achieves a correct exposure under the main flash light. When the calculated diaphragm value Avf is equal to or less than a predetermined value Avo, the emitted light quantity of the flash-light emitting apparatus will not be sufficient because of a far distance to the photographic object, or the like. Thus, the flash-light makes no contribution to the exposure. In this case, the photograph will be no different from that taken under ambient light only. The comparing circuit 644 compares the data of the constant value Avo with the data Avf from the adding circuit 630 to render the output "High" when Avf is smaller than the Avo.

The data Avf from the adding circuit 630 and the data Avs from the diaphragm setting apparatus SE4 are inputted to the subtracting circuit 634 to perform the operation of $$Avs-Avf=\Delta 3. \quad (6)$$

The calculated data Δ3 is inputted to the data converting ROM 636 for producing the data $\log_2(2^{\Delta 3}-1)$. This produced data and the data Avf from the adding circuit 630 are inputted to the adding circuit 638 to perform the operation of $$Avf+\log_2(2^{\Delta 3}-1).$$

This obtained sum and the data Ev from the adding circuit 616 are inputted to the subtracting circuit 640 to perform the operation of $$Tvx=Ev-Avf-\log_2(2^{\Delta 3}-1) \quad (7\text{-}3)$$

to calculate the exposure time. Also, the subtracting circuit 642 performs the operation of $$Tva=Ev-Avs \quad (8)$$

to calculate the proper exposure time by ambient light only.

Numeral 648 is a data outputting circuit for outputting the data TvM corresponding to the exposure time of the synchronizing speed at the flash-light photographing operation. The data TvM is compared with the data Tva from the subtracting circuit 642 by the comparing circuit 652. When Tva≧TvM is established, the flash-light photographing operation cannot be performed, and the output is rendered "High". The comparing circuit 646 compares the data Avf from the adding circuit 630 with the data Avs from the diaphragm setting apparatus SE4 to render the output "High" when Avf>Avs. The comparing circuit 654 compares the data TvM of the exposure time of the synchronizing speed with the data Tvx of the exposure time from the subtracting circuit 640 to render the output "High" when Tvx>TvM. Numeral 650 outputs an exposure time data Tvh which is considered to be the longest shutter speed that will not cause a hand blur. The comparing circuit 656 renders the output "High" when Tvh>Tvx.

(i) When the light quantity from the flash-light is not enough, the photograph taken with the flash-light will be no different from that taken under ambient light. In this case, Avf<Avo is established to cause the comparing circuit 644 and OR circuit OR10 to produce "High" to open the AND gate AG52. Then, the data Tva from the subtracting circuit 642 is outputted from the OR gate OG20 to display the value Tva on the display apparatus DS. Also, since (FIG. 54) the output of the NOR circuit NOR is "Low" at this time, the emission starting signal from the switch S22 is not outputted from the AND circuit AN34, thus resulting in no emission. Also, since it is meaningless to use flash-light in this case, the output of the comparing circuit 644 produces "High", to alarm that the photographing operation is operated by the ambient light only, by the lighting of the light-emitting diode LD4.

(ii) When Tva≧TvM is established at Avf≧Avo, the speed becomes shorter than the synchronizing speed in the photographing operation under the ambient light only. Thus, it is not required to emit flash-light from the emitting apparatus. Accordingly, the comparing circuit 652 becomes "High" to light the light-emitting diode LD6 thereby to give an alarm. Also, since the output of the NOR circuit NOR becomes "Low", the emission starting signal is not outputted from the AND circuit AN34. Also, since the output of the OR circuit OR10 becomes "High", the signal Tva of the exposure time coming from the subtracting circuit 642 is produced from the OR gate OG10. Accordingly, the data Tva is displayed on the displaying apparatus DS.

(iii) When Tva≦TvM at Avs<Avf, the emission is not performed before $2^{-TvM}$. The emission starts after the time interval of $2^{-TvM}$. The exposure becomes proper before the full emission. At this time, the output of the AND circuit AN36 becomes "High" and the AND gate AG54 is opened. And, the exposure time data TvM of the synchronizing speed is outputted from the OR gate OG20 and is displayed.

(iv) When Tva<TvM and Tvx>TvM at Avf≧Avo, the light is not emitted before $2^{-TvM}$. The emission starts after the time interval of $2^{-TvM}$. The exposure becomes proper before the full emission is completed and the exposure time becomes TvM. Accordingly, the output of the AND circuit AN36 becomes "High" to open the AND gate AG54. The OR gate OG20 produces data TvM for the display of the synchronizing speed.

(v) TvM≧Tvx≧Tvh (vi) Tvh>Tvx

During these situations of (v) and (vi), the flash-light emitting apparatus is required to be fully emitted. At this time, the output of the inverter IN22 becomes "High" and the AND gate AG50 is opened. The data Tvx from the subtracting circuit 640 is outputted from the OR gate OG20 and is displayed. Also, in the case of (v), the comparing circuit 656 becomes "High" to produce an alarm by the lighting of the light-emitting diode LD10 indicating that a hand blur may be introduced due to a long exposure time. Also, in the case of (iii), (iv), (v) and (vi), the output of the inverter IN20 is "High" to light the light-emitting diode LD8 to display that the flash-light is emitted.

Upon starting of the exposure controlling operation of the camera, the diaphragm controlling apparatus CA (FIG. 54) controls the diaphragm 702 (FIG. 56) according to the data from the diaphragm setting apparatus SE4. Also, by the raise of the reflection mirror 700, the light directed to the light receiving element PD6 is intercepted. Accordingly, the reflection light from the shutter screen face 704 and the film face 706 is directed to the light receiving element PD7. Upon movement of a leading curtain, the switch S24 (FIG. 54) is opened to integrate the current corresponding to the incident light quantity to the light receiving element PD7 by a capacitor C33. And in the case of the (i), (ii), since the output of the NOR circuit NOR is "Low" the output of the AND circuit AN34 remains "Low", regardless of closure of the switch S22 to prevent the light emission from the flash-light emitting apparatus. And when the output $\log_2(2^{Ev-Avs-Tv})$ from the integrating capacitor C33 coincides with the output from the constant-voltage source E10, the output of the comparator AC10 becomes "High" to render the magnet Mg non-conductive so that the shutter is closed to complete the exposure.

In the case of the (iii) to (vi), the output of the NOR circuit NOR is "High". When the shutter fully opens with the magnet Mg remaining conductive, the output of the AND circuit AN34 becomes "High" upon closure of the switch S22. This signal is inputted to the AND circuit AN32 through the terminals J22 and J20 to operate the trigger circuit 131. Thus, the xenon tube Xe is triggered to render the thyrister SC2 conductive to emit the xenon tube Xe. And when the integrated voltage in the capacitor C33

$$\log_2\{2^{Ev-Avs-Tv}+2^{Qvf+Sv-Avs}\}$$

coincides with the constant-voltage source E10, the magnet Mg becomes non-conductive to close the shutter. The signal which inverts the output of the comparator AC10 into "High" is sent to the gate terminal of the thyristor SC4 through the terminals J62 and J60. While the xenon tube Xe is emitting, the discharging current of the capacitor C31 flows to a zener diode ZD and the current is fed to the trigger circuit 604 of the light emission stopping circuit 602 so that the operation becomes operable. Accordingly, the emission stopping circuit 602 is operated to stop the emission of the xenon tube Xe.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. An exposure control system for a photography operation under an ambient light and a flash light, said system comprising:

first means for controlling an exposure time;

second means for controlling an aperture size;

third means for controlling an amount of flash light to be emitted;

means for measuring an intensity of the ambient light;

means for setting a film sensitivity and two of the exposure time, the aperture size and the flash light amount to govern the corresponding two of the three control means;

means for calculating the other of the exposure time, aperture size and the flash light amount in response to said measuring means and said setting means; and means for governing the other of said controlling means in response to said calculating means.

2. An exposure control system as claimed in claim 1, wherein said setting means sets the film sensitivity, the aperture size and the flash light amount, and said calculating means calculates the exposure time.

3. An exposure control system as claimed in claim 1, wherein said setting means sets the film sensitivity, the exposure time and the flash light amount, and said calculating means calculates the aperture size.

4. An exposure control system as claimed in claim 1, wherein said setting means sets the film sensitivity, the aperture size and the exposure time, and said calculating means calculates the flash light amount.

5. An exposure control system as claimed in claim 4, wherein said third control means includes means for measuring the flash light reflected back on the object, means for integrating the amount of the reflected light and means for stopping the flashing when the integrated value reaches a level related to the value from the calculating means.

6. An exposure control system as claimed in claim 4, further comprising means for informing of a distance to an object, and wherein said calculating means is further responsive to said distance informing means.

7. An exposure control system as claimed in claim 1, further comprising a distance informing means for informing of a distance to an object, and wherein said calculating means is further responsive to said distance informing means.

8. An exposure control system as claimed in claim 1, further comprising means for calculating a ratio of the flash light amount to the amount of the ambient light integrated during the exposure time in response to said measuring means and said setting means.

9. An exposure control system as claimed in claim 1, further comprising means for setting a ratio of the flash light amount to the amount of the ambient light integrated during the exposure time, and wherein said calculating means is further responsive to said ratio setting means.

10. An exposure control system as claimed in claim 1, further comprising means for calculating a ratio of the amount of the ambient light integrated during the exposure time to the sum of the ambient light amount and the flash light amount integrated during the exposure time.

11. An exposure control system as claimed in claim 1, wherein said measuring means and said setting means each comprises means for producing the corresponding exposure information in the logarithmic form, and said calculating means calculates the desired exposure information in the logarithmic form.

12. An exposure control system for a photography operation under an ambient light and a flash light, said system comprising:
first means for controlling an exposure time;
second means for controlling an aperture size;
third means for controlling an amount of flash light to be emitted;
means for measuring an intensity of the ambient light;
first means for setting a film sensitivity and one of the exposure time, the aperture size and the flash light amount to govern the corresponding one of the three control means;
second means for setting a ratio of the flash light amount to the amount of the ambient light integrated during the exposure time;
means for calculating the others of the exposure time, the aperture size and the flash light amount in response to said measuring means, said first setting means and said second setting means; and
means for governing the others of said controlling means in response to said calculating means.

13. An exposure control system as claimed in claim 12, further comprising means for informing of a distance to an object, and wherein said calculating means is further responsive to said distance informing means.

14. An exposure control system for a photography operation under an ambient light and a flash light, said system comprising:
first means for controlling an exposure time;
second means for controlling an aperture size;
third means for controlling an amount of flash light to be emitted;
means for measuring an intensity of the ambient light;
first means for setting a film sensitivity and one of the exposure time, the aperture size and the flash light amount to govern the corresponding one of the three control means;
second means for setting a ratio of the amount of the ambient light integrated during the exposure time to the sum of the ambient light amount and the flash light amount integrated during the exposure time;
means for calculating the others of the exposure time, the aperture size and the flash light amount in response to said measuring means, said first setting means and said second setting means; and
means for governing the others of said controlling means in response to said calculating means.

15. An exposure control system as claimed in claim 14, further comprising means for informing of a distance to an object, and wherein said calculating means is further responsive to said distance informing means.

16. An exposure control system as claimed in claims 7, or 13 or 15, further comprising means for setting an incident flash light amount which is required to reach an object, and wherein said calculating means calculates the flash light amount to be emitted in response to said incident flash light setting means and said distance informing means.

17. An exposure control system as claimed in claim 7, 13 or 15, wherein said calculating means determines an incident flash light amount which is required to reach an object and calculates the flash light amount to be emitted in response to the determined incident flash light amount and the distance which is informed of.

18. An exposure control system for a flash photography operation comprising:
means for measuring the flash light reflected back from an object;
means responsive to said measuring means for integrating the measured light;
means for informing of an amount of flash light to be reflected back from the object;
means for variably predetermining a reference value in response to said informing means; and
means for stopping the flashing when the integrated value coincides with the reference value.

19. An exposure control system as claimed in claim 18, further comprising means for providing a threshold level, the value of which is responsive to at least a set film sensitivity, and second means for alternatively stopping the flashing when the integrated value reaches the threshold level.

20. An exposure control system as claimed in claim 19, wherein said second stopping means is effective when said predetermining means is ineffective.

21. An exposure control system as claimed in claim 18, further comprising means for disabling the flashing when the amount of flash light which is informed of by said informing means is below a predetermined limit.

22. An exposure control system for a flash photography operation comprising:
  means for emitting a flash light;
  means for informing of a distance to an object; and
  means for disabling said emitting means when the distance exceeds a limit.

23. An exposure control system for a flash photography operation comprising:
  means for emitting a flash light;
  means for measuring an intensity of the ambient light;
  means for setting an exposure time;
  means for determining an amount of flash light effective for a photography operation;
  means for determining a ratio of the effective flash light amount to the ambient light amount to be integrated within the set exposure time; and
  means for disabling said emitting means when the ratio is below a limit.

24. An exposure control system for a photography operation under an ambient light and a flash light, said system comprising:
  means for measuring an intensity of the ambient light;
  means for emitting a preliminary flash light prior to the flashing of photography;
  means for receiving and integrating the preliminary flash light reflected back from the object and the ambient light for a predetermined period of time;
  means for determining an amount of only the preliminary flash light reflected back from the object in response to said measuring means and said receiving and integrating means;
  means responsive to said determining means for introducing an amount of flash light of photography to be reflected back from the object;
  means for setting an aperture size and a film sensitivity; and
  means for calculating an exposure time in response to said measuring means, said introducing means and said setting means.

25. An exposure control system as claimed in claim 24, further comprising means for warning when the calculated exposure time exceeds a hand-blur limit.

26. An exposure control system for a flash photography operation comprising:
  means for emitting a preliminary flash light prior to the emission of a primary flash light;
  means for receiving and integrating the light reflected from the object for a predetermined period of time including the emission of the preliminary flash light;
  means for providing a ratio of the full amount of the primary flash light to the amount of the preliminary flash light;
  means, responsive to said receiving and integrating means and said providing means, for calculating an amount of light reflected from the object under full emission of the primary flash light; and
  means for disabling the emission of the primary flash light when the calculated amount is below a predetermined level.

27. An exposure control system for a flash photography operation comprising:
  means for emitting a flash light;
  means for measuring the light caused by said emitting means;
  means responsive to said measuring means for producing an output proportional to the logarithm of the integrated amount of the measured light;
  means for providing a reference signal representative of the logarithm of a given amount of light to be measured by said measuring means;
  means for comparing the output of said producing means with the reference signal to detect that the output comes into a predetermined relationship with the reference signal; and
  means for stopping the emission of the flash light in response to the detection by said comparing and detecting means.

28. An exposure control system as claimed in claim 27, wherein said measuring means includes means for receiving light reflected from the object, and said reference signal is representative of the logarithm of a given amount of light to be reflected from the object.

29. An exposure control system as claimed in claim 27, wherein said measuring means includes means for monitoring light emitted by said emitting means, and said reference signal is representative of the logarithm of a given amount of light to be emitted by said emitting means.

30. An exposure control system for a flash photography operation comprising:
  means for emitting a flash light;
  means for setting a distance to an object;
  first means, responsive to said setting means, for generating a first signal indicative of an amount of flash light to be emitted by said emitting means;
  first means for controlling said emitting means in response to said first signal;
  second means for generating a second signal indicative of an amount of flash light reflected from the object;
  second means for controlling said emitting means in response to said second signal;
  means for detecting whether or not said first signal is generated from said generating means; and
  means for selecting between said first and second controlling means in response to said detecting means so as to select said first controlling means upon the detection by said detecting means.

31. An exposure control system for a flash photography operation comprising:
  means for emitting a flash light;
  means for controlling an amount of the flash light including means for generating a signal to stop the emission of the flash light;
  means for counting a predetermined time period; and
  means for warning when said signal is not generated by said generating means during said predetermined time period.

32. An exposure control system as claimed in claim 31, wherein said time period corresponds to a time necessary for said emitting means to complete a full light emission.

33. An exposure control system for a photographic operation under an ambient light and a flash light, said system comprising:
  means for measuring an intensity of the ambient light;

means for emitting a preliminary flash light prior to the flashing of a flashlight for photography;

means for receiving and integrating the preliminary flash light reflected back from the object and the ambient light for a predetermined period of time;

means for determining an amount of only the preliminary flash light reflected back from the object in response to said measuring means and said receiving and integrating means;

means responsive to said determining means for introducing an amount of flash light of photography to be reflected back from the object;

means for setting at least one exposure information;

means for calculating at least an exposure control factor in response to said measuring means, said introducing means and said setting means; and means for controlling the exposure by governing said exposure factor in response to said calculating means.

34. An exposure control system for a photography operation comprising:

means for measuring an intensity of an ambient light;

means for signaling whether the photography is to be effected with or without a flash light;

means for changing an aperture size in response to said measuring means in a first mode, and for changing the aperture size also in response to said measuring means in a second mode which is different from said first mode; and means for switching said changing means between said first and second modes in response to said signaling means, wherein said changing means is adapted to determine the aperture size with the flash light left out of consideration in said first mode when said signaling means signals that the photography is to be effected without the flash light, and to determine the aperture size with the flash light taken into consideration in said second mode when said signaling means signals that the photography is to be effected with the flash light.

35. An exposure control system as claimed in claim 34, wherein said signaling means includes means for transmitting a flash charging completion signal which is indicative of photography with a flash light.

36. An exposure control system for a photography operation comprising:

first means for controlling an exposure time;

second means for controlling an aperture size;

third means for controlling an amount of flash light to be emitted;

means for measuring an intensity of the ambient light;

means for setting a film sensitivity and an exposure time;

means for calculating an aperture size in response to said measuring means and said setting means;

means responsive to said measuring means for producing a signal indicative of an aperture size which is smaller than the aperture size to be calculated by said calculating means;

means for signaling whether photography is to be effected with or without a flash light;

means responsive to said signaling means for switching between a first and second modes of aperture size control, the second control means being responsive to said calculating means in said first mode when said signaling means signals that photography is to be effected without the flash light, and the second control means being responsive to said producing means in said second mode when said signaling means signals that photography is to be effected with the flash light;

wherein said first controlling means is responsive to said setting means in both the first and second modes and said third controlling means includes means for adjusting the flash light so as to fill in the deficiency in exposure due to the difference between the aperture size determined by said calculating means and the aperture size determined by said producing means.

37. An exposure control system for a photography operation under an ambient light and a flash light, said system comprising:

means for measuring an intensity of the ambient light;

means for changing the aperture size in response to the measured intensity of the ambient light;

means for emitting a flash light;

means for receiving the flash light reflected back from an object for producing an electric signal;

means for integrating the electric signal;

means for providing a constant level of electric signal; and means for comparing the integrated electric signal with the constant level of electric signal to terminate the emission of the flash light when the two signals are equal in value;

whereby the participation of the flash light is determining the exposure relative to that of the ambient light is changeable in response to the change in the intensity of the ambient light.

* * * * *